(12) United States Patent
Allen et al.

(10) Patent No.: US 11,988,919 B2
(45) Date of Patent: May 21, 2024

(54) BACKLIGHTS INCLUDING PATTERNED DIFFUSERS AND WAVELENGTH SELECTIVE REFLECTORS

(71) Applicant: Corning Incorporated, Corning, NY (US)

(72) Inventors: Kirk Richard Allen, Elmira, NY (US); Songfeng Han, Shanghai (CN); Pamela Arlene Maurey, Savona, NY (US); Xiang-Dong Mi, Pittsford, NY (US); Andrii Varanytsia, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/995,439

(22) PCT Filed: Apr. 14, 2021

(86) PCT No.: PCT/US2021/027233
§ 371 (c)(1),
(2) Date: Oct. 4, 2022

(87) PCT Pub. No.: WO2021/221908
PCT Pub. Date: Nov. 4, 2021

(65) Prior Publication Data
US 2023/0168541 A1 Jun. 1, 2023

Related U.S. Application Data

(60) Provisional application No. 63/144,760, filed on Feb. 2, 2021, provisional application No. 63/017,296, filed on Apr. 29, 2020.

(51) Int. Cl.
*G02F 1/13357* (2006.01)
*G02F 1/1335* (2006.01)

(52) U.S. Cl.
CPC .. *G02F 1/133611* (2013.01); *G02F 1/133514* (2013.01); *G02F 1/133605* (2013.01); *G02F 1/133606* (2013.01)

(58) Field of Classification Search
CPC ......... G02F 1/133611; G02F 1/133514; G02F 1/133605; G02F 1/133606
(Continued)

(56) References Cited

U.S. PATENT DOCUMENTS 8,272,772 B2   9/2012   Sato et al.
9,310,630 B2   4/2016   Arsenault et al.
(Continued)

FOREIGN PATENT DOCUMENTS

KR   10-2013-0083807 A   7/2013
KR   10-2016-0076346 A   6/2016
(Continued)

OTHER PUBLICATIONS

International Search Report and Written Opinion of the International Searching Authority; PCT/US2021/027233; dated Jul. 23, 2021; 10 pages; European Patent Office.

*Primary Examiner* — Charles S Chang
(74) *Attorney, Agent, or Firm* — Matthew J. Mason

(57) ABSTRACT

A backlight includes a substrate, a plurality of light sources, a reflective layer, a first diffuser plate, a second diffuser plate, and a color conversion layer. The plurality of light sources are proximate the substrate. The reflective layer is proximate the substrate. The first diffuser plate is over the plurality of light sources. The color conversion layer is between the first diffuser plate and the second diffuser plate.

11 Claims, 40 Drawing Sheets

(58) Field of Classification Search
USPC ...................................................... 349/61–71
See application file for complete search history.

(56) References Cited

U.S. PATENT DOCUMENTS

| | | | | |
|---|---|---|---|---|
| 2012/0147277 A1* | 6/2012 | Yamamoto | ........... | G02B 6/0021 |
| | | | | 348/790 |
| 2016/0116663 A1* | 4/2016 | Hong | ................... | G02B 6/0053 |
| | | | | 362/330 |
| 2019/0278134 A1* | 9/2019 | Okamoto | ............. | G02B 6/0011 |
| 2021/0063609 A1 | 3/2021 | Bellman et al. | | |
| 2021/0397049 A1 | 12/2021 | Allen et al. | | |

FOREIGN PATENT DOCUMENTS

| | | |
|---|---|---|
| KR | 10-2019-0040357 A | 4/2019 |
| WO | 2018/144509 A1 | 8/2018 |
| WO | 2019/046223 A1 | 3/2019 |
| WO | 2019/046328 A1 | 3/2019 |
| WO | 2019/046340 A1 | 3/2019 |
| WO | 2020/214047 A1 | 10/2020 |
| WO | 2021/071378 A1 | 4/2021 |
| WO | 2021/162889 A1 | 8/2021 |

* cited by examiner

BACKLIGHTS INCLUDING PATTERNED DIFFUSERS AND WAVELENGTH SELECTIVE REFLECTORS

CROSS-REFERENCE TO RELATED APPLICATIONS

This application claims the benefits of priority under 35 U.S.C. § 371 of International Application Serial No. PCT/US2021/027233, filed on Apr. 14, 2021, which claims the benefit of priority under 35 U.S.C. § 119 of U.S. Provisional Application Ser. No. 63/017,296 filed on Apr. 29, 2020 and U.S. Provisional Patent Application Ser. No. 63/144,760 filed on Feb. 2, 2021, the contents of which are relied upon and incorporated herein by reference in their entirety.

BACKGROUND

Field

The present disclosure relates generally to backlights for displays. More particularly, it relates to backlights including patterned diffusers including patterned reflectors and wavelength selective reflectors.

Technical Background

Liquid crystal displays (LCDs) are commonly used in various electronics, such as cell phones, laptops, electronic tablets, televisions, and computer monitors. LCDs are light valve-based displays in which the display panel includes an array of individually addressable light valves. LCDs may include a backlight for producing light that may then be wavelength converted, filtered, and/or polarized to produce an image from the LCD. Backlights may be edge-lit or direct-lit. Edge-lit backlights may include a light emitting diode (LED) array edge-coupled to a light guide plate that emits light from its surface. Direct-lit backlights may include a two-dimensional (2D) array of LEDs directly behind the LCD panel.

Direct-lit backlights may have the advantage of improved dynamic contrast as compared to edge-lit backlights. For example, a display with a direct-lit backlight may independently adjust the brightness of each LED to set the dynamic range of the brightness across the image. This is commonly known as local dimming. To achieve desired light uniformity and/or to avoid hot spots in direct-lit backlights, however, a diffuser plate or film may be positioned at a distance from the LEDs, thus making the overall display thickness greater than that of an edge-lit backlight. Lenses positioned over the LEDs have been used to improve the lateral spread of light in direct-lit backlights. The optical distance (OD) for light traveling between the LEDs and the diffuser plate or film in such configurations (e.g., from at least 10 to typically about 20-30 millimeters), however, still results in an undesirably high overall display thickness and/or these configurations may produce undesirable optical losses as the backlight thickness is decreased. While edge-lit backlights may be thinner, the light from each LED may spread across a large region of the light guide plate such that turning off individual LEDs or groups of LEDs may have only a minimal impact on the dynamic contrast ratio.

SUMMARY

Some embodiments of the present disclosure relate to a backlight. The backlight includes a substrate, a plurality of light sources, a reflective layer, a first diffuser plate, a second diffuser plate, and a color conversion layer. The plurality of light sources are proximate the substrate. The reflective layer is proximate the substrate. The first diffuser plate is over the plurality of light sources. The color conversion layer is between the first diffuser plate and the second diffuser plate.

Yet other embodiments of the present disclosure relate to a reflector. The reflector includes a carrier, a first wavelength selective reflector, and a second wavelength selective reflector. The carrier includes a first surface and a second surface opposite to the first surface. The first wavelength selective reflector is on the first surface of the carrier. The first wavelength selective reflector transmits more than 60 percent of normal incident light of a first wavelength range and reflects more than 60 percent of normal incident light of a second wavelength range different from the first wavelength range. The second wavelength selective reflector is on the second surface of the carrier. The second wavelength selective reflector transmits more than 60 percent of normal incident light of the first wavelength range and reflects more than 60 percent of normal incident light of a third wavelength range different from the first wavelength range.

Yet other embodiments of the present disclosure relate to a backlight. The backlight includes a substrate, a plurality of light sources, a reflective layer, a patterned diffuser, and a color conversion layer. The plurality of light sources are proximate the substrate to emit light within a first wavelength range. The reflective layer is proximate the substrate. The patterned diffuser includes a carrier, a first wavelength selective reflector on a first surface of the carrier, and a plurality of patterned reflectors on the first wavelength selective reflector or on a second surface of the carrier opposite to the first surface of the carrier. The color conversion layer converts light of the first wavelength range into light of a second wavelength range higher than the first wavelength range and into light of a third wavelength range higher than the second wavelength range. The first wavelength selective reflector transmits more the 60 percent of normal incident light of the first wavelength range and reflects more than 60 percent of normal incident light of the second wavelength range.

The backlights disclosed herein are thin, direct-lit backlights with improved light efficiency. The backlights have an improved ability to hide light sources resulting in a thinner backlight. The improved ability to hide the light sources allows for the removal of so-called "hot" spots directly above the light sources of the backlight, thus resulting in a uniform brightness across the display. The patterned diffusers used within the backlights disclosed herein have a large alignment tolerance, provide improved luminance uniformity and color uniformity, and may be configured for use with light sources of different colors and/or different emission angular profiles.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description explain principles and operation of the various embodiments.

DETAILED DESCRIPTION

Figure 1A:
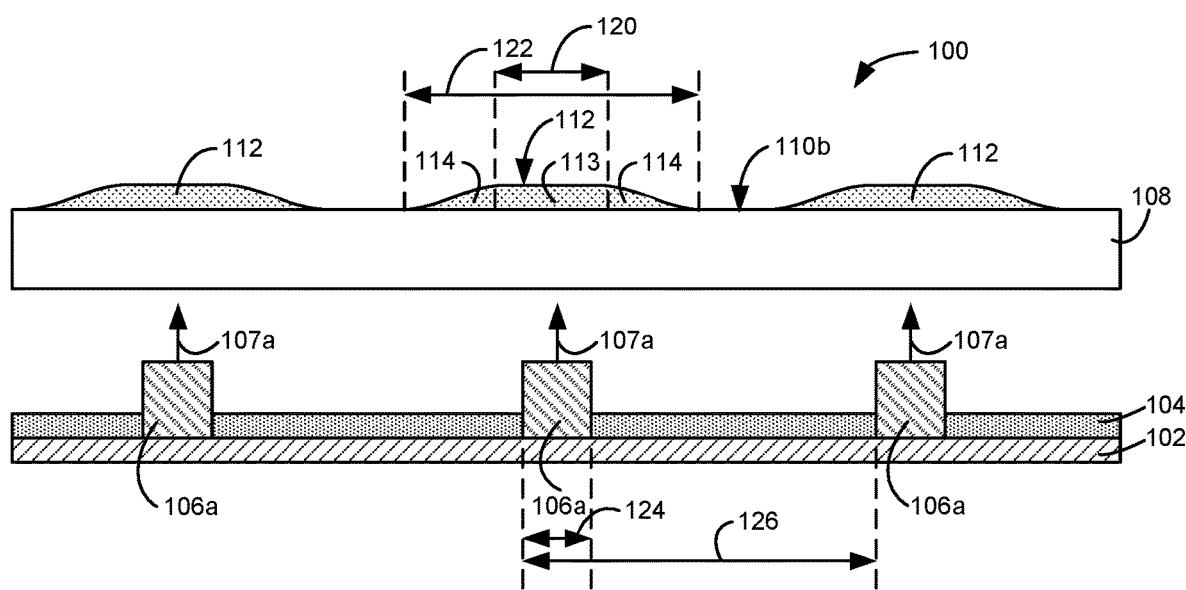
FIGS. 1A-1C are various views of an exemplary backlight portion including a patterned diffuser.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, vertical, horizontal—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an," and "the" include plural references unless the context clearly dictates otherwise. Thus, for example, reference to "a" component includes aspects having two or more such components, unless the context clearly indicates otherwise.

Referring now to FIGS. 1A-IC, various views of an exemplary backlight portion 100 are depicted. FIG. 1A is a cross-sectional view of backlight portion 100. Backlight portion 100 may include a substrate 102, a reflective layer 104, a plurality of light sources 106a, and a patterned diffuser 110b. Patterned diffuser 110b includes a carrier 108 (e.g., a light guide plate) and a plurality of patterned reflectors 112. The plurality of light sources 106a are arranged on substrate 102 and are in electrical communication with the substrate 102. Each light source 106a may emit a peak intensity ray as indicated at 107a along a normal axis. The reflective layer 104 is on the substrate 102 and surrounds each light source 106a. In certain exemplary embodiments, the substrate 102 may be reflective such that the reflective layer 104 may be excluded. The patterned diffuser 110b is over the plurality of light sources 106a and optically coupled to each light source 106a. In certain exemplary embodiments, an optical adhesive (not shown) may be used to couple the plurality of light sources 106a to the patterned diffuser 110b. The optical adhesive (e.g., phenyl silicone) may have a refractive index greater than or equal to a refractive index of the carrier 108. The plurality of patterned reflectors 112 are arranged on the upper surface of the carrier 108. Each patterned reflector 112 is aligned with a corresponding light source 106a.

Each patterned reflector 112 includes a thickness profile along a width or diameter of the patterned reflector including a substantially flat section as indicated at 113 and a curved section as indicated at 114 extending from and surrounding the substantially flat section 113. The substantially flat section 113 may have a rough surface profile (e.g., slight variations in the thickness throughout the substantially flat section). In certain exemplary embodiments, the substantially flat section 113 varies in thickness by no more than plus or minus 20 percent of an average thickness of the substantially flat section. In this embodiment, the average thickness measured in the direction orthogonal to the carrier 108 is defined as the maximum thickness ($T_{max}$) of the substantially flat section plus the minimum thickness ($T_{min}$) of the substantially flat section divided by two (i.e., ($T_{max}$+$T_{min}$)/2). For example, for an average thickness of the substantially flat section 113 of about 100 micrometers, the maximum thickness of the substantially flat section would be equal to or less than about 120 micrometers and the minimum thickness of the substantially flat section would be equal to or greater than about 80 micrometers. In other embodiments, the substantially flat section 113 varies in thickness by no more than plus or minus 15 percent of an average thickness of the substantially flat section. For example, for an average thickness of the substantially flat section 113 of about 80 micrometers, the maximum thickness of the substantially flat section would be equal to or less than about 92 micrometers and the minimum thickness of the substantially flat section would be equal to or greater than about 68 micrometers.

In yet other embodiments, the substantially flat section 113 varies in thickness by no more than plus or minus 10 percent of an average thickness of the substantially flat section. For example, for an average thickness of the substantially flat section 113 of about 50 micrometers, the maximum thickness of the substantially flat section would be equal to or less than about 55 micrometers and the minimum thickness of the substantially flat section would be equal to or greater than about 45 micrometers. In yet other embodiments, the substantially flat section 113 varies in thickness by no more than plus or minus 5 percent of an average thickness of the substantially flat section. The curved section 114 may be defined as the absolute ratio of the change in thickness over the change in the distance from the center of the patterned reflector 112. The slope of the curved section 114 may decrease with the distance from the center of the patterned reflector 112. In certain exemplary embodiments, the slope is greatest near the substantially flat section 113, rapidly decreases with the distance from the center of the patterned reflector 112, and then slowly decreases with further distance from the center of the patterned reflector.

The size L0 (i.e., width or diameter) of each substantially flat section 113 as indicated at 120 (in a plane parallel to the substrate 102) may be greater than the size (i.e., width or diameter) of each corresponding light source 106a as indicated at 124 (in a plane parallel to the substrate 102). The size 120 of each substantially flat section 113 may be less than the size 124 of each corresponding light source 106a times a predetermined value. In certain exemplary embodiments, when the size 124 of each light source 106a is greater than or equal to about 0.5 millimeters, the predetermined value may be about two or about three, such that the size of each substantially flat section 113 is less than three times the size of each light source 106a. When the size 124 of each light source 106a is less than 0.5 millimeters, the predetermined value may be determined by the alignment capability between the light sources 106a and the patterned reflectors 112, such that the size of each substantially flat section 113 of each of patterned reflector 112 is within a range between about 100 micrometers and about 300 micrometers greater than the size of each light source 106a. Each substantially flat section 113 is large enough such that each patterned reflector 112 can be aligned to the corresponding light source 106a and small enough to achieve suitable luminance uniformity and color uniformity.

The size L1 (i.e., width or diameter) of each patterned reflector 112 is indicated at 122 (in a plane parallel to the substrate 102) and the pitch P between adjacent light sources 106a is indicated at 126. While the pitch is illustrated along one direction in FIG. 1A, the pitch may be different in a direction orthogonal to the direction illustrated. The pitch may, for example, be about 90, 45, 30, 10, 5, 2, 1, or 0.5 millimeters, larger than about 90 millimeters, or smaller than about 0.5 millimeters. In certain exemplary embodiments, the ratio L1/P of the size 122 of each patterned reflector 112 over the pitch 126 is within a range between about 0.45 and 1.0. The ratio may vary with the pitch 126 of the light sources 106a and the distance between the emission surface of each light source and the corresponding patterned reflector 112. For example, for a pitch 126 equal to about 5 millimeters and a distance between the emission surface of each light source and the corresponding patterned reflector equal to about 0.2 millimeters, the ratio may equal about 0.50, 0.60, 0.70, 0.80, 0.90, or 1.0.

Each patterned reflector 112 reflects at least a portion of the light emitted from the corresponding light source 106a into the carrier 108. Each patterned reflector 112 has a specular reflectance and a diffuse reflectance. The specularly-reflected light exits from the bottom surface of the carrier 108. While specularly-reflected light travels laterally primarily due to the reflection between the reflective layer 104 and the carrier 108, or due to the reflection between the reflective layer 104 and the color conversion layer, diffuser sheet, or diffuser plate (shown below in FIG. 2), some loss of light may occur due to imperfect reflection from the reflective layer 104.

The diffusively reflected light has an angular distribution between 0° and 90° measured from the normal of the carrier 108. About 50 percent of the diffusively reflected light has an angle exceeding the critical angle ($\theta_{TIR}$) of the total internal reflection. Thus, the diffusively reflected light can travel laterally due to the total internal reflection without any loss, until the light is subsequently extracted out of the carrier 108 by patterned reflectors 112.

Figure 1B:
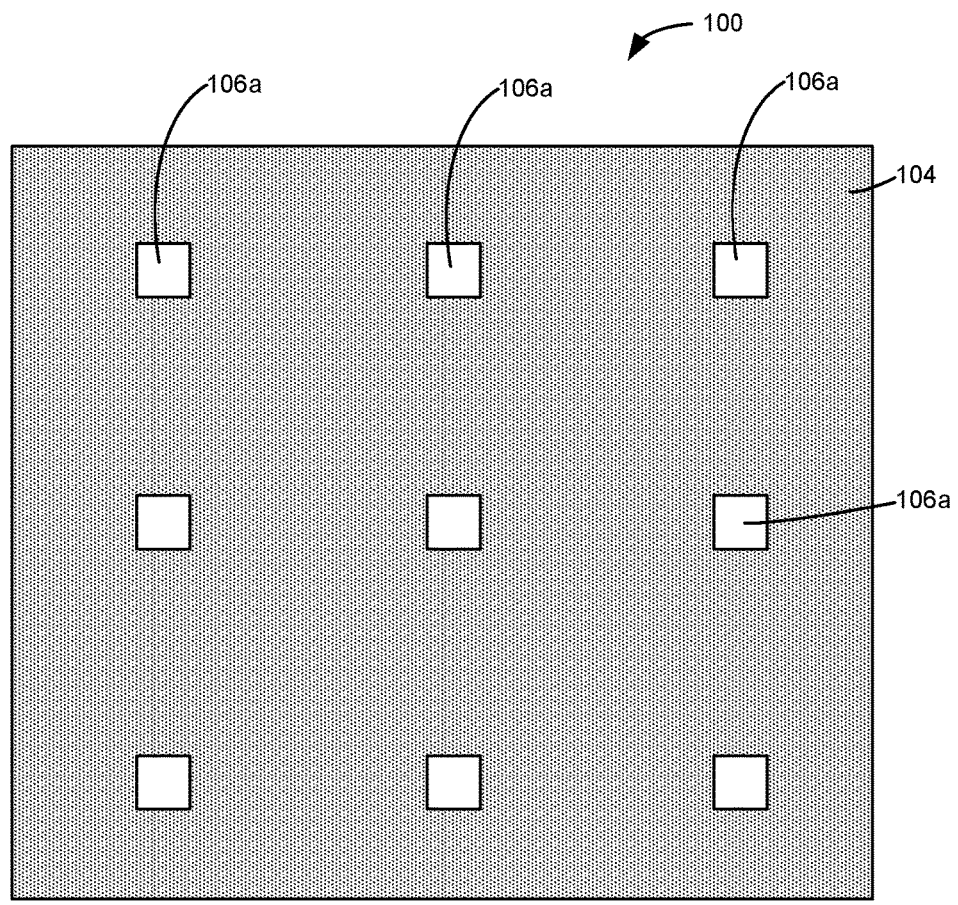

FIG. 1B is a top view of the plurality of light sources 106a and reflective layer 104 on substrate 102. Light sources 106a are arranged in a 2D array including a plurality of rows and a plurality of columns. While nine light sources 106a are illustrated in FIG. 1B in three rows and three columns, in other embodiments backlight portion 100 may include any suitable number of light sources 106a arranged in any suitable number of rows and any suitable number of columns. Light sources 106a may also be arranged in other periodic patterns, for example, a hexagonal or triangular lattice, or as quasi-periodic or non-strictly periodic patterns. For example, the spacing between light sources 106a may be smaller at the edges and/or corners of the backlight.

Substrate 102 (FIG. 1A) may be a printed circuit board (PCB), a glass or plastic substrate, or another suitable substrate for passing electrical signals to each light source 106a for individually controlling each light source. Substrate 102 may be a rigid substrate or a flexible substrate. For example, substrate 102 may include flat glass or curved glass. The curved glass, for example, may have a radius of curvature less than about 2000 millimeters, such as about 1500, 1000, 500, 200, or 100 millimeters. The reflective layer 104 may include, for example, metallic foils, such as silver, platinum, gold, copper, and the like; dielectric materials (e.g., polymers such as polytetrafluoroethylene (PTFE)); porous polymer materials, such as polyethylene terephthalate (PET), Poly(methyl methacrylate) (PMMA), polyethylene naphthalate (PEN), polyethersulfone (PES), etc.; multi-layer dielectric interference coatings, or reflective inks, including white inorganic particles such as titania, barium sulfate, etc., or other materials suitable for reflecting light and tuning the color of the reflected and transmitted light, such as colored pigments.

Each of the plurality of light sources 106a may, for example, be an LED (e.g., size larger than about 0.5 millimeters), a mini-LED (e.g., size between about 0.1 millimeters and about 0.5 millimeters), a micro-LED (e.g., size smaller than about 0.1 millimeter), an organic LED (OLED), or another suitable light source having a wavelength ranging from about 400 nanometers to about 750 nanometers. In other embodiments, each of the plurality of light sources 106a may have a wavelength shorter than 400 nanometers and/or longer than 750 nanometers. The light from each light source 106a is optically coupled to the carrier 108. As used herein, the term "optically coupled" is intended to denote that a light source is positioned at a surface of the carrier 108 and is in optical communication with the carrier 108 directly or through an optically-clear adhesive, so as to introduce light into the carrier that at least partially propagates due to total internal reflection. The light from each light source 106a is optically coupled to the carrier 108 such that a first portion of the light travels laterally in the carrier 108 due to the total internal reflection and is extracted out of the carrier by the patterned reflectors 112, and a second portion of the light travels laterally between the reflective layer 104 and the patterned reflectors 112 due to multiple reflections at the reflective surfaces of the reflective layer 104 and the patterned reflectors 112 or between an optical film stack (shown in FIG. 2) and the reflective layer 104.

According to various embodiments, the carrier 108 may include any suitable transparent material used for lighting and display applications. As used herein, the term "transparent" is intended to denote that the carrier has an optical transmission of greater than about 70 percent over a length of 500 millimeters in the visible region of the spectrum (about 420-750 nanometers). In certain embodiments, an exemplary transparent material may have an optical transmittance of greater than about 50 percent in the ultraviolet (UV) region (about 100-400 nanometers) over a length of 500 millimeters. According to various embodiments, the carrier may include an optical transmittance of at least 95 percent over a path length of 50 millimeters for wavelengths ranging from about 450 nanometers to about 650 nanometers.

The optical properties of the carrier may be affected by the refractive index of the transparent material. According to various embodiments, the carrier 108 may have a refractive index ranging from about 1.3 to about 1.8. In other embodiments, the carrier 108 may have a relatively low level of light attenuation (e.g., due to absorption and/or scattering). The light attenuation (a) of the carrier 108 may, for example, be less than about 5 decibels per meter for wavelengths ranging from about 420-750 nanometers. The carrier 108 may include polymeric materials, such as plastics (e.g., polymethyl methacrylate (PMMA), methylmethacrylate styrene (MS), polydimethylsiloxane (PDMS)), polycarbonate (PC), or other similar materials. The carrier 108 may also include a glass material, such as aluminosilicate, alkali-aluminosilicate, borosilicate, alkali-borosilicate, alumino-borosilicate, alkali-aluminoborosilicate, soda lime, or other suitable glasses. Non-limiting examples of commercially available glasses suitable for use as a glass carrier 108 include EAGLE XG®, Lotus™, Willow®, Iris™, and Gorilla® glasses from Corning Incorporated. In examples where substrate 102 includes curved glass, carrier 108 may also include curved glass to form a curved backlight. In other embodiments, the carrier 108 may have a relatively high level of light attenuation. The light attenuation ($\alpha$) of the carrier 108 may, for example, be greater than about 5 decibels per meter for wavelengths ranging from about 420-750 nanometers.

Figure 1C:
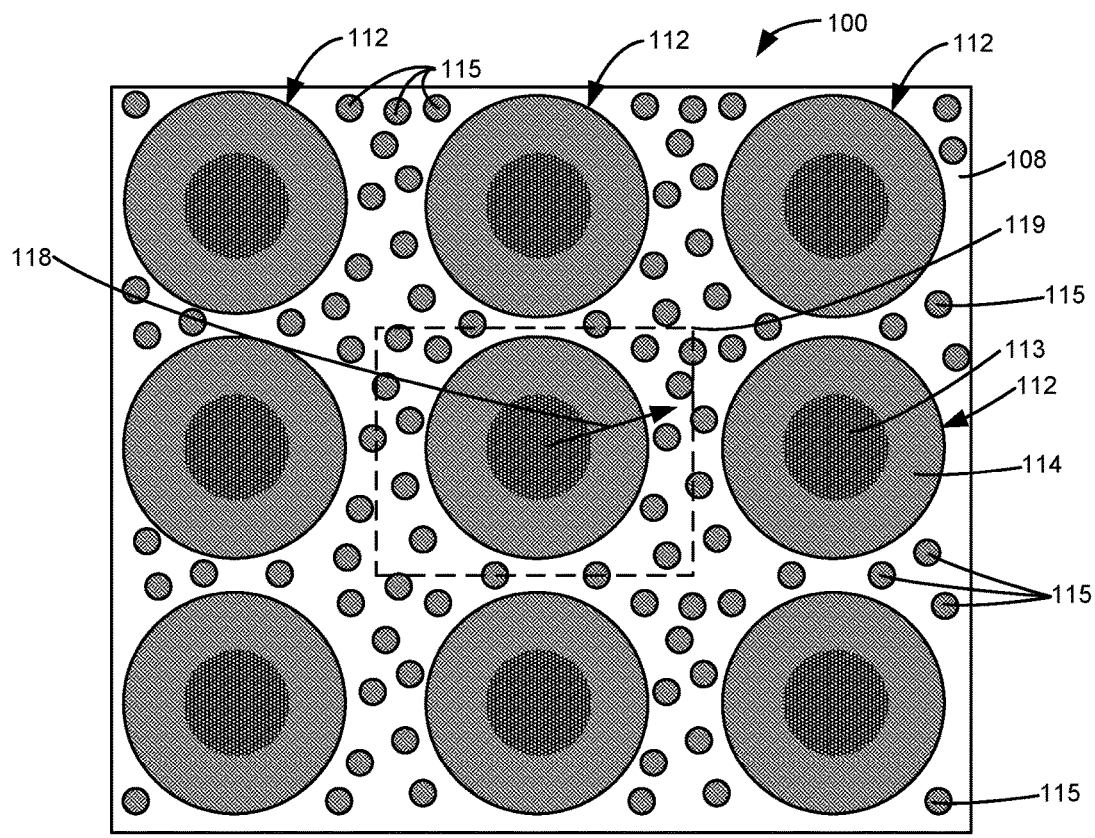

FIG. 1C is a top view of the plurality of patterned reflectors 112 on the carrier 108. Each patterned reflector 112 may include a substantially flat section 113 and a curved section 114. In addition, each patterned reflector 112 may include individual dots 115 on the carrier 108. The substantially flat section 113 may be more reflective than the curved section 114, and the curved section 114 may be more transmissive than the substantially flat section 113. Each curved section 114 may have properties that change in a continuous and smooth way with distance from the substantially flat section 113. While in the embodiment illustrated in FIG. 1C, each patterned reflector 112 is circular in shape, in other embodiments each patterned reflector 112 may have another suitable shape (e.g., elliptical, rectangular, hexagonal, etc.). With the patterned reflectors 112 fabricated directly on the upper surface of the carrier 108, the patterned reflectors 112 increase the ability of hiding the light sources 106a. Fabricating patterned reflectors 112 directly on the upper surface of the carrier 108 also saves space.

In certain exemplary embodiments, each patterned reflector 112 is a diffuse reflector, such that each patterned reflector 112 further enhances the performance of the backlight portion 100 by scattering some light rays at high enough angles such that they can propagate in the carrier 108 by total internal reflection. Such rays will then not experience multiple bounces between the patterned reflectors 112 and the reflective layer 104 or between an optical film stack and the reflective layer 104 and therefore avoid loss of optical power, thereby increasing the backlight efficiency. In certain exemplary embodiments, each patterned reflector 112 is a specular reflector. In other embodiments, some areas of each patterned reflector 112 have a more diffuse character of reflectivity and some areas have a more specular character of reflectivity.

Each patterned reflector 112 may be formed, for example, by printing (e.g., inkjet printing, screen printing, microprinting, etc.) a pattern with white ink, black ink, metallic ink, or other suitable ink. Each patterned reflector 112 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal. Each patterned reflector 112 may also be formed by other known methods of selectively removing material from the carrier itself, for example through laser ablation or chemical etching into the carrier.

In certain exemplary embodiments, where white light sources 106a are used, the presence of different reflective and absorptive materials in variable density in the patterned reflectors 112 may be beneficial for minimizing the color shift across each of the dimming zones of the backlight. Multiple bounces of light rays between the patterned reflectors and the reflective layer 104 (FIG. 1A) may cause more loss of light in the red part of the spectrum than in the blue, or vice versa. In this case, engineering the reflection to be color neutral, for example by using slightly colored reflective/absorptive materials, or materials with the opposite sign of dispersion (in this case, dispersion means spectral dependence of the reflection and/or absorption) may minimize the color shift. When white light sources 106a are used, it is also beneficial that the patterned reflectors 112 reflect and transmit a similar amount of blue light as green and red light. The patterned reflectors 112 may contain microsized particles larger than a threshold size. For example, the threshold size may be about 140 nanometers for titanium dioxide, about 560 nanometers for aluminum oxide, or about 750 nanometers for sodium fluoride. In other examples, the threshold size may be 1, 2, 5, 10, or 20 micrometers. In certain exemplary embodiments where blue light sources 106a are used, it is beneficial that the patterned reflectors 112 reflect more blue light than green and red light and transmit less blue light than green and red light. The patterned reflectors 112 may contain nano-sized particles smaller than a threshold size. For example, the threshold size may be about 140 nanometers for titanium dioxide, about 560 nanometers for aluminum oxide, or about 750 nanometers for sodium fluoride.

Patterned diffuser 110b has a spatially varying transmittance or a spatially varying color shift. Patterned diffuser 110b can also have a spatially varying transmittance and a spatially varying color shift. Since the spatial reflectance and the spatial transmittance of the patterned diffuser 110b are linked together, the patterned diffuser also has a spatially varying reflectance. For example, at the same location of the patterned diffuser 110b, a less (or greater) reflectance is linked to a greater (or less) transmittance. Therefore, the patterned diffusers disclosed herein will be quantified by the spatial transmittance and not by the spatial reflectance. The spatially varying transmittance is expressed in terms of a ratio of two spatial luminance distributions—one measured with the patterned diffuser placed over a spatially uniform and angularly Lambertian light source, and the other measured with the spatially uniform and angularly Lambertian light source. The spatially varying color shift is expressed in terms of a difference and/or ratio of two spatial color coordinate distributions—one measured with the patterned diffuser placed over a spatially uniform and angularly Lambertian light source, and the other measured with the spatially uniform and angularly Lambertian light source. For the measurements, a region of interest is defined for a patterned reflector 112 as a radial position r as indicated at 118. The radial position r is measured relative to a center of each patterned reflector 112. The radial position r ranges from 0 corresponding to the center of each patterned reflector 112 to rmax indicated at 119 corresponding to a maximum radial position r of each patterned reflector. The region of interest is a repeating unit corresponding to the layout of the plurality of light sources 106a, which may be square, rectangular, hexagonal, or another suitable layout.

Figure 2:
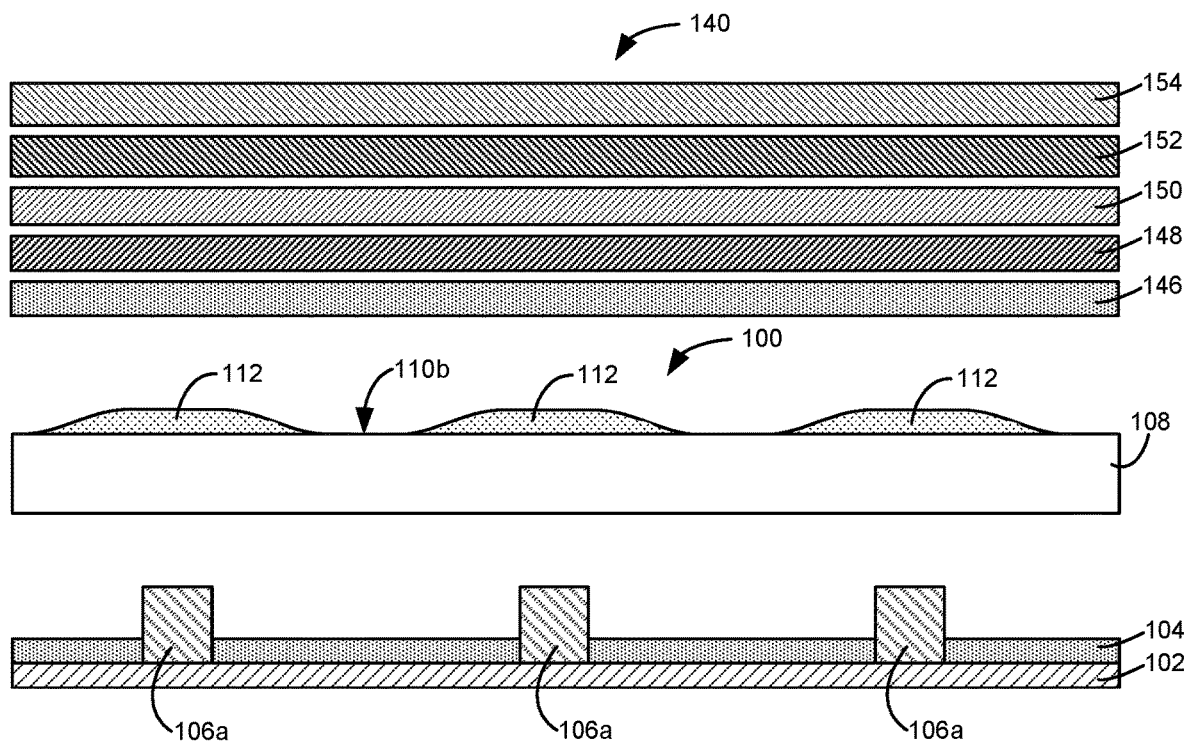
FIG. 2 is a cross-sectional view of an exemplary liquid crystal display (LCD) including the exemplary backlight portion of FIGS. 1A-1C.

FIG. 2 is a cross-sectional view of an exemplary liquid crystal display (LCD) 140. LCD 140 includes a backlight portion 100 including a patterned diffuser 110b as previously described and illustrated with reference to FIGS. 1A-IC. In addition, the backlight of LCD 140 includes optionally a diffuser plate 146 over backlight portion 100, optionally a color conversion layer 148 (e.g., a quantum dot film or a phosphor film) over the diffuser plate 146, optionally a prismatic film 150 over the color conversion layer 148, and optionally a reflective polarizer 152 over the prismatic film 150. LCD 140 also includes a display panel 154 over the reflective polarizer 152 of the backlight. In certain exemplary embodiments, the reflective polarizer 152 may be bonded to the display panel 154.

To maintain the alignment between the light sources 106a and the patterned reflectors 112 on the carrier 108 for the proper functioning of the backlight portion 100, it is advantageous if the carrier 108 and the substrate 102 are made of the same or similar type of material so that both the patterned reflectors 112 on the carrier 108 and the light sources 106a on the substrate 102 are registered well to each other over a large range of operating temperatures. In certain exemplary embodiments, the carrier 108 and the substrate 102 are made of the same plastic material. In other embodiments, the carrier 108 and the substrate 102 are made of the same or similar type of glass.

An alternative solution to keep the carrier 108 and light sources 106a on the substrate 102 in alignment is to use a highly flexible substrate. The highly flexible substrate may be made of a polyimide or other high temperature resistant polymer film to allow component soldering. The highly flexible substrate may also be made of materials such as FR4 or fiberglass, but of a significantly less thickness than usual. In certain exemplary embodiments, an FR4 material of 0.4 millimeters thickness may be used for substrate 102, which may be sufficiently flexible to absorb the dimensional changes resulting from changing operating temperatures.

Figure 3A:
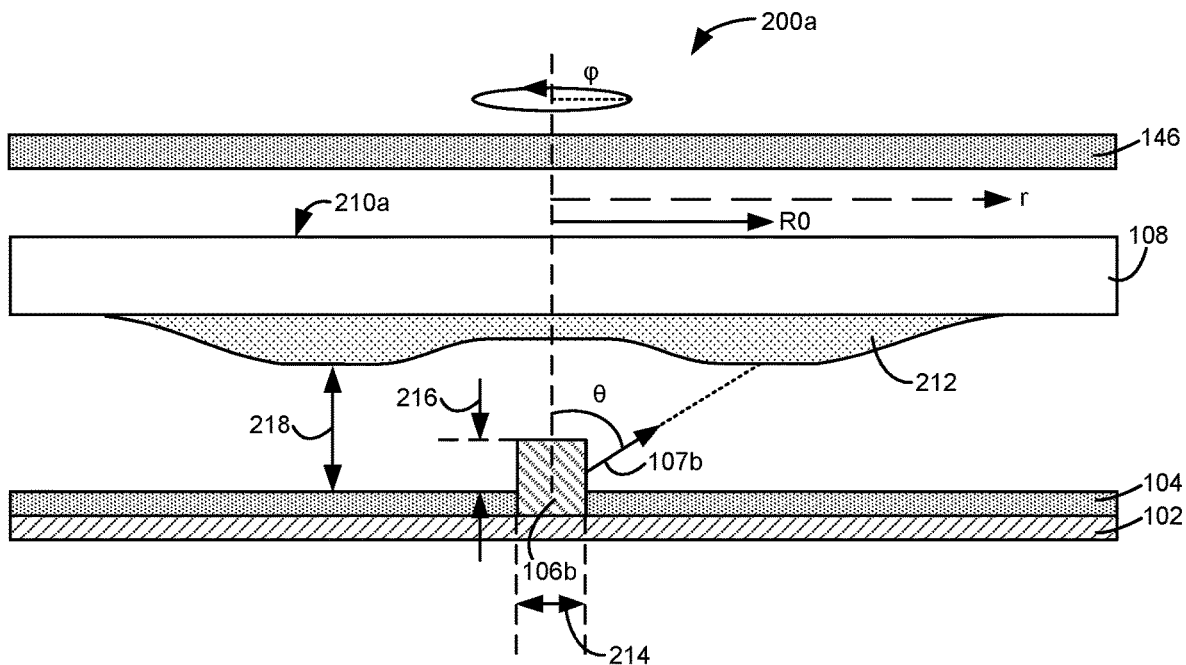
FIGS. 3A-3B are cross-sectional views of exemplary backlights portions including a patterned diffuser.

FIG. 3A is a simplified cross-sectional view of an exemplary backlight portion 200a. Backlight portion 200a is similar to backlight portion 100 previously described and illustrated with reference to FIGS. 1A-IC, except that in backlight portion 200a light sources 106b are used in place of light sources 106a and a patterned diffuser 210a including patterned reflectors 212 is used in place of patterned diffuser 110b. While FIG. 3A illustrates a single light source 106b and a corresponding single patterned reflector 212 for simplicity, it will be understood that backlight portion 200a may include any suitable number of light sources 106b and corresponding patterned reflectors 212. Backlight portion 200a may include a substrate 102 and a reflective layer 104 as previously described and illustrated with reference to FIGS. 1A-1C. In addition, backlight portion 200a includes the first layer (e.g., 146) of an optical film stack (not shown) over the carrier 108. The first layer of the optical film stack may be a diffuser plate, a color conversion layer, a prismatic film, or another suitable plate or film. In this embodiment, each patterned reflector 212 is on a first surface of the carrier 108, where the first surface of the carrier faces the plurality of light sources 106b.

Each light source 106b emits a peak intensity ray as indicated at 107b along an off-axis angle θ (i.e., off the axis that is normal to the plane in which the plurality of light sources 106b are arranged) greater than about 10 degrees. In certain exemplary embodiments, the off-axis angle θ is within a range between about 10 degrees and about 80 degrees, such as within a range between about 20 degrees and about 60 degrees. Each patterned reflector 212 includes a spatial transmittance or a spatial reflectance. The peak intensity ray 107b of the corresponding light source 106b intercepts the corresponding patterned reflector 212 at a radial position r equal to R0. The radial position r is measured in a plane of the corresponding patterned reflector (along the width or diameter of the patterned reflector) and from a center of the corresponding patterned reflector 212. The reflectance is greater or the transmittance is less where r satisfies R0−50%*R0≤r≤R0+50%*R0 than at r equal to 0. In certain exemplary embodiments, the reflectance is a maximum or the transmittance is a minimum where r satisfies R0−50%*R0≤r≤R0+50%*R0. In another embodiment, the reflectance is greater or the transmittance is less where r satisfies R0−20%*R0≤r≤R0+20%*R0 than at r equal to 0. In other embodiments, the reflectance is greater or the transmittance is less where r satisfies R0−50%*R0≤r≤R0+50%*R0 than at r greater than R0+50%.

In certain exemplary embodiments, each light source 106b is a mini-LED having a height of about 200 micrometers or less and a width or diameter of about 500 micrometers or less. When the optical distance between the reflective layer 104 and the bottom surface of the patterned diffuser 210a is about 0.5, 1.0, or 2.0 millimeters or greater, R0 may be approximated as R0=OD*tan(θ), where OD (indicated at 218) is an optical distance between the reflective layer 104 and the patterned reflector 212. In other embodiments, R0=S0/2+(OD−h0/2)*tan(θ), where S0 is a width (or diameter) of the corresponding light source 106b and h0 (indicated at 216) is a height of the corresponding light source above the reflective layer 104. The light source 106b may have a different size in a different plane that contains the normal direction and the ray 107b.

In the embodiment illustrated in FIG. 3A, each patterned reflector 212 includes a spatial thickness profile in which a maximum thickness of each patterned reflector is located where the peak intensity ray 107b of the corresponding light source 106b intercepts the corresponding patterned reflector 212. In other embodiments, each patterned reflector 212 includes a spatial color coordinate x in which a maximum color coordinate x of each patterned reflector is located where the peak intensity ray 107b of the corresponding light source 106b intercepts the corresponding patterned reflector 212. In another embodiment, each patterned reflector 212 includes a spatial color coordinate y in which a maximum color coordinate y of each patterned reflector is located where the peak intensity ray 107b of the corresponding light source 106b intercepts the corresponding patterned reflector 212. In another embodiment, each patterned reflector 212 includes a spatial thickness profile, a spatial color coordinate x, and a spatial color coordinate y in which a maximum thickness, a maximum color coordinate x, and a maximum color coordinate y of each patterned reflector are located where the peak intensity ray 107b of the corresponding light source 106b intercepts the corresponding patterned reflector 212. As used herein, the spatial color coordinates x and y are defined according to the 1931 CIE color space. Different color spaces can be used to quantify the color, and any other color space can be converted into the 1931 CIE color space. The spatial color coordinates x and y are denoted as Cx and Cy, respectively, in FIGS. 11A-23E.

Figure 3B:
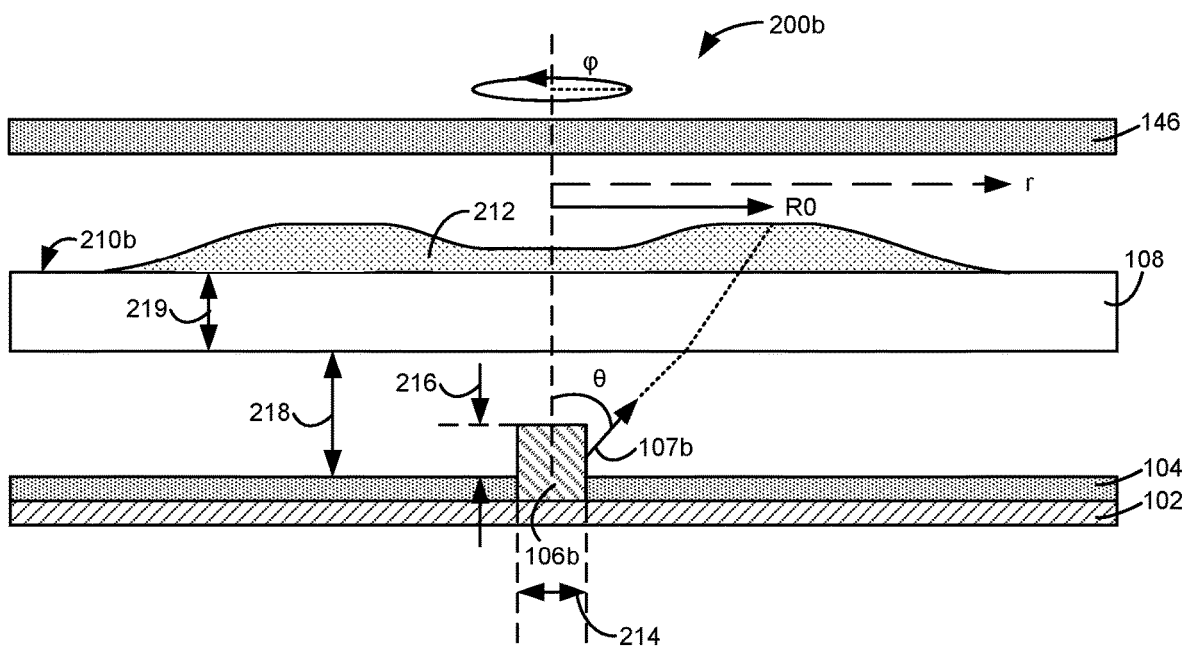

FIG. 3B is a simplified cross-sectional view of an exemplary backlight portion 200b. Backlight portion 200b is similar to backlight portion 200a previously described and illustrated with reference to FIGS. 3A, except that in backlight portion 200b the patterned diffuser 210b includes each patterned reflector 212 on a surface of the carrier 108 facing away from the plurality of light sources 106b. In this embodiment, R0=S0/2+(OD−h0/2)*tan(θ)+hg*sin(θ)/sqrt(n*n−sin(θ)*sin(θ)), where S0 (indicated at 214) is a width (or diameter) of the corresponding light source 106b, h0 (indicated at 216) is a height of the corresponding light source above the reflective layer 104, OD (indicated at 218) is an optical distance between the reflective layer and the carrier 108, hg (indicated at 219) is a thickness of the carrier, n is a refractive index of the carrier, and θ is the off-axis angle of the peak intensity ray 107b of the corresponding light source.

The peak intensity ray, though described in one cross-section, can vary with the azimuthal angle φ. That is, the off-axis angle θ of the peak intensity array is a function of the azimuthal angle φ for a light source having a three-dimensional solid shape. Each peak intensity ray at every azimuthal angle φ intercepts the patterned reflector at a radial position r=R0(φ), which is a function of the azimuthal angle φ. In the plane of the patterned reflector, the collection of R0 at all azimuthal angle φ that varies between 0 degrees and 360 degrees forms a ring around the center of the patterned reflector. The shape of the ring may be elliptical, circular, or another suitable shape. Thus, a set of radial positions r equal to R0 corresponding to azimuthal angles φ in a plane that contains the plurality of light sources 106b surrounds the center of each corresponding patterned reflector 212 and where the reflectance is greater or the transmittance is less where r satisfies R0(φ)−50%*R0(φ)≤r≤R0(φ)+50%*R0(φ) and 0° ≤φ≤360° than at r equal to 0.

Figure 4:
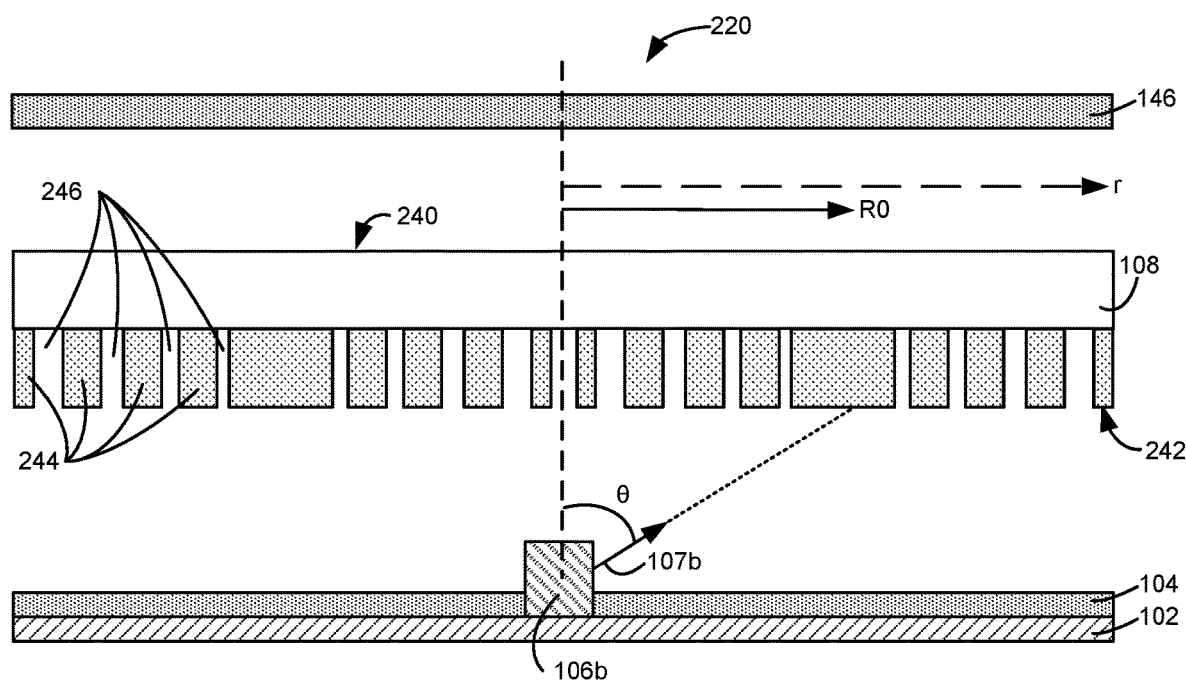
FIG. 4 is a cross-sectional view of another exemplary backlight portion including a patterned diffuser.

FIG. 4 is a simplified cross-sectional view of another exemplary backlight portion 220. Backlight portion 220 is similar to backlight portion 200a previously described and illustrated with reference to FIGS. 3A, except that backlight portion 220 includes a patterned diffuser 240 where patterned reflectors 242 are used in place of patterned reflectors 212. In one embodiment, each patterned reflector 242 includes a plurality of solid sections, indicated for example at 244, and a plurality of open sections, indicated for example at 246, interleaved with the plurality of solid sections 244. Each solid section 244 and each open section 246 may be ring-like, such as circular, elliptical, or another suitable shape aligned with the corresponding light source 106b. In another embodiment, each patterned reflector 242 includes a plurality of openings (e.g., cylindrical openings), indicated for example at 246. Openings 246 located the same distance from the center of each patterned reflector 242 may be in ring-like arrangements, such as circular, elliptical, or another suitable shape aligned with the corresponding light source 106b.

A spatial opening aperture ratio A(r) of each solid section 244 may equal As(r)/(As(r)+Ao(r)), where r is the distance from the center of the corresponding patterned reflector 242, As(r) is the area of the corresponding solid section 244, and Ao(r) is the area of the corresponding open section 246. In this embodiment, each patterned reflector 242 includes a spatial opening aperture ratio profile in which a minimum opening aperture ratio of each patterned reflector is located where the peak intensity ray 107b of the corresponding light source 106b intercepts the corresponding patterned reflector.

Each patterned reflector 242 includes a pattern of reflective material to create a variable diffusive reflector. The reflective material may include, for example, metallic foils, such as silver, platinum, gold, copper, and the like; dielectric materials (e.g., polymers such as PTFE); porous polymer materials, such as PET, PMMA, PEN, PES, etc., multi-layer dielectric interference coatings, or reflective inks, including white inorganic particles such as titania, barium sulfate, etc., or other materials suitable for reflecting light.

Each patterned reflector 242 may be formed, for example, by printing (e.g., inkjet printing, screen printing, microprinting, etc.) a pattern with white ink, black ink, metallic ink, or other suitable ink. Each patterned reflector 242 may also be formed by first depositing a continuous layer of a white or metallic material, for example by physical vapor deposition (PVD) or any number of coating techniques such as for example slot die or spray coating, and then patterning the layer by photolithography or other known methods of area-selective material removal.

The embodiments of FIGS. 3A-4 may be modified to include an encapsulation layer over the light sources 106b. The encapsulation layer may be a plane layer or a spherical dome. In this case, the radial position R0 may be different due to the refractive index of the encapsulation layer. In other embodiments, the carrier 108 may be excluded and the patterned reflectors 212 or 242 may be on the encapsulation layer over the light sources 106b. In yet other embodiments, the carrier may be the encapsulation layer located over the light sources 106b. Again, in this case, the radial position R0 may be different due to the refractive index of the encapsulation layer.

Figure 5:
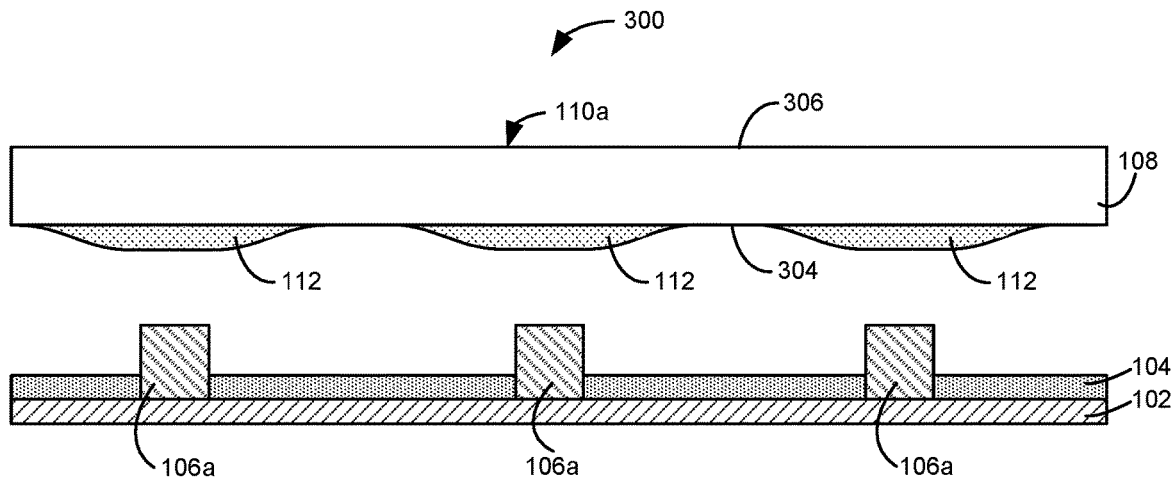
FIG. 5 is a cross-sectional view of an exemplary backlight portion including a patterned diffuser.

FIG. 5 is a cross-sectional view of an exemplary backlight portion 300. Backlight portion 300 is similar to backlight portion 100 previously described and illustrated with reference to FIGS. 1A-IC, except that in backlight portion 300 each patterned reflector 112 faces the corresponding light source 106a. Backlight portion 300 may include a substrate 102, a reflective layer 104, and a plurality of light sources 106a as previously described and illustrated with reference to FIGS. 1A-IC. In this embodiment, a patterned diffuser 110a includes a carrier 108 (e.g., a light guide plate) having a first surface 304 and a second surface 306 opposite to the first surface. The plurality of patterned reflectors 112 are on the first surface 304 of the carrier 108, where the first surface 304 of the carrier faces the plurality of light sources 106a.

Figure 6A:
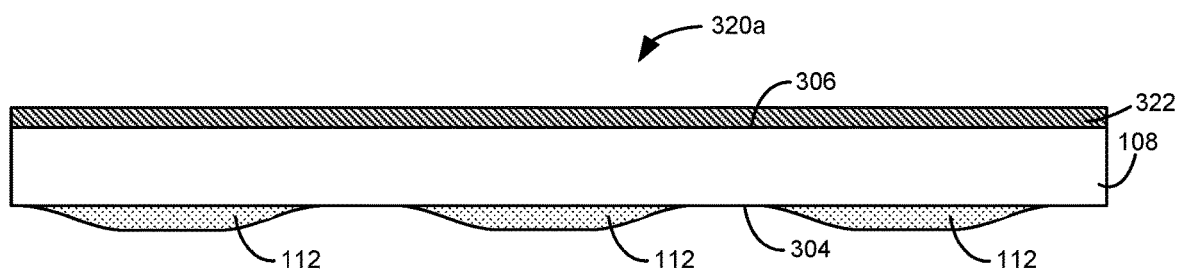
FIGS. 6A and 6B are cross-sectional views of exemplary patterned diffusers.

FIG. 6A is a cross-sectional view of an exemplary patterned diffuser 320a. Patterned diffuser 320a is similar to patterned diffuser 110a previously described and illustrated with reference to FIG. 5, except that patterned diffuser 320a includes a diffusive layer 322. Diffusive layer 322 is on the second surface 306 of the carrier 108. Patterned diffuser 320a is configured to be arranged with the first surface 304 of the carrier 108 facing the plurality of light sources 106a within a backlight. In another embodiment, diffusive layer 322 may be arranged between the first surface 304 of the carrier 108 and the plurality of patterned reflectors 112.

Diffusive layer 322 faces away from the plurality of light sources 106a (not shown) within a backlight. Diffusive layer 322 improves the lateral spreading of the light emitted from the light sources 106a, thereby improving light uniformity. The diffusive layer 322 may have specular and diffuse reflectance and specular and diffuse transmittance. The specular reflectance or transmittance is the percent of reflected or transmitted light along the specular direction with 0 or 8 degrees depending on the measurement setup, while the diffuse reflectance or transmittance is the percent of reflected or transmitted light excluding the specular reflectance or transmittance. The diffusive layer 322 may have a haze and a transmittance. The diffusive layer 322 may have a haze, for example, of about 10, 20, 30, 40, 50, 60, 70, 80, 90, 95, or 99 percent or greater, and a transmittance of about 20, 30, 40, 50, 60, 70, 80, 90, or 95 percent or greater. In certain exemplary embodiments, the diffusive layer 322 has a haze of about 70 percent and a total transmittance of about 90 percent. In other embodiments, the diffusive layer 322 has a haze of about 88 percent and a total transmittance of about 96 percent. In other embodiments, the diffusive layer 322 has a haze of about 99 percent and a total transmittance of about 10, 20, 30, 40, 50, 60, 70, 80, or 90 percent. Haze is defined as the percent of transmitted light that is scattered so that its direction deviates more than 2.5 degrees from the direction of the incident beam, and transmittance is defined as the percent of transmitted light, per American Society for Testing and Materials (ASTM) D1003 "Standard Test Method for Haze and Luminous Transmittance of Transparent Plastics." Haze and transmittance can be measured by various haze meters.

Diffusive layer 322 diffuses rays from light sources 106a. As a result, the patterned reflectors 112 of the backlight may be thinner than a patterned reflector of a backlight not including diffusive layer 322 while still effectively hiding the light sources 106a. Diffusive layer 322 also diffuses rays that otherwise would undergo total internal reflection. In addition, diffusive layer 322 diffuses any rays that are reflected back by the color conversion layer, diffuser sheet, or diffuser plate (e.g., 146 of FIG. 2) within a backlight. Thus, the diffusive layer 322 increases the light recycling effect caused by the color conversion layer, diffuser sheet, or diffuser plate and any prismatic films over the diffuser plate or diffuser sheet, such as one or two brightness enhancement films.

In certain exemplary embodiments, diffusive layer 322 includes a uniform or continuous layer of scattering particles. Diffusive layer 322 is considered to include a uniform layer of scattering particles where the distance between neighboring scattering particles is less than one fifth the size of the light source. Regardless of the location of diffusive layer 322 relative to the light source, diffusive layer 322 exhibits a similar diffusive property. The scattering particles may, for example, be within a clear or white ink that includes micro-sized or nano-sized scattering particles, such as alumina particles, $TiO_2$ particles, PMMA particles, or other suitable particles. The particle size may vary, for example, within a range from about 0.1 micrometers and about 10.0 micrometers. In other embodiments, diffusive layer 322 may include an anti-glare pattern. The anti-glare pattern may be formed of a layer of polymer beads or may be etched. In this embodiment, diffusive layer 322 may have a thickness, for example, of about 1, 3, 7, 14, 21, 28, or 50 micrometers, or another suitable thickness.

In certain exemplary embodiments, diffusive layer 322 may include a pattern that may be applied to the carrier 108 via screen printing. The diffusive layer 322 may be screen printed on a primer layer (e.g., an adhesive layer) applied to the carrier 108. In other embodiments, diffusive layer 322 may be applied to the carrier 108 by laminating the diffusive layer to the carrier via an adhesive layer. In yet other embodiments, diffusive layer 322 may be applied to the carrier 108 by embossing (e.g., thermal or mechanical embossing) the diffusive layer into the carrier, stamping (e.g., roller stamping) the diffusive layer into the carrier, or injection molding the diffusive layer. In yet other embodiments, diffusive layer 322 may be applied to the carrier 108 by etching (e.g., chemical etching) the carrier. In some embodiments, diffusive layer 322 may be applied to the carrier 108 with a laser (e.g., laser damaging).

In yet other embodiments, diffusive layer 322 may include a plurality of hollow beads. The hollow beads may be plastic hollow beads or glass hollow beads. The hollow beads, for example, may be glass bubbles available from 3M Company under the trade designations "3M GLASS BUBBLES iM30K". These glass bubbles have glass compositions including $SiO_2$ in a range from about 70 to about 80 percent by weight, alkaline earth metal oxide in a range from about 8 to about 15 percent by weight, and alkali metal oxide in a range from about 3 to about 8 percent by weight, and $B_2O_3$ in a range from about 2 to about 6 percent by weight, where each percent by weight is based on the total weight of the glass bubbles. In certain exemplary embodiments, the size (i.e., diameter) of the hollow beads may vary, for example, from about 8.6 micrometers to about 23.6 micrometers, with a median size of about 15.3 micrometers. In another embodiment, the size of the hollow beads may vary, for example, from about 30 micrometers to about 115 micrometers, with the median size of about 65 micrometers. In yet other embodiments, diffusive layer 322 may include a plurality of nano-sized color conversion particles such as red and/or green quantum dots or other suitable phosphor particles. In yet other embodiments, diffusive layer 322 may include a plurality of hollow beads, nano-sized scattering particles, and nano-sized color conversion particles such as red and/or green quantum dots or other suitable phosphor particles, such as potassium fluorosilicate (PFS)-based phosphors.

The hollow beads may first be uniformly mixed with a solvent (e.g., Methyl Ethyl Ketone (MEK)), subsequently mixed with any suitable binder (e.g., Methyl methacrylate and silica), and then fixed by thermal or ultraviolet (UV) curing if necessary to form a paste. The paste may then be deposited onto the surface of the carrier 108 through slot coating, screen printing, or any other suitable means to form the diffusive layer 322. In this embodiment, the diffusive layer 322 may have a thickness, for example, between about 10 micrometers and about 100 micrometers. In another example, the diffusive layer 322 may have a thickness between about 100 micrometers and about 300 micrometers. Multiple coatings may be used to form a thick diffusive layer if needed. In each example, the haze of the diffusive layer 322 may be more than 99 percent as measured with a haze meter such as BYK-Gardner's Haze-Gard. Two advantages of using hollow beads within diffusive layer 322 includes 1) reducing the weight of the diffusive layer 322; and 2) achieving a desired haze level at a small thickness.

Figure 6B:
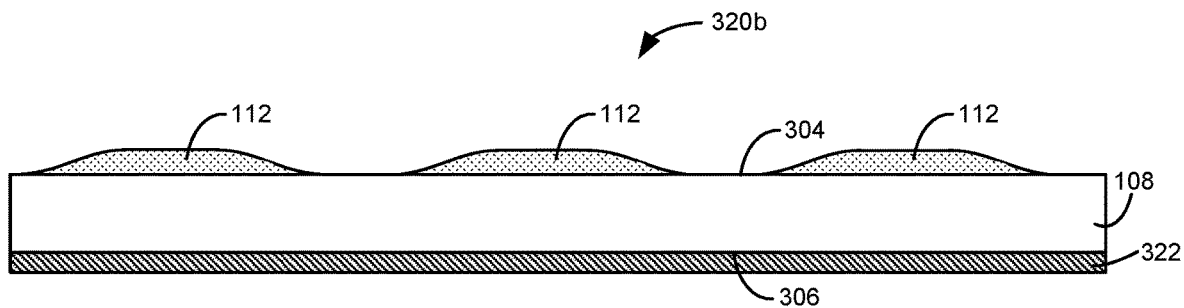

FIG. 6B includes a cross-sectional view of an exemplary patterned diffuser 320b. Patterned diffuser 320b is similar to patterned diffuser 320a previously described and illustrated with reference to FIG. 6A, except that patterned diffuser 320b is configured to be arranged with the first surface 304 of the carrier 108 facing away from the plurality of light sources 106a within a backlight.

Figure 7A:
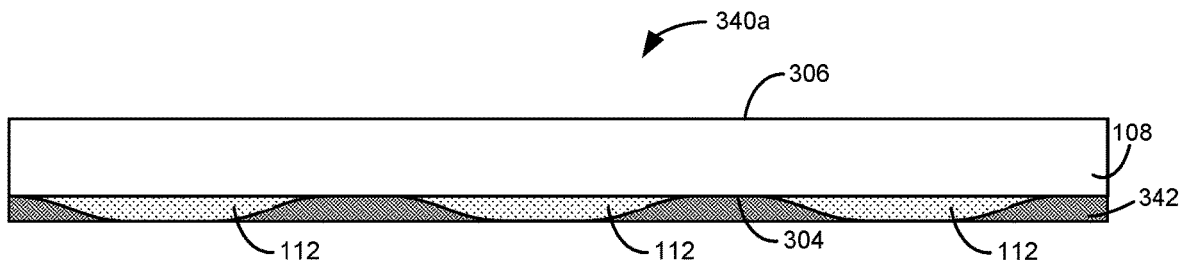
FIGS. 7A and 7B are cross-sectional views of other exemplary patterned diffusers.

FIG. 7A is a cross-sectional view of another exemplary patterned diffuser 340a. Patterned diffuser 340a is similar to patterned diffuser 110a previously described and illustrated with reference to FIG. 5, except that patterned diffuser 340a includes an encapsulation layer 342. Encapsulation layer 342 is on the first surface 304 of the carrier 108 and encapsulates each of the plurality of patterned reflectors 112. Patterned diffuser 340a is configured to be arranged with the first surface 304 of the carrier 108 facing the plurality of light sources 106a within a backlight. The encapsulation layer 342 may include a clear resin material, a silicone, or another suitable material. The clear resin material, silicone, or another suitable material should have a transmittance of over about 60 percent and preferably over about 90 percent. The encapsulation layer 342 may include nano-sized or micro-sized scattering particles.

Figure 7B:
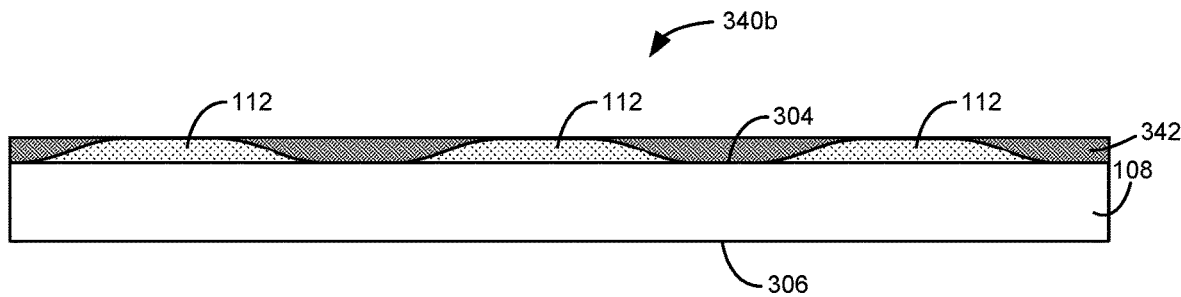

FIG. 7B is a cross-sectional view of another exemplary patterned diffuser 340b. Patterned diffuser 340b is similar to patterned diffuser 340a previously described and illustrated with reference to FIG. 7A, except that patterned diffuser 340b is configured to be arranged with the first surface 304 of the carrier 108 facing away from the plurality of light sources 106a within a backlight.

Figure 8A:
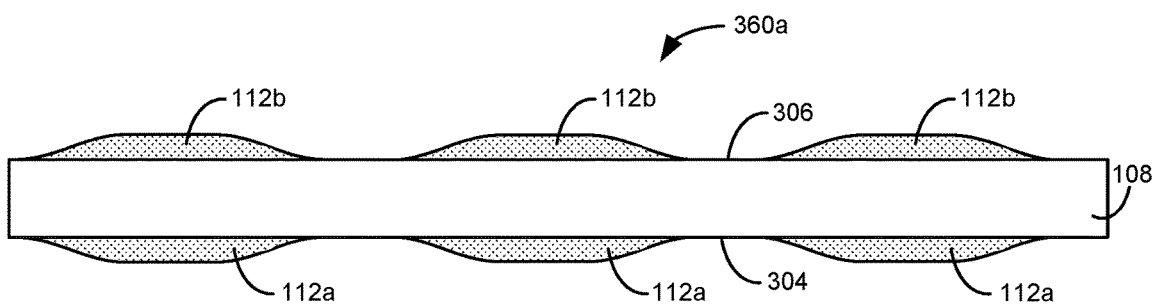
FIGS. 8A and 8B are cross-sectional views of other exemplary patterned diffusers.

FIG. 8A is a cross-sectional view of another exemplary patterned diffuser 360a. Patterned diffuser 360a is similar to patterned diffuser 110a previously described and illustrated with reference to FIG. 5, except that patterned diffuser 360a includes a plurality of patterned reflectors 112 on both the first surface 304 and the second surface 306 of the carrier 108. Patterned diffuser 360a includes a plurality of first patterned reflectors 112a on the first surface 304 of the carrier 108. Each first patterned reflector 112a is configured to be aligned with a corresponding light source 106a within a backlight. Patterned diffuser 360a also includes a plurality of second patterned reflectors 112b on the second surface 306 of the carrier 108. Each second patterned reflector 112b is configured to be aligned with a corresponding light source 106a within a backlight. Patterned diffuser 360a may be arranged with either the first surface 304 or the second surface 306 of the carrier 108 facing the plurality of light sources 106a within a backlight. First patterned reflectors 112a and second patterned reflectors 112b may or may not be the same.

Figure 8B:
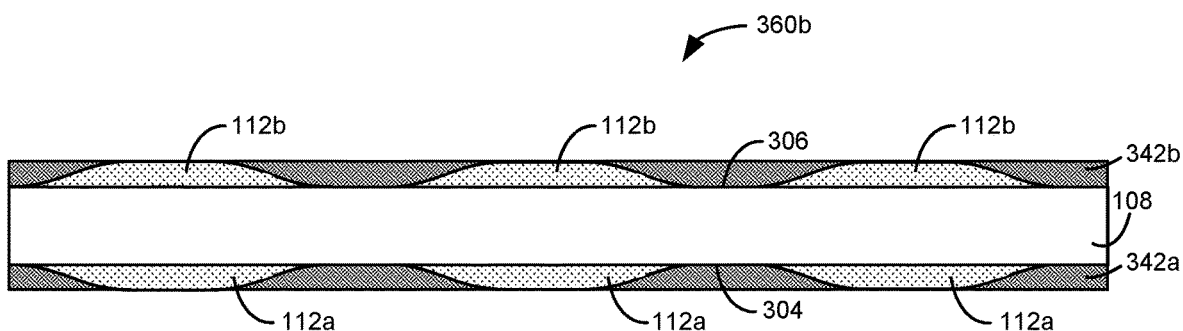

FIG. 8B is a cross-sectional view of another exemplary patterned diffuser 360b. Patterned diffuser 360b is similar to patterned diffuser 360a previously described and illustrated with reference to FIG. 8A, except that patterned diffuser 360b includes encapsulation layers 342a and 342b. Encapsulation layer 342a is on the first surface 304 of the carrier 108 and encapsulates each of the plurality of first patterned reflectors 112a. Encapsulation layer 342b is on the second surface 306 of the carrier 108 and encapsulates each of the plurality of second patterned reflectors 112b. Each encapsulation layer 342a and 342b may include a clear resin material, a silicone, or another suitable material. Patterned diffuser 360b may be arranged with either the first surface 304 or the second surface 306 of the carrier 108 facing the plurality of light sources within a backlight.

Figure 9A:
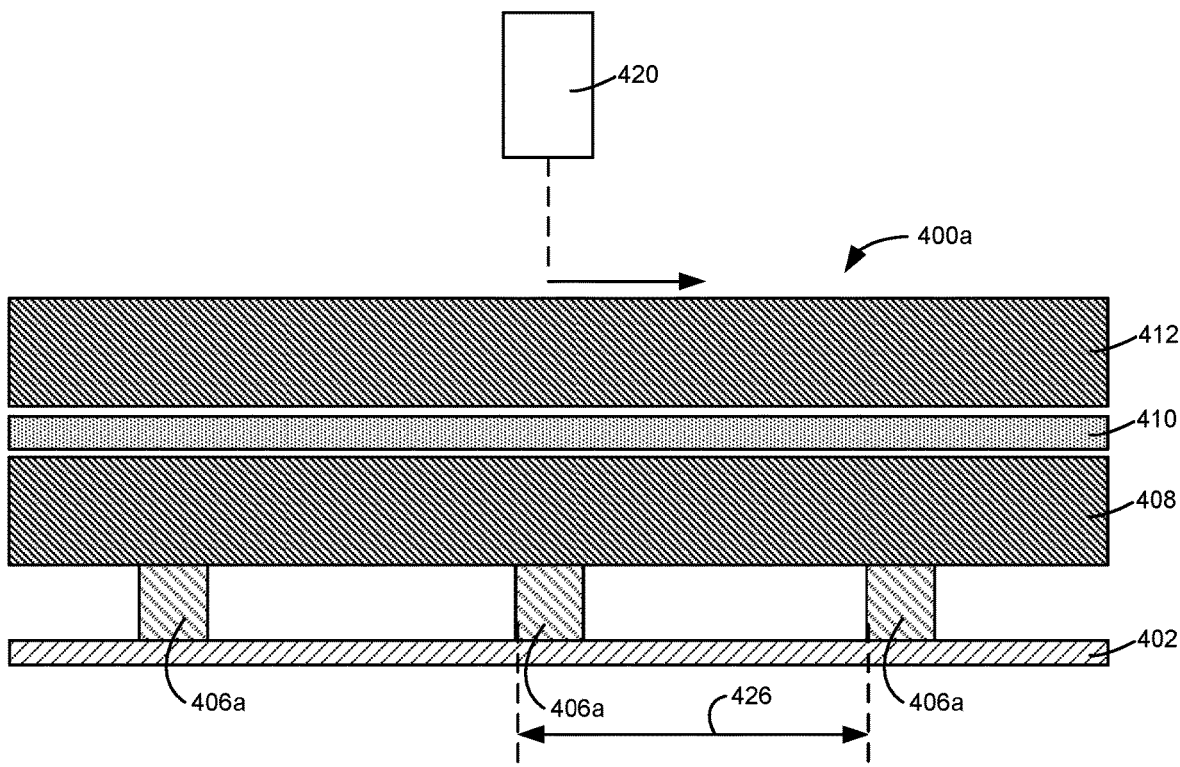
FIGS. 9A and 9B are cross-sectional views of exemplary spatially uniform and angularly Lambertian light sources with a detector that measures spatial luminance and color coordinates.

FIG. 9A is a cross-sectional view of an exemplary spatially uniform and angularly Lambertian light source 400a with a detector 420 that measures spatial luminance and color coordinates. Spatially uniform and angularly Lambertian light source 400a includes a substrate 402, a plurality of light sources 406a, a first volume diffuser plate 408, a film stack 410, and a second volume diffuser plate 412. Film stack 410 may include a color conversion layer, one or two prismatic films, and/or one or two diffusive sheets.

The plurality of light sources 406a are arranged on substrate 402 and are in electrical communication with the substrate 402. In certain exemplary embodiments, each of the plurality of light sources 406a is a blue light emitting diode (LED). The first volume diffuser plate 408 is arranged over the plurality of light sources 406a. In certain exemplary embodiments, an optical adhesive (not shown) may be used to couple the plurality of light sources 406a to the first volume diffuser plate 408. The film stack 410 is arranged over the first volume diffuser plate 408. The second volume diffuser plate 412 is arranged over the film stack 410.

The pitch P between adjacent light sources 406a is indicated at 426. While the pitch is illustrated along one direction in FIG. 9A, the pitch may be different in a direction orthogonal to the direction illustrated. The pitch may, for example, be about 5, 2, 1, or 0.5 millimeters or less than about 0.5 millimeters. The first volume diffuser plate 408 and the second volume diffuser plate 412 may each, for example, have a thickness of about 3 millimeters. Detector 420 is configured to measure spatial luminance and color coordinates. Detector 420 may, for example, be a ProMetric® Imaging Colorimeter (Model IC-PMI16) from Radiant Vision Systems or another equivalent instrument.

Figure 9B:
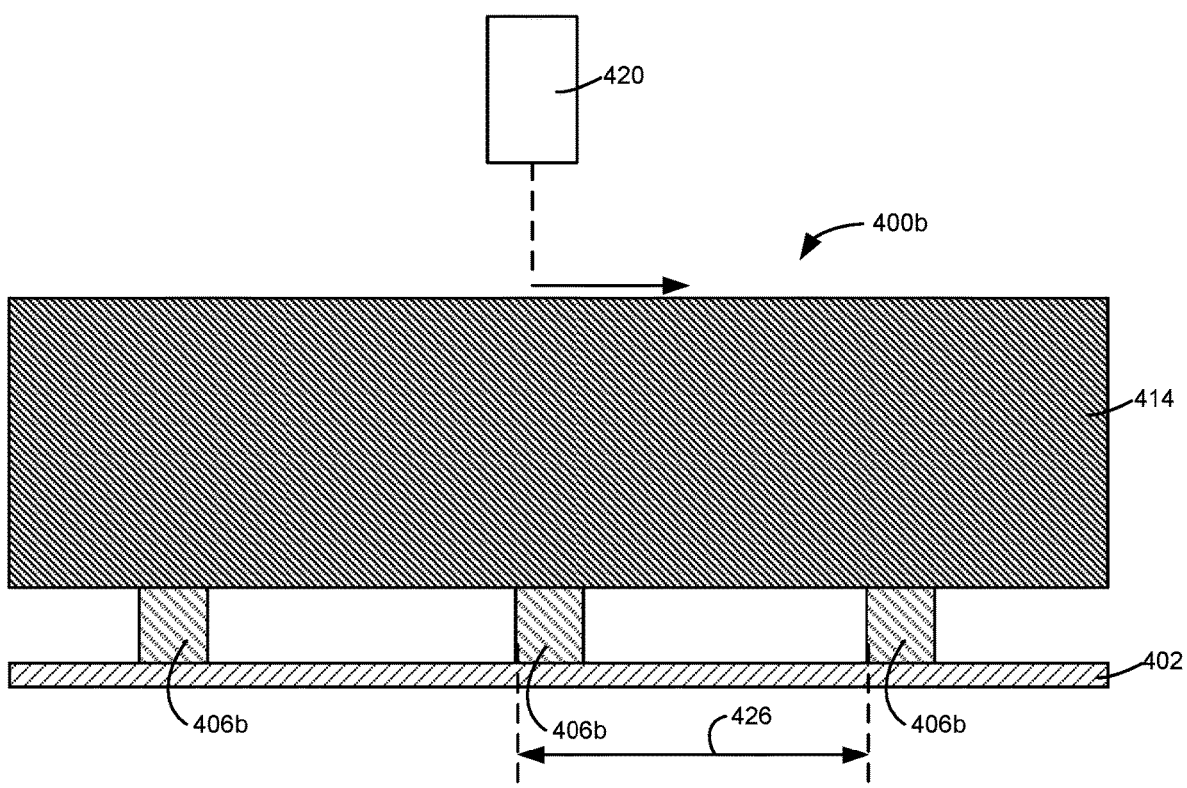

FIG. 9B is a cross-sectional view of another exemplary spatially uniform and angularly Lambertian light source 400b with a detector 420 that measures spatial luminance and color coordinates. Spatially uniform and angularly Lambertian light source 400b includes a substrate 402, a plurality of light sources 406b, and volume diffuser plate 414. The plurality of light sources 406b are arranged on substrate 402 and are in electrical communication with the substrate 402. In certain exemplary embodiments, each of the plurality of light sources 406b is a white LED. The volume diffuser plate 414 is arranged over the plurality of light sources 406b. In certain exemplary embodiments, an optical adhesive (not shown) may be used to couple the plurality of light sources 406b to the volume diffuser plate 414.

The pitch P between adjacent light sources 406b is indicated at 426. While the pitch is illustrated along one direction in FIG. 9B, the pitch may be different in a direction orthogonal to the direction illustrated. The pitch may, for example, be about 5, 2, 1, or 0.5 millimeters or less than about 0.5 millimeters. The volume diffuser plate 414 may, for example, have a thickness of about 6 millimeters. In certain exemplary embodiments, volume diffuser plate 414 may be replaced with two or more volume diffuser plates having an overall thickness equal to the thickness of volume diffuser plate 414.

While two exemplary spatially uniform and angularly Lambertian light sources 400a and 400b have been described and illustrated, spatially uniform and angularly Lambertian light sources having other configurations may be used herein.

Figure 10A:
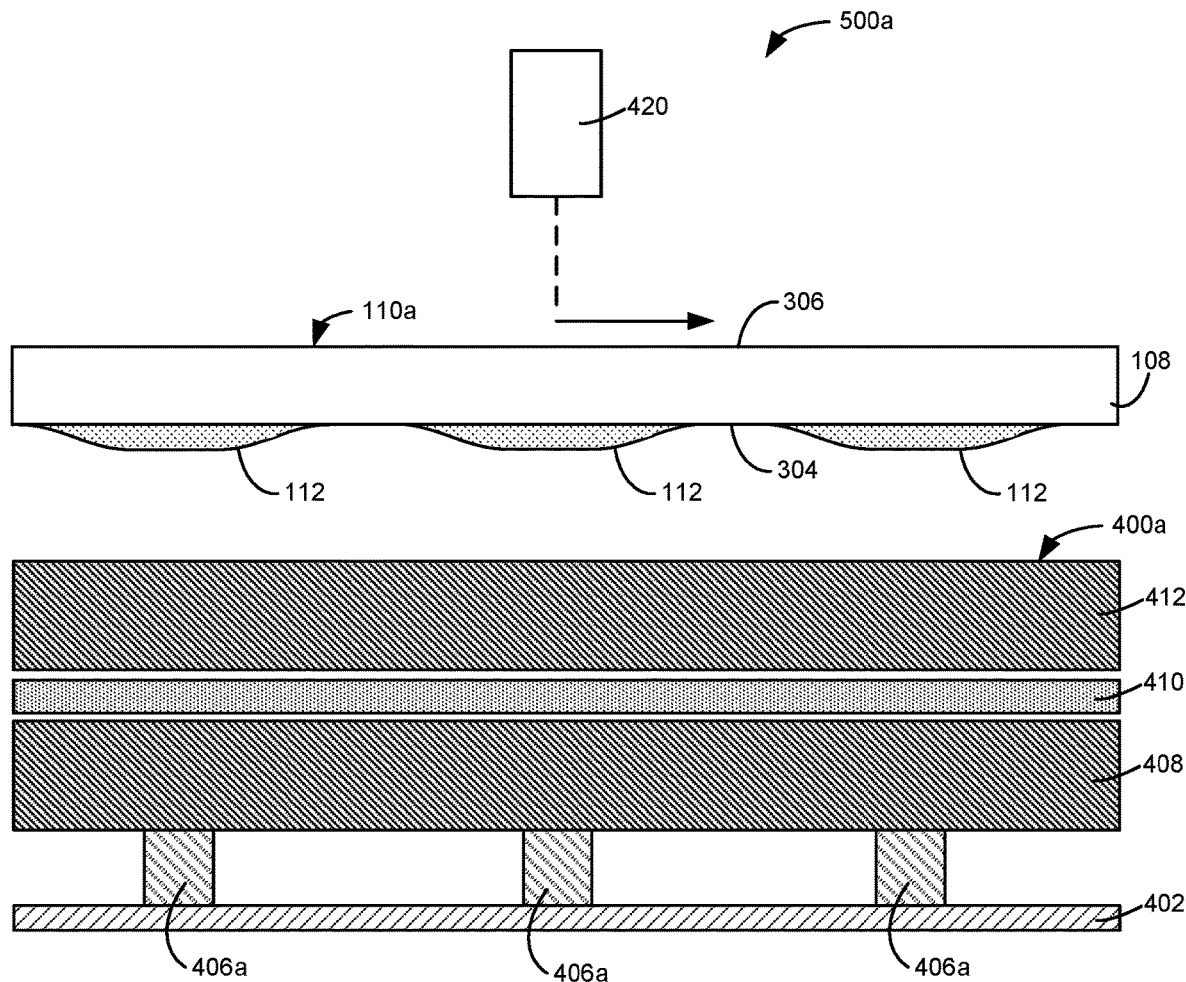
FIGS. 10A and 10B are cross-sectional views of an exemplary spatially uniform and angularly Lambertian light source with an exemplary patterned diffuser and a detector that measures spatial luminance and color coordinates.

FIG. 10A is a cross-sectional view of an exemplary measurement setup 500a including a spatially uniform and angularly Lambertian light source 400a with an exemplary patterned diffuser 110a and a detector 420. In this embodiment, patterned diffuser 110a is arranged such that the first surface 304 of the carrier 108 faces the spatially uniform and angularly Lambertian light source 400a. Detector 420 is configured to measure spatial luminance and color coordinates of a patterned reflector 112 on the carrier 108.

Figure 10B:
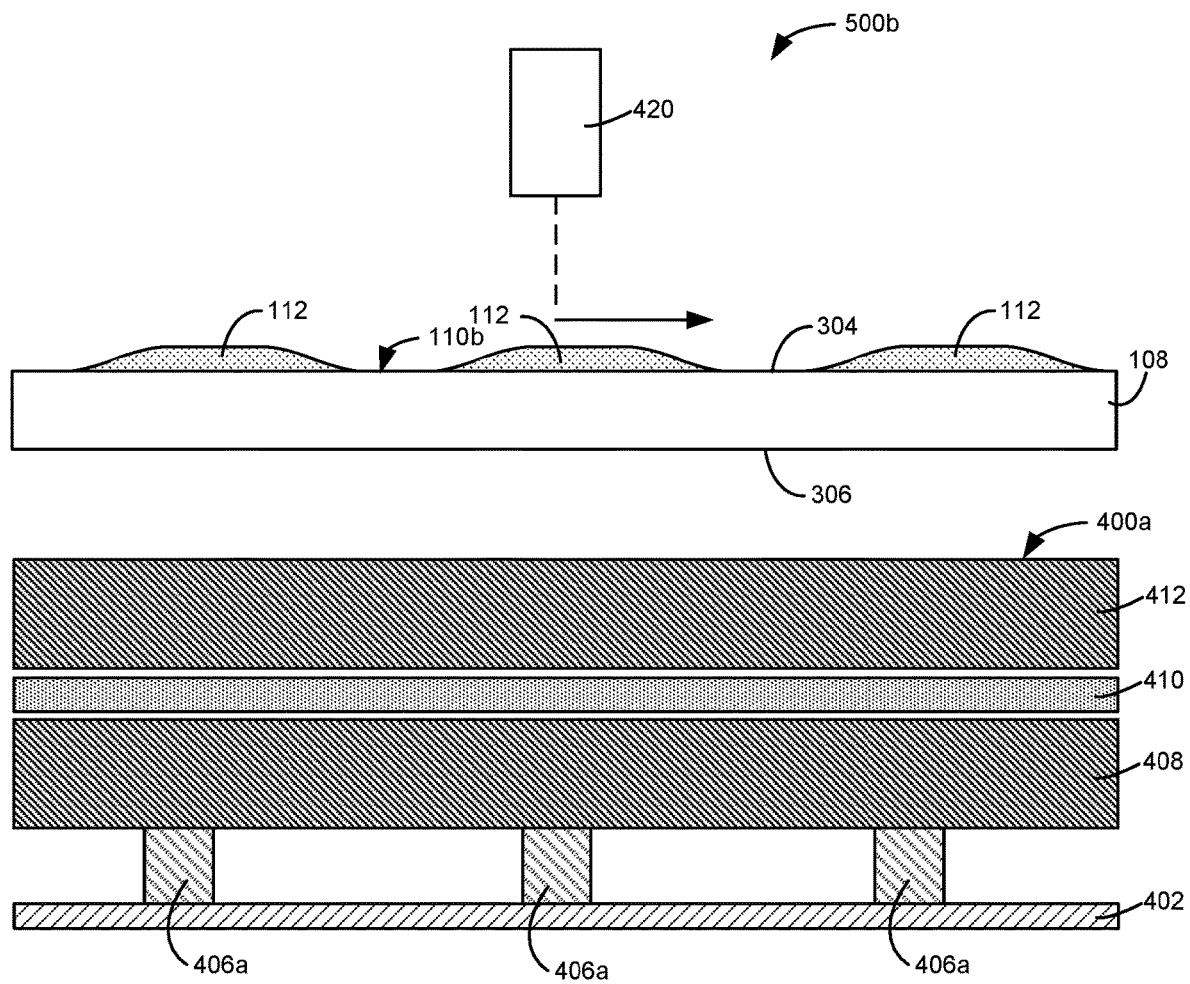

FIG. 10B is a cross-sectional view of an exemplary measurement setup 500b including a spatially uniform and angularly Lambertian light source 400a with an exemplary patterned diffuser 110b and a detector 420. In this embodiment, patterned diffuser 110b is arranged such that the first surface 304 of the carrier 108 faces away from the spatially uniform and angularly Lambertian light source 400a. Detector 420 is configured to measure spatial luminance and color coordinates of a patterned reflector 112 on the carrier 108.

While FIGS. 10A and 10B illustrate measurement setups using spatially uniform and angularly Lambertian light source 400a to measures spatial luminance and color coordinates of a patterned reflector 112 on the carrier 108, in other embodiments spatially uniform and angularly Lambertian light source 400b or an equivalent light source may be used. In addition, while patterned diffuser 110a/110b is illustrated in FIGS. 10A and 10B, a similar measurement setup may be used for other patterned diffusers, such as patterned diffusers 210a/210b, 240, 320a/320b, 340a/340b, 360a, and 360b previously described. The following charts of FIGS. 11A-11C through FIGS. 23A-23E include measurements determined using the measurement setup 500a and 500b of FIGS. 10A and 10B.

Figure 11A:
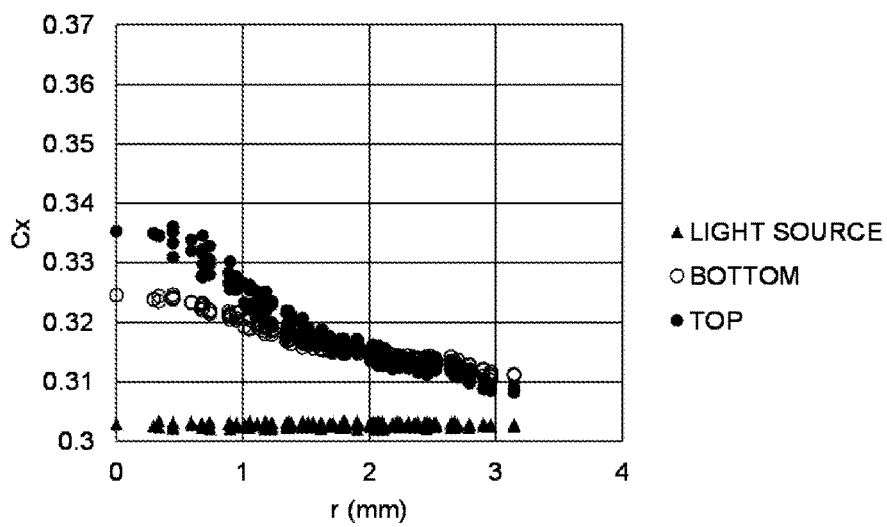
FIGS. 11A-11C are charts of the measured spatial distribution $Cx(r)$, the measured spatial distribution $Cy(r)$, and the measured spatial distribution $Luminance(r)$, respectively, for an exemplary light source and two orientations of an exemplary patterned diffuser.
Figure 11B:
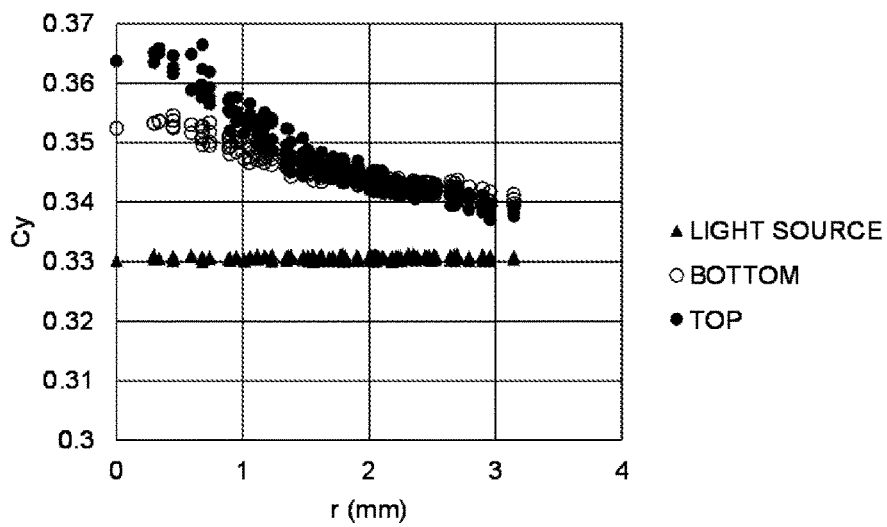
Figure 11C:
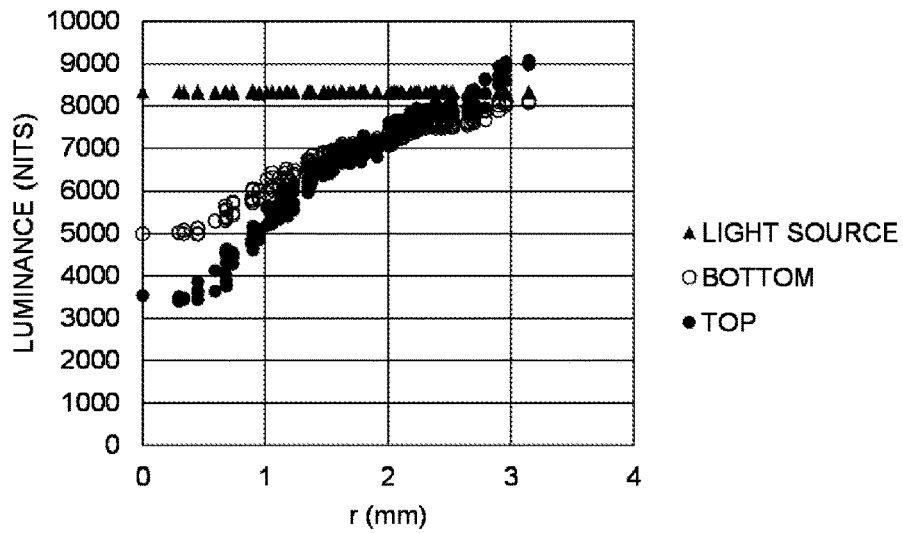

FIGS. 11A-11C are charts of the measured spatial color coordinate Cx(r), the measured spatial color coordinate Cy(r), and the measured spatial Luminance(r), respectively, for an exemplary angularly Lambertian light source 400a and two orientations of an exemplary patterned diffuser (e.g., 110a/110b), where r is a radial position. The radial position r is measured in millimeters relative to a center of a patterned reflector 112 ranging from 0 corresponding to the center of the patterned reflector to rmax corresponding to a maximum radial position of the patterned reflector. Each chart was determined using the measurement setup of FIG. 9A for the exemplary angularly Lambertian light source 400a, the measurement setup of FIG. 10A for patterned diffuser 110a with the plurality of patterned reflectors 112 facing the angularly Lambertian light source 400a, and the measurement setup of FIG. 10B for the patterned diffuser 110b with the plurality of patterned reflectors 112 facing away from the angularly Lambertian light source 400a.

In the chart of FIG. 11A, the measured spatial color coordinate Cx(r) for the spatially uniform and angularly Lambertian light source, which is denoted herein as Cx0(r), is indicated by the solid triangles. The measured spatial color coordinate Cx(r) for the patterned diffuser 110a with the patterned reflectors 112 on the bottom of the carrier 108 facing the angularly Lambertian light source 400a, which is denoted herein as Cx1(r), is indicated by the hollow circles. The measured spatial color coordinate Cx(r) for the patterned diffuser 110b with the patterned reflectors 112 on the top of the carrier 108 facing away from the light source 400a, which is denoted herein as Cx2(r), is indicated by the solid circles.

In the chart of FIG. 11B, the measured spatial color coordinate Cy(r) for the spatially uniform and angularly Lambertian light source, which is denoted herein as Cy0(r), is indicated by the solid triangles. The measured spatial color coordinate Cy(r) for the patterned diffuser 110b with the patterned reflectors 112 on the bottom of the carrier 108 facing the angularly Lambertian light source 400a, which is denoted herein as Cy1(r), is indicated by the hollow circles. The measured spatial color coordinate Cy(r) for the patterned diffuser 110b with the patterned reflectors 112 on the top of the carrier 108 facing away from the angularly Lambertian light source 400a, which is denoted herein as Cy2(r), is indicated by the solid circles.

In the chart of FIG. 11C, the measured spatial Luminance(r) for the spatially uniform and angularly Lambertian light source, which is denoted herein as Luminance0(r), is indicated by the solid triangles. The measured spatial Luminance(r) for the patterned diffuser 110a with the patterned reflectors 112 on the bottom of the carrier 108 facing the angularly Lambertian light source 400a, which is denoted herein as Luminance1(r), is indicated by the hollow circles. The measured spatial Luminance(r) for the patterned diffuser 110b with the patterned reflectors 112 on the top of the carrier 108 facing away from the angularly Lambertian light source 400a, which is denoted herein as Luminance2(r), is indicated by the solid circles. The luminance is measured in nits.

As shown in the charts of FIGS. 11A-11C, the spatial color coordinates Cx0(r) and Cy0(r) and the spatial Luminance0(r) measured from the spatially uniform and angularly Lambertian light source 400a are substantially flat independent of the radial position r in the region of interest, which is between r equal to 0 and rmax equal to about 3.2 millimeters in this example. The absolute maximum differences for the color coordinates, defined as |max(Cx0(r))−min(Cx0(r))| and |max(Cy0(r))−min(Cy0(r))| for r in the region of interest are less than about 0.002 for Cx0 and Cy0, respectively. The relative maximum differences for the color coordinates, defined as |100%−min(Cx0(r))/max(Cx0(r))| and |100%−min(Cy0(r))/max(Cy0(r))| are less than about 1 percent for Cx0 and Cy0, respectively. The relative maximum difference for Luminance, defined as |100%−min(Luminance0(r))/max(Luminance0(r))| is less than about 2 percent for Luminance0. The above measured spatial distributions are characteristics of the angularly Lambertian light source 400a or 400b. Though not shown, the angular luminance distributions of the angularly Lambertian light source 400a or 400b nearly follow the Lambertian distribution. The spatially uniform and angularly Lambertian light source 400a may be constructed with LEDs of different pitches or with different volume diffuser plates, as long as the spatial luminance and spatial color coordinates that the light source provides satisfy the above conditions.

The measured Cx1(r), Cy1(r), Luminance1(r), Cx2(r), Cy2(r), and Luminance2(r) can strongly vary with the color coordinates Cx0(r) and Cy0(r) and Luminance0(r) of the angularly Lambertian light source 400a. The properties of the patterned diffuser 110a/110b, which are independent of or at least insensitive to the color coordinates Cx0(r) and Cy0(r) and Luminance0(r) of the angularly Lambertian light source 400a, are the transmittance and color shift. The color shift of the patterned diffuser 110a can be described by the color coordinate differences $DCx1(r) \equiv Cx1(r)-Cx0(r)$ and $DCy1(r) \equiv Cy1(r)-Cy0(r)$, and/or color coordinate ratios $RCx1(r) \equiv Cx1(r)/Cx0(r)$ and $RCy1(r) \equiv Cy1(r)/Cy0(r)$, where the symbol "≡" means "defined as". The transmittance of the patterned diffuser 110a can be described by the luminance ratio $RL1(r) \equiv Luminance1(r)/Luminance0(r)$. Likewise, the color shift of the patterned diffuser 110b can be described by the color coordinate differences $DCx2(r) \equiv Cx2(r)-Cx0(r)$ and $DCy2(r) \equiv Cy2(r)-Cy0(r)$, and/or color coordinate ratios $RCx2(r) \equiv Cx2(r)/Cx0(r)$ and $RCy2(r) \equiv Cy2(r)/Cy0(r)$. The transmittance of the patterned diffuser 110b can be described by the luminance ratio $RL2(r) \equiv Luminance2(r)/Luminance0(r)$.

FIGS. 12A-12E are charts of color coordinate differences $DCx1(r) \equiv Cx1(r)-Cx0(r)$ and $DCx2(r) \equiv Cx2(r)-Cx0(r)$, color coordinate differences $DCy1(r) \equiv Cy1(r)-Cy0(r)$ and $DCy2(r) \equiv Cy2(r)-Cy0(r)$, color coordinate ratios $RCx1(r) \equiv Cx1(r)/Cx0(r)$ and $RCx2(r)$ $Cx2(r)/Cx0(r)$, color coordinate ratios $RCy1(r) \equiv Cy1(r)/Cy0(r)$ and $RCy2(r) \equiv Cy2(r)/Cy0(r)$, and luminance ratios $RL1(r) \equiv Luminance1(r)/Luminance0(r)$ and $RL2(r)$ $Luminance2(r)/Luminance0(r)$, respectively, derived from FIGS. 11A-11C.

Figure 12A:
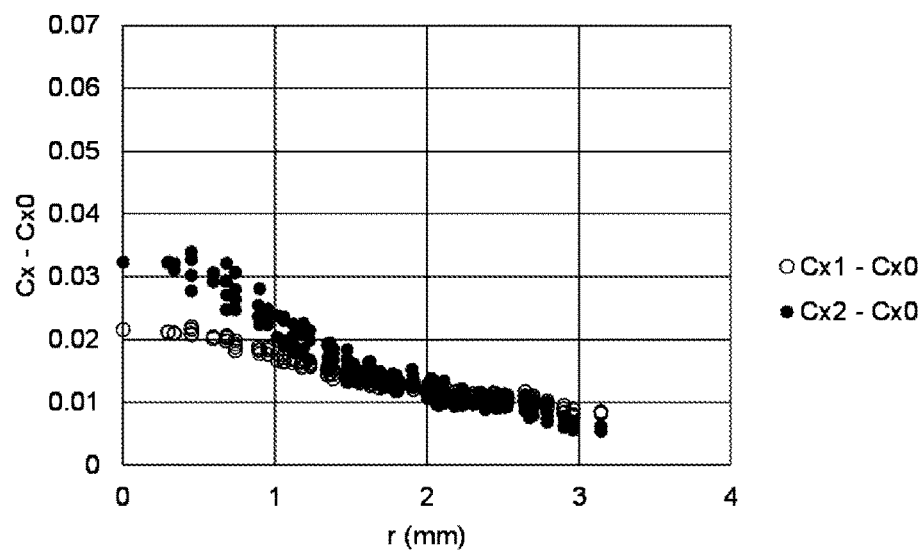
FIGS. 12A-12E are charts of color coordinate differences $DCx1(r) \equiv Cx1(r) - Cx0(r)$ and $DCx2(r) \equiv Cx2(r) - Cx0(r)$, color coordinate differences $DCy1(r) \equiv Cy1(r) - Cy0(r)$ and $DCy2(r) \equiv Cy2(r) - Cy0(r)$, color coordinate ratios $RCx1(r) \equiv Cx1(r)/Cx0(r)$ and $RCx2(r)$ $Cx2(r)/Cx0(r)$, color coordinate ratios $RCy1(r) \equiv Cy1(r)/Cy0(r)$ and $RCy2(r) \equiv Cy2(r)/Cy0(r)$, and luminance ratios $RL1(r) \equiv Luminance1(r)/Luminance0(r)$ and $RL2(r)$ $Luminance2(r)/Luminance0(r)$, respectively, derived from FIGS. 11A-11C.
Figure 12B:
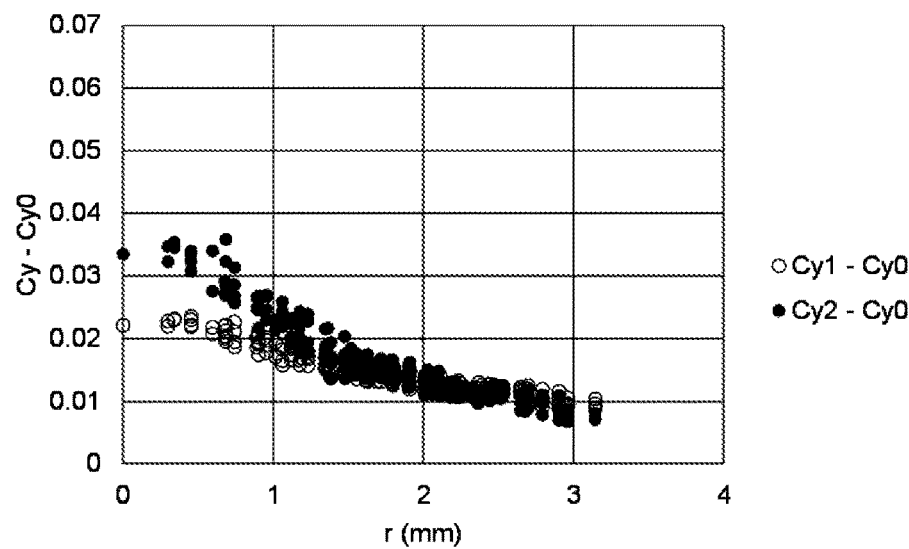

As shown in FIGS. 12A and 12B, the color coordinate differences DCx1(r), DCx2(r), DCy1(r), and DCy2(r) have the following features:

1) Each curve has a substantially greater value at r=0 than at r=rmax, that is DCx1(0)≥DCx1(rmax)+0.005; DCy1(0)≥DCy1(rmax)+0.005; DCx2(0)≥DCx1(rmax)+0.005; and DCy2(0)≥DCy2(rmax)+0.005.
2) The differences DCx1(r)−DCx2(r) and DCy1(r)−DCy2(r) vary with the radial position r. |[DCx1(0)−DCx2(0)]−[DCx1(rmax)−DCx2(rmax)]| is greater than or equal to about 0.01, or at least greater than or equal to about 0.005. |[DCy1(0)−DCy2(0)]−[DCy1(rmax)−DCy2(rmax)]| is greater than or equal to about 0.01, or at least greater than or equal to about 0.005.
3) The curves DCx1(r), DCy1(r), DCx2(r), and DCy2(r) are relatively flat and do not change by more than about 0.005 for r between 0 and a predetermined value, which is about 0.7 mm in this example.
4) The curves generally trend lower or remain flat as r increases from 0 to rmax. DCx1 decreases from about 0.022 at r=0 to about 0.008 at r=rmax while DCx2 decreases from about 0.032 at r=0 to about 0.005 at r=rmax. DCy1 decreases from about 0.022 at r=0 to about 0.010 at r=rmax while DCy2 decreases from about 0.032 at r=0 to about 0.008 at r=rmax.
5) When r is smaller than a threshold value of about 2, DCx1(r)<DCx2(r) and DCy1(r)<DCy2(r); and when r is greater than the threshold value, DCx1(r)>DCx2(r) and DCy1(r)>DCy2(r).
6) DCx1(r), DCy1(r), DCx2(r), and DCy2(r) are greater than 0 at r=0 and between 0 and rmax.

Figure 12C:
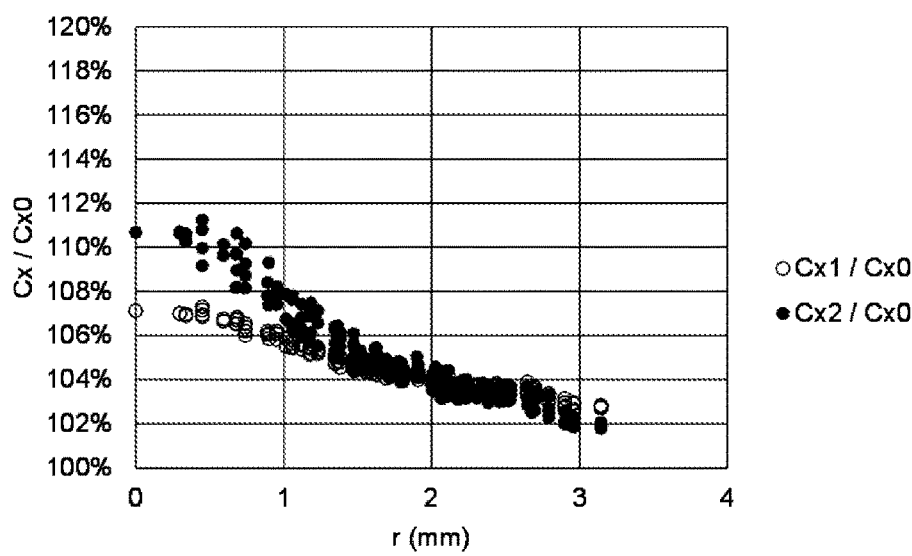
Figure 12D:
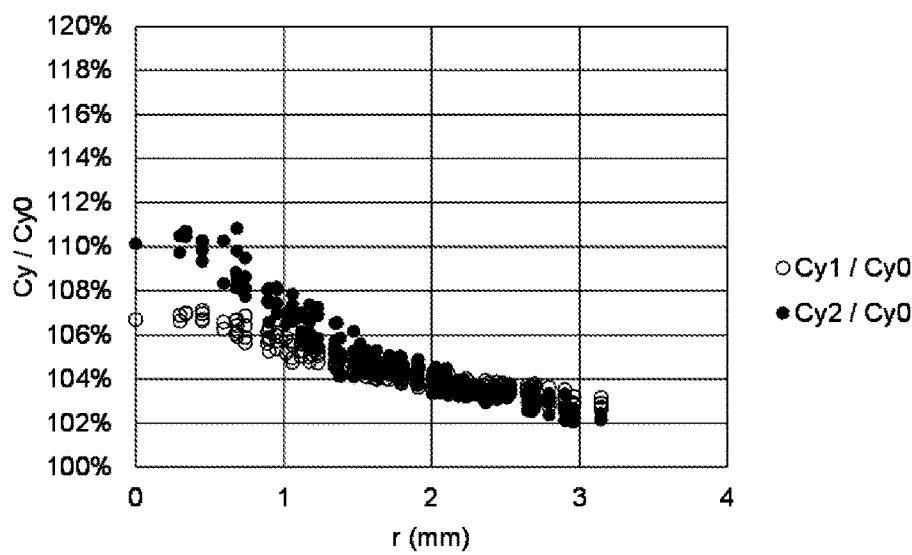

As shown in FIGS. 12C and 12D, the color coordinate ratios RCx1(r), RCy1(r), RCx2(r), and RCy2(r) have the following features:

1) Each curve has a substantially greater value at r=0 than at r=rmax, that is RCx1(0)≥RCx1(rmax)+3%; RCy1(0)≥RCy1(rmax)+3%; RCx2(0)≥RCx1(rmax)+3%; and RCy2(0)≥RCy2(rmax)+3%.
2) The differences RCx1(r)−RCx2(r) and RCy1(r)−RCy2(r) vary with the radial position r. |[RCx1(0)−RCx2(0)]−[RCx1(rmax)−RCx2(rmax)]|≥3%. |[RCy1(0)−RCy2(0)]−[RCy1(rmax)−RCy2(rmax)]|≥3%.
3) The curves RCx1(r), RCy1(r), RCx2(r), and RCy2(r) are relatively flat and do not change by more than about 3 percent for r between 0 and a predetermined value, which is about 0.7 mm in this example.
4) The curves generally trend lower or remain flat as r increases from 0 to rmax. RCx1 decreases from about 107% at r=0 to about 103% at r=rmax; while RCx2 decreases from about 111% at r=0 to about 102% at r=rmax. RCy1 decreases from about 107% at r=0 to about 103% at r=rmax; while RCy2 decreases from about 110% at r=0 to about 102% at r=rmax.
5) When r is smaller than a threshold value of around 2, RCx1(r)<RCx2(r) and RCy1(r)<RCy2(r); and when r is greater than the threshold value, RCx1(r)>RCx2(r) and RCy1(r)>RCy2(r).
6) RCx1(r), RCy1(r), RCx2(r), and RCy2(r) are greater than about 1 at r=0 and between 0 and rmax.

Figure 12E:
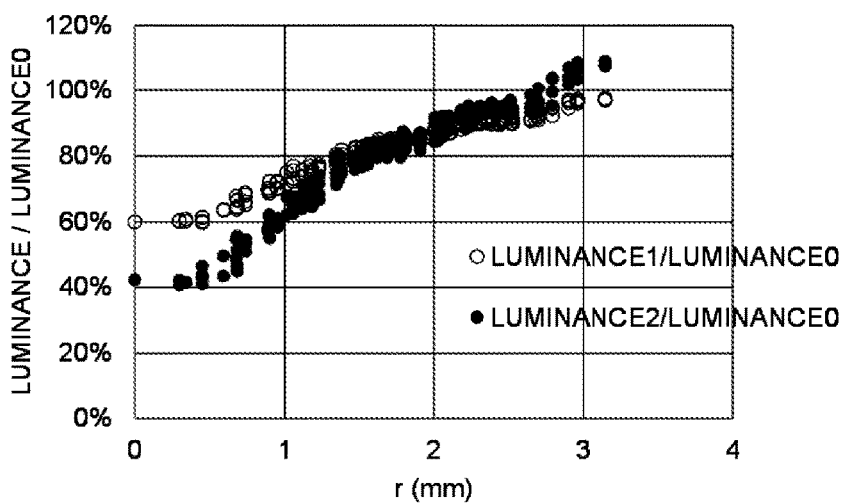
Figure 13A:
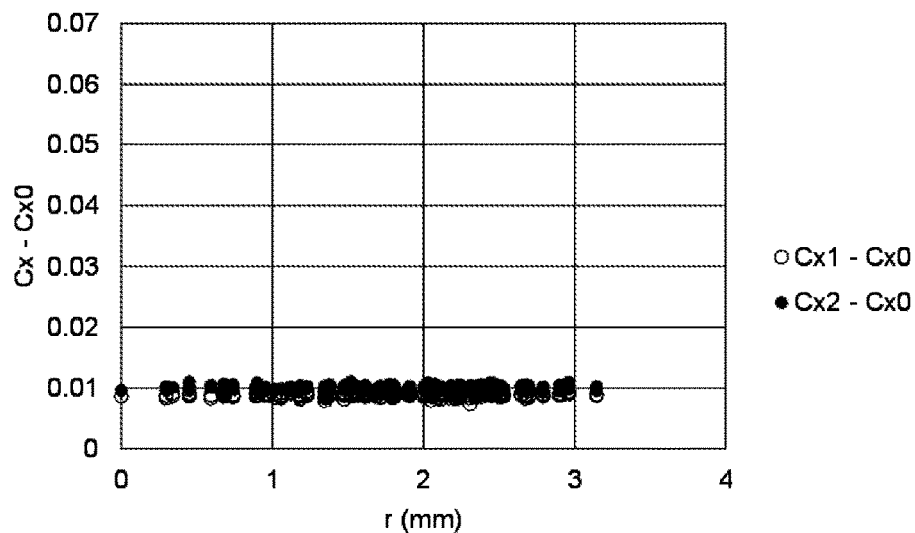
FIGS. 13A-13E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for an exemplary optical component.
Figure 13B:
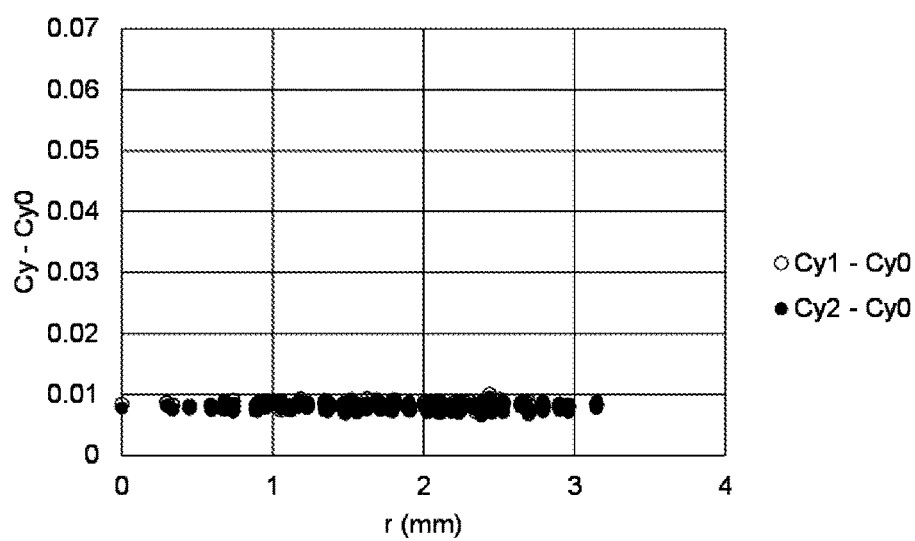
Figure 13C:
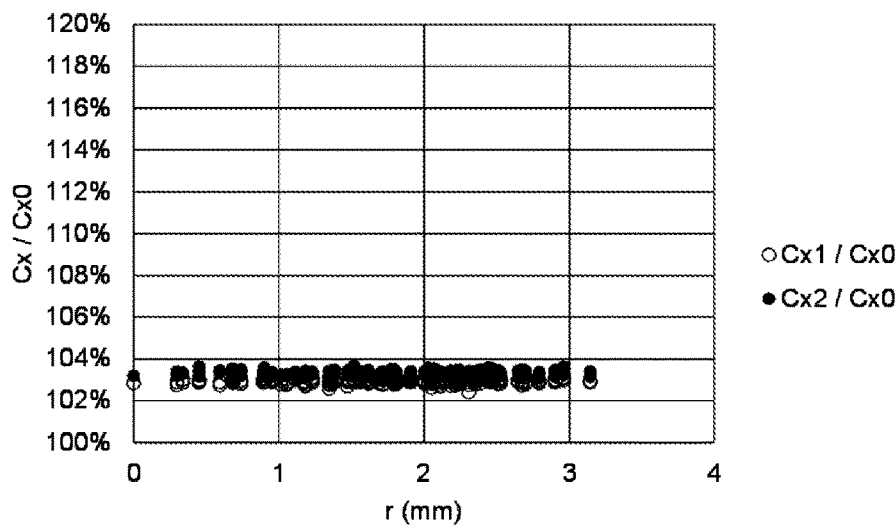
Figure 13D:
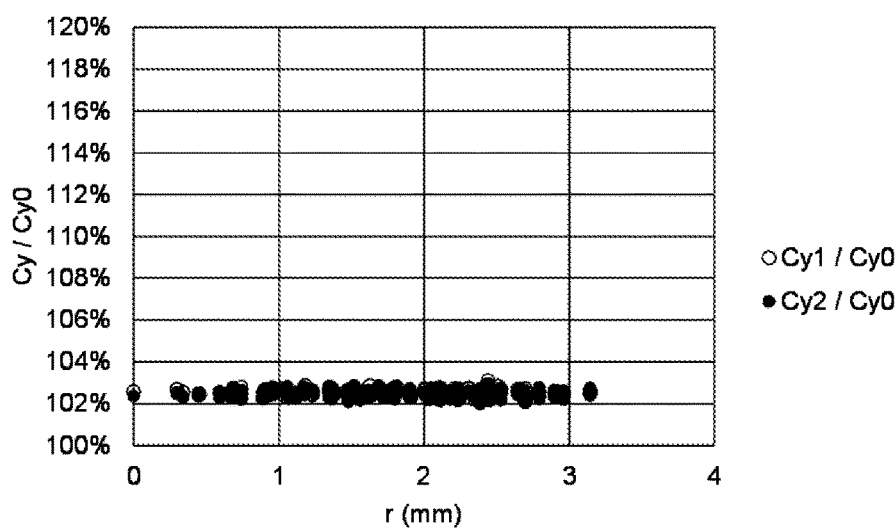
Figure 13E:
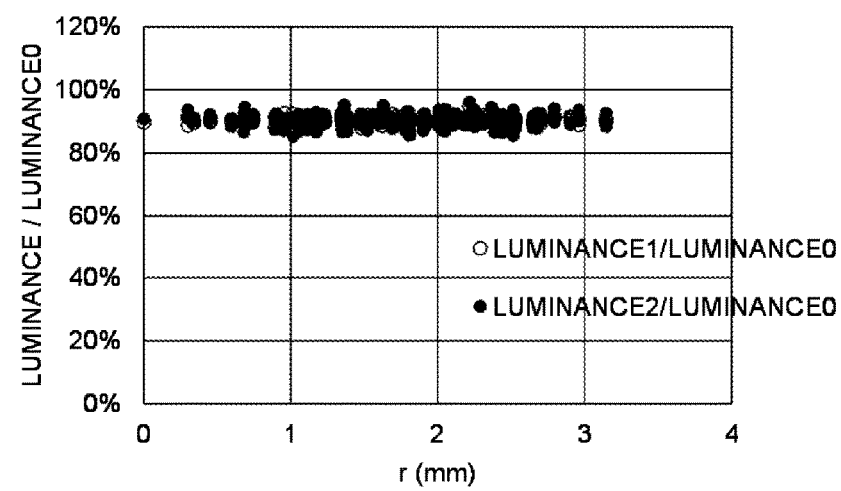
Figure 14A:
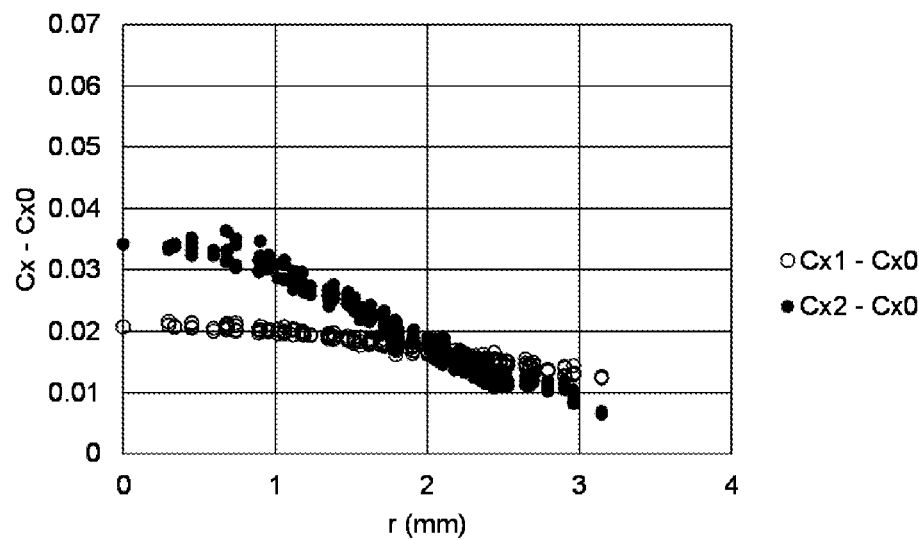
FIGS. 14A-14E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 14B:
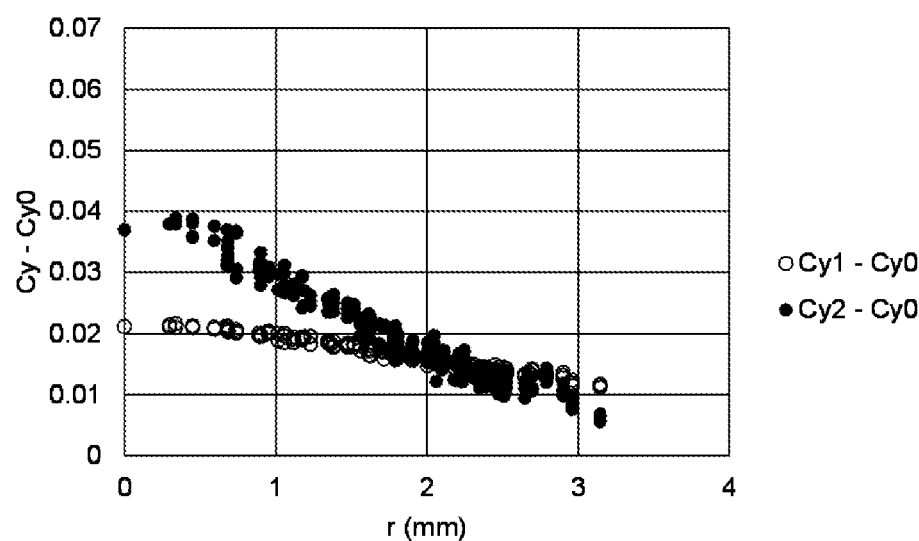
Figure 14C:
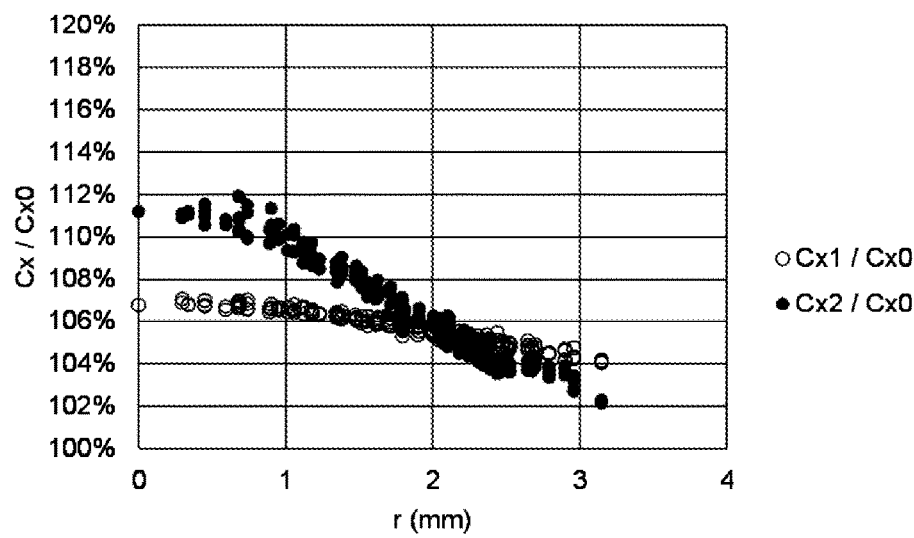
Figure 14D:
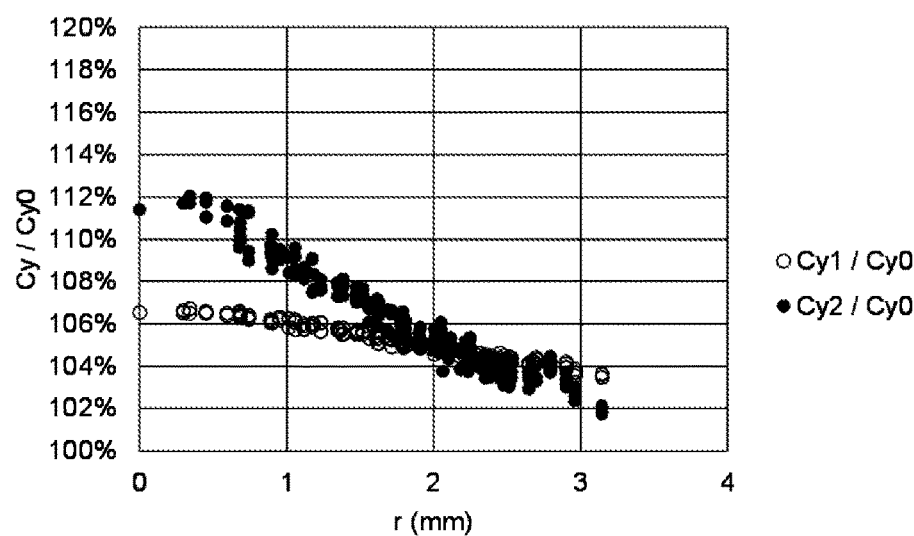
Figure 14E:
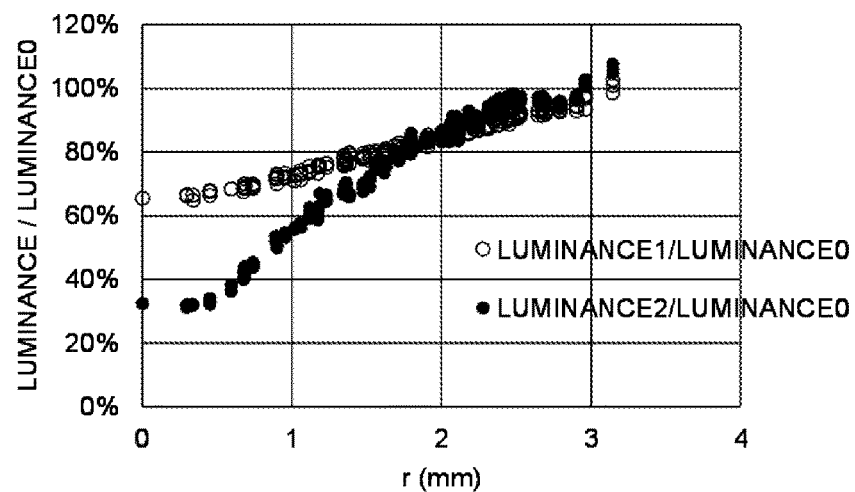
Figure 15A:
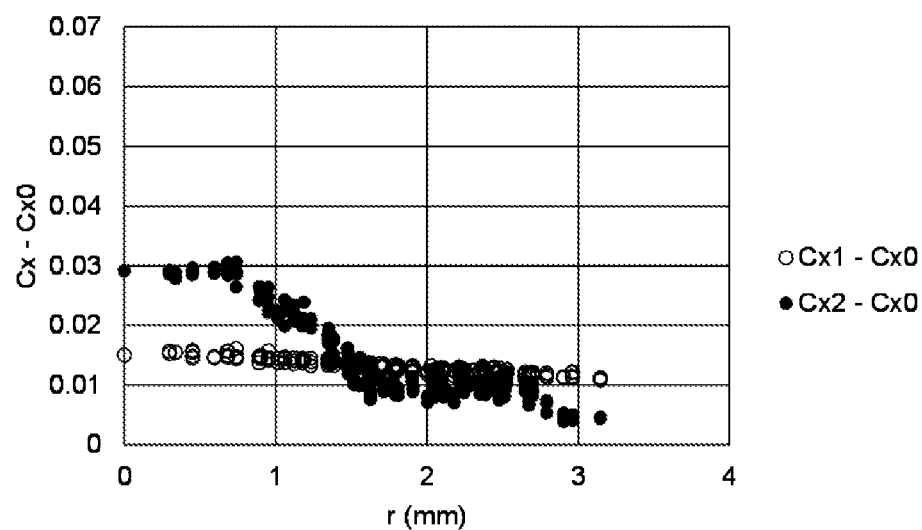
FIGS. 15A-15E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 15B:
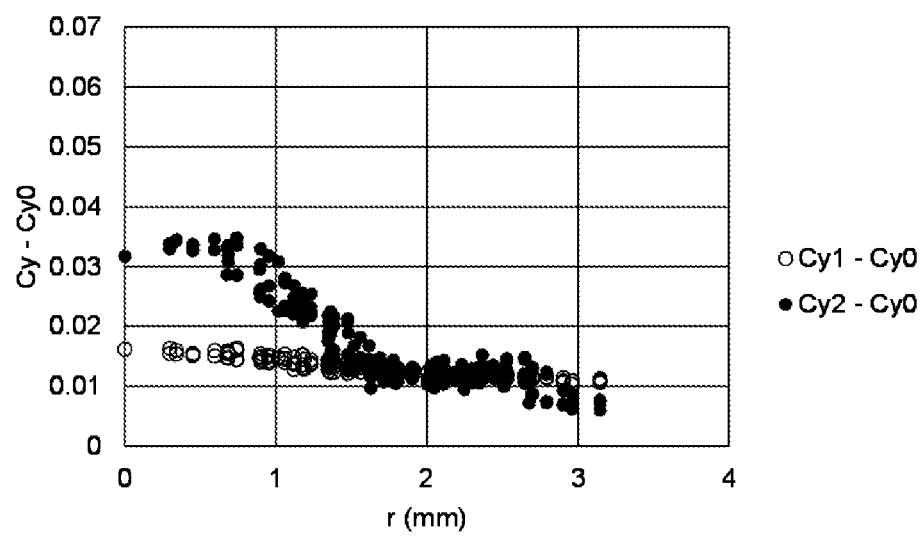
Figure 15C:
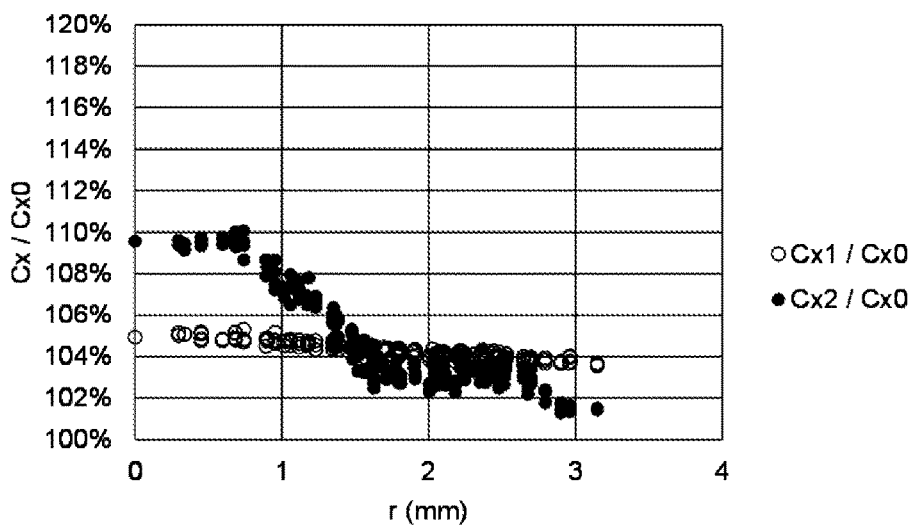
Figure 15D:
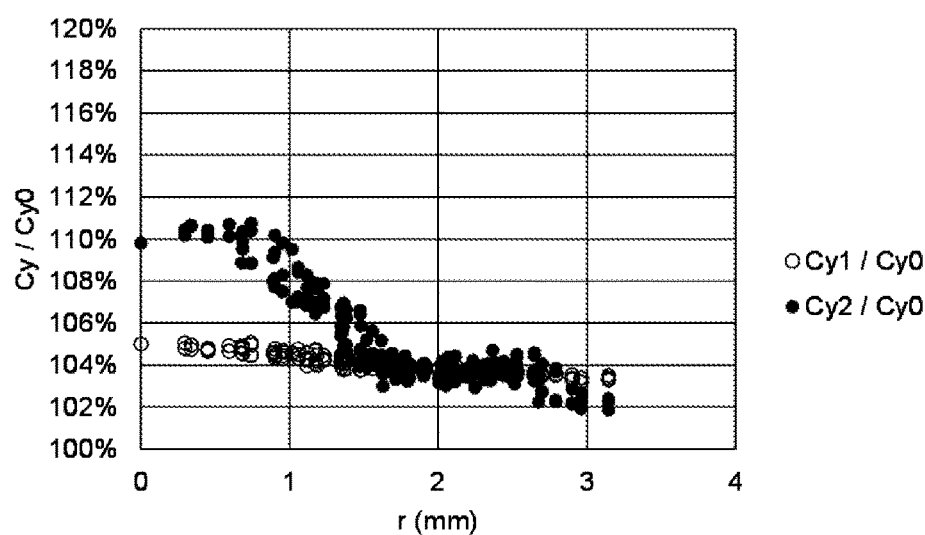
Figure 15E:
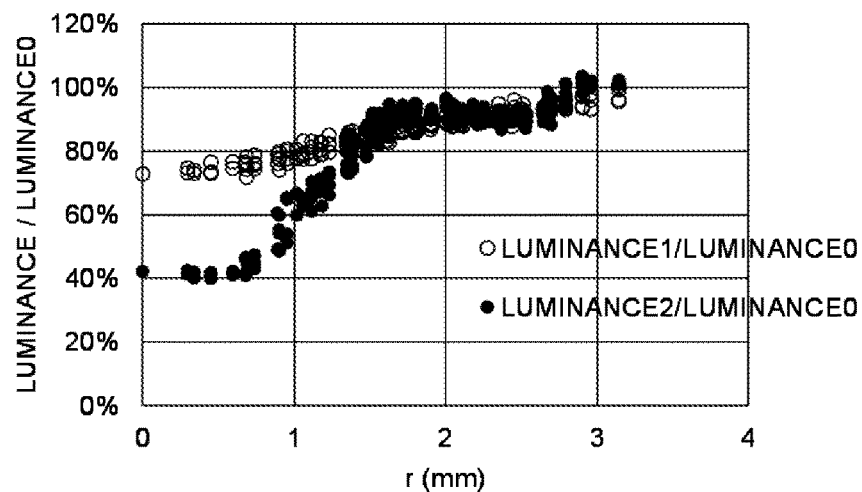
Figure 16A:
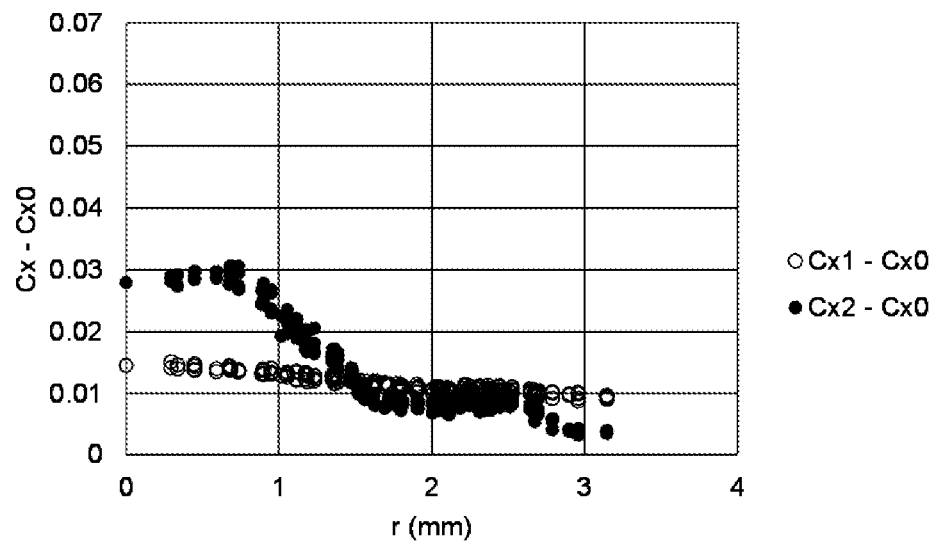
FIGS. 16A-16E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 16B:
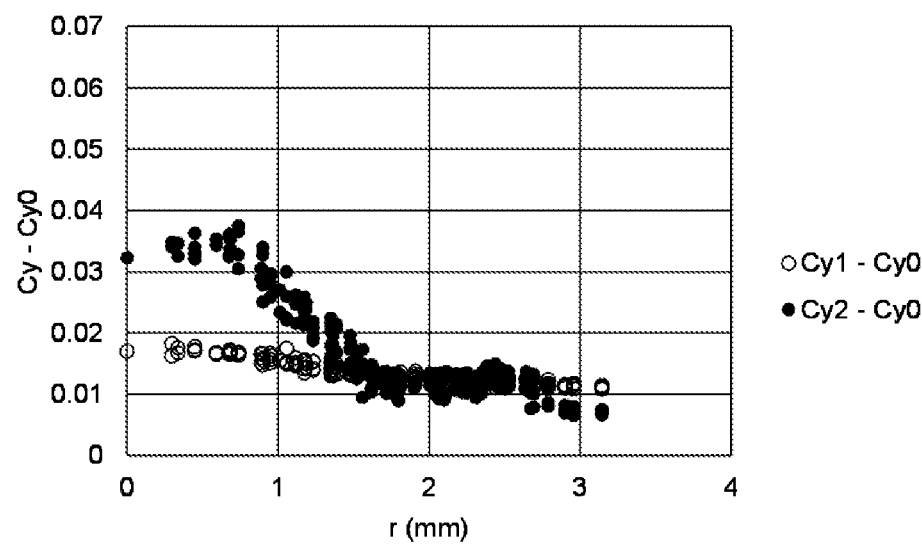
Figure 16C:
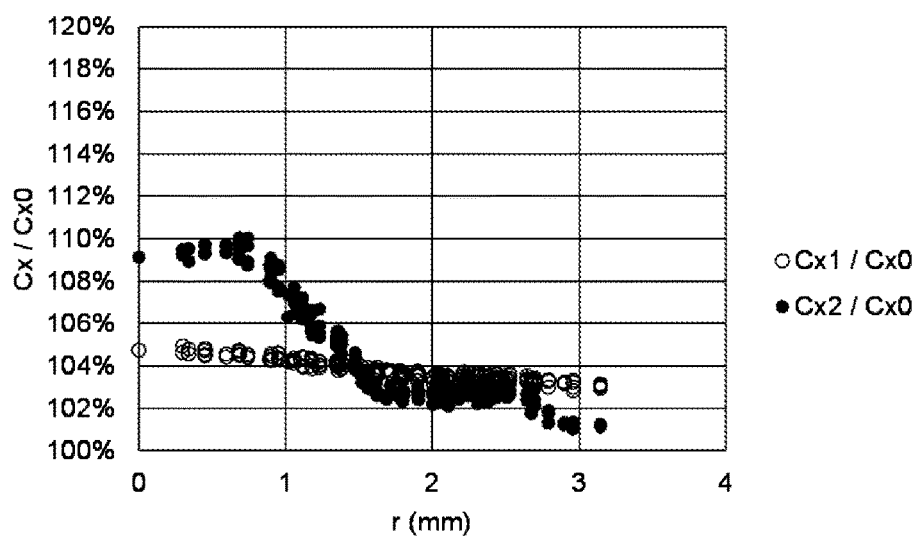
Figure 16D:
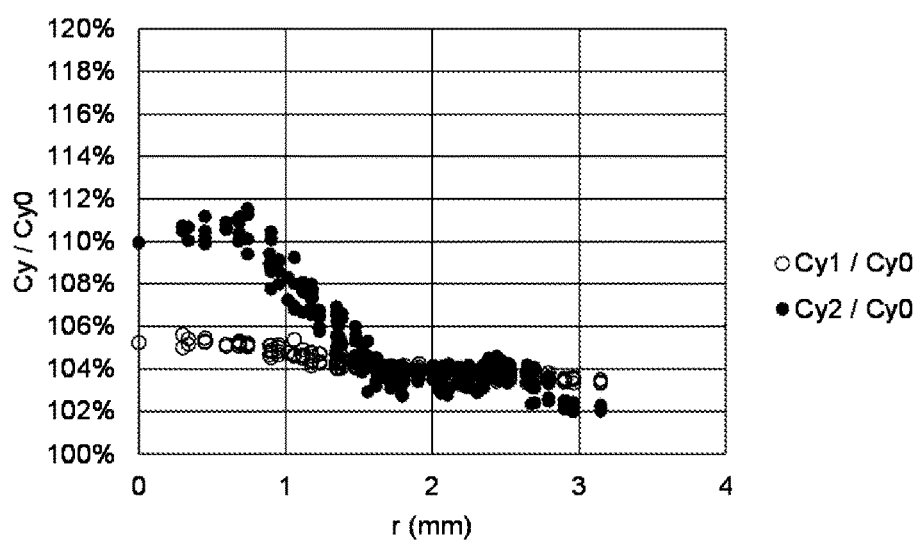
Figure 16E:
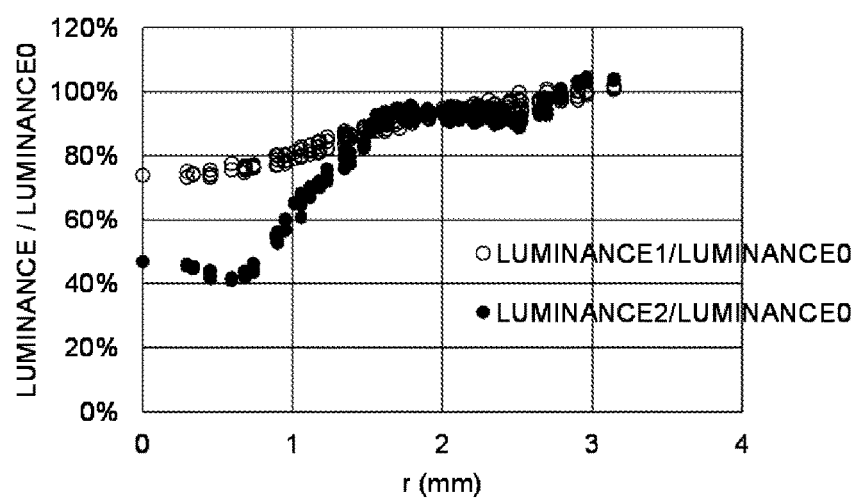
Figure 17A:
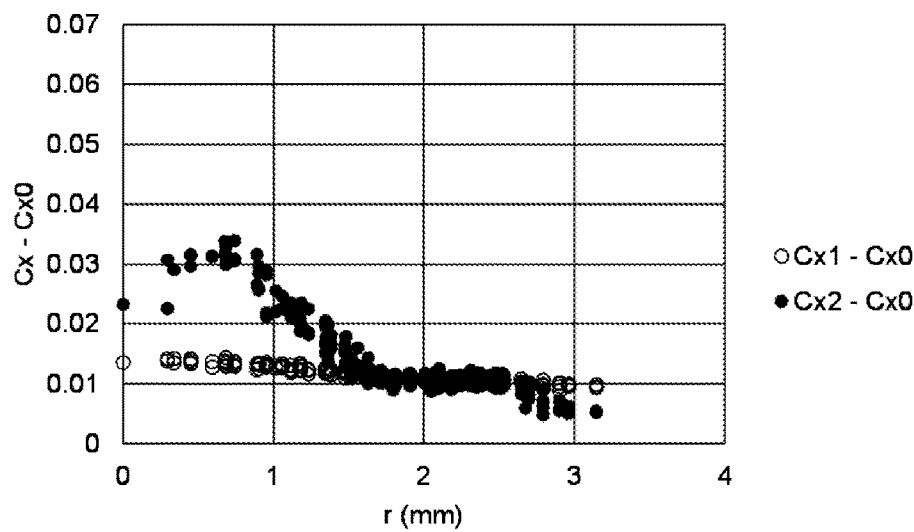
FIGS. 17A-17E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 17B:
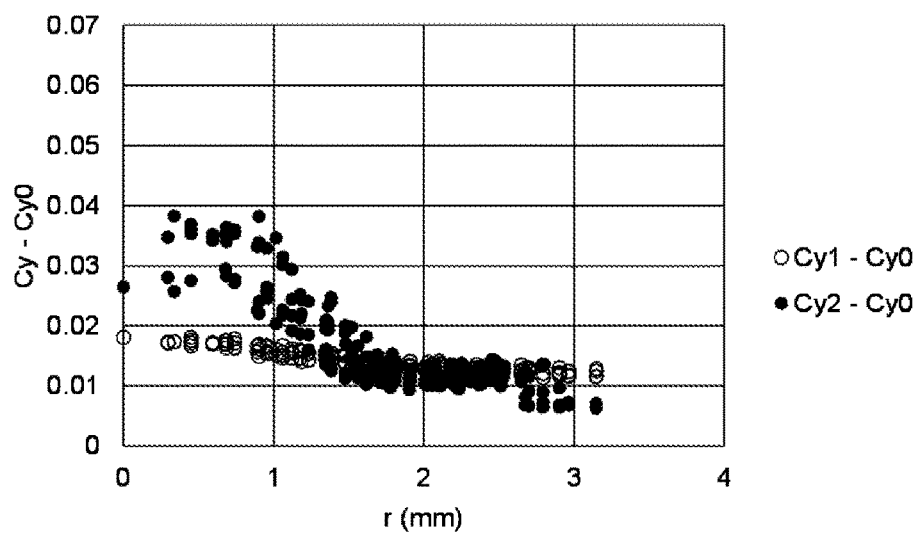
Figure 17C:
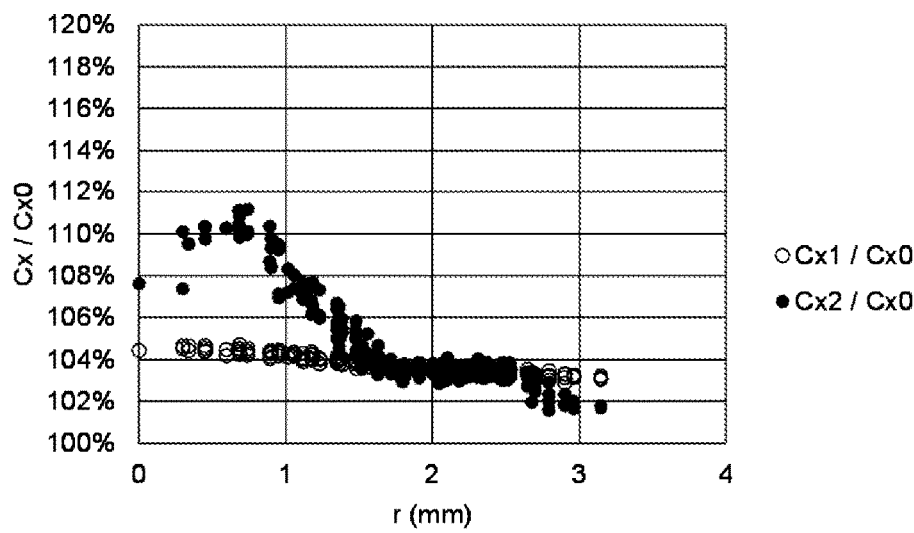
Figure 17D:
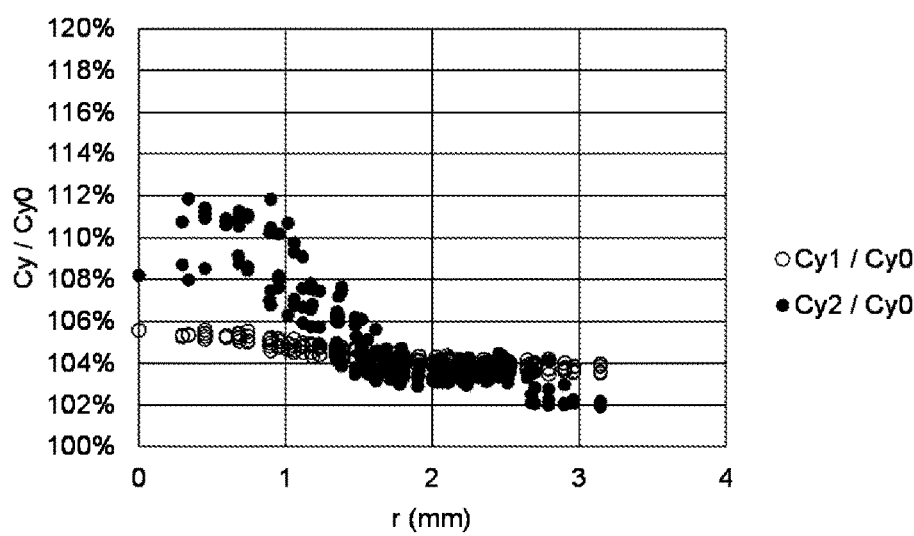
Figure 17E:
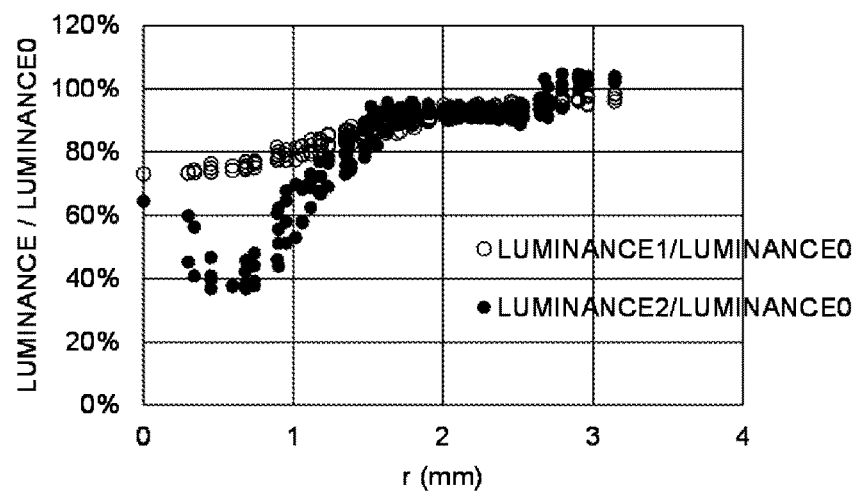
Figure 18A:
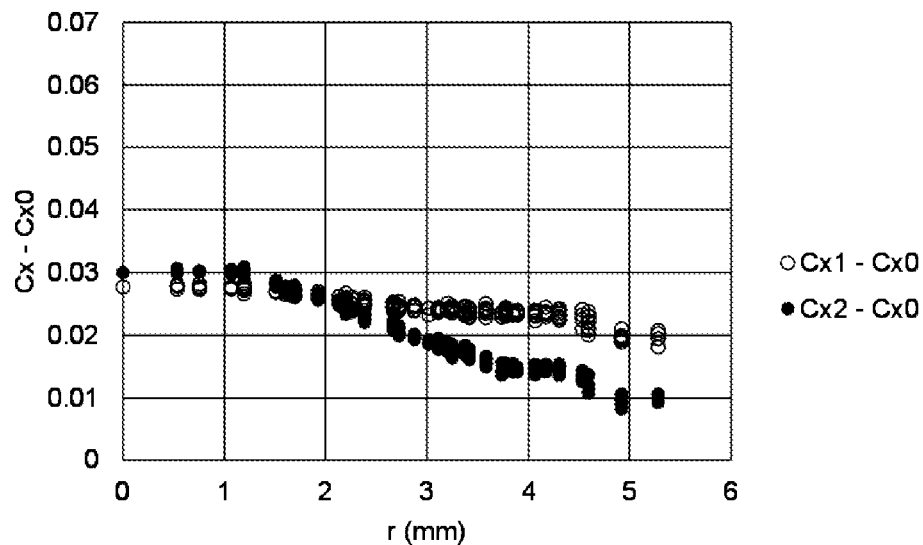
FIGS. 18A-18E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 18B:
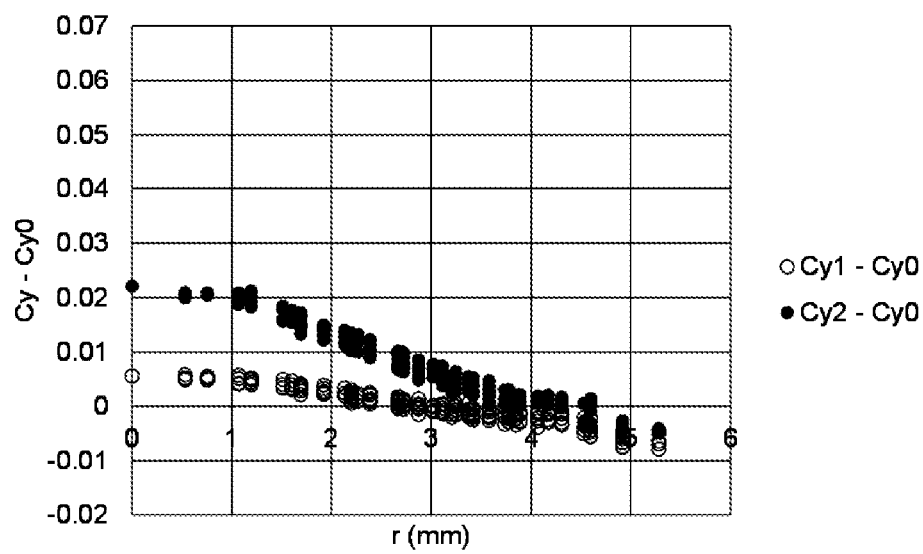
Figure 18C:
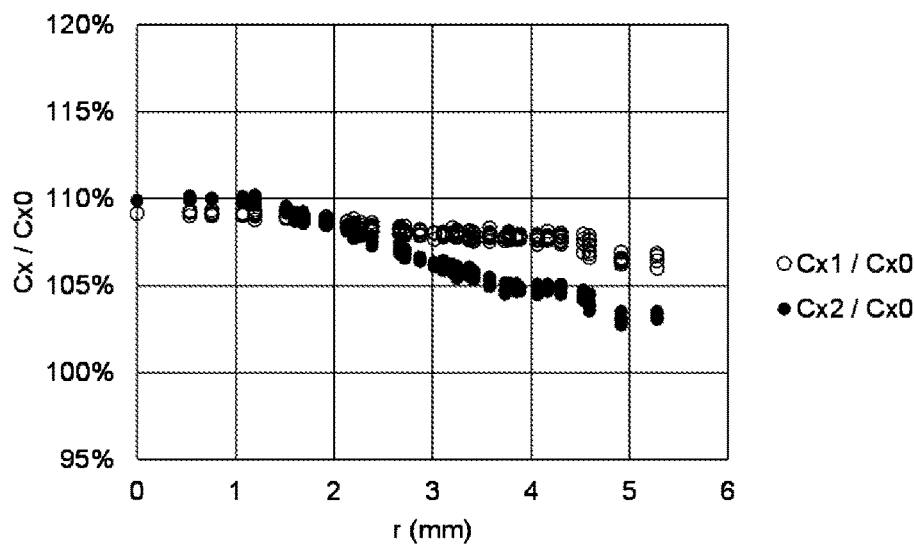
Figure 18D:
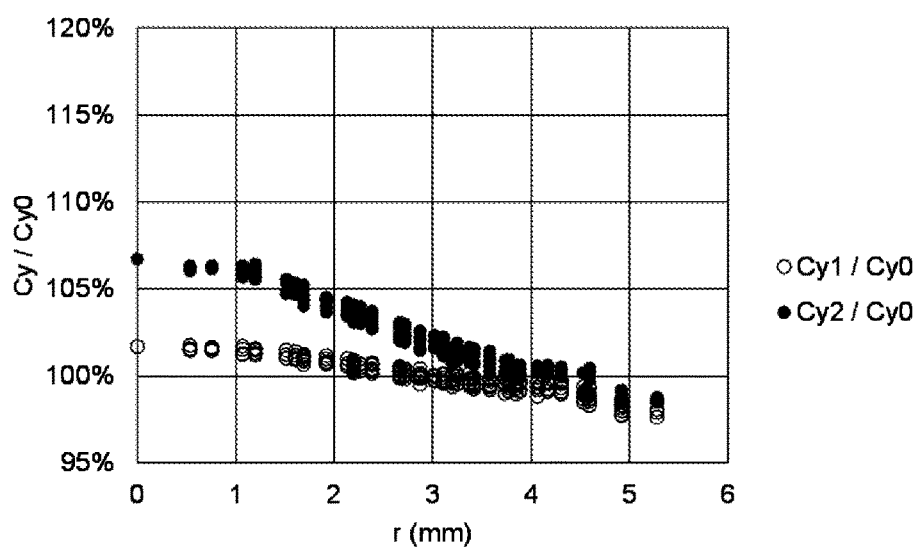
Figure 18E:
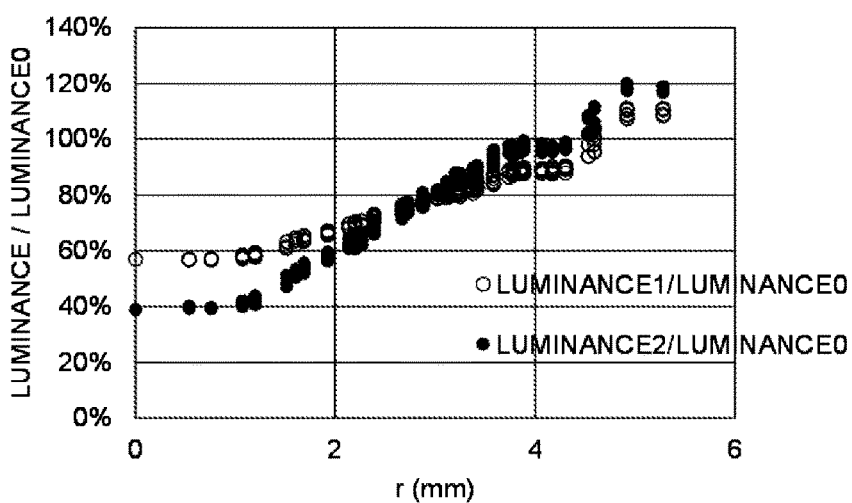
Figure 19A:
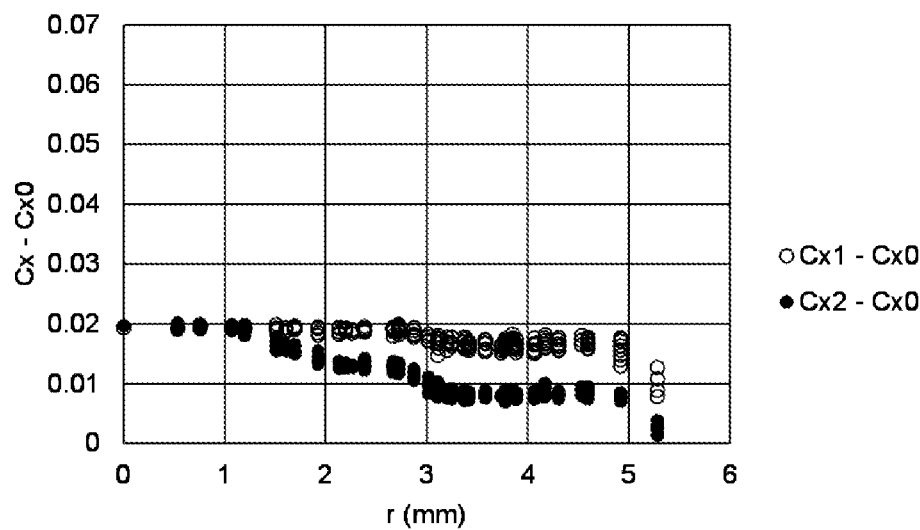
FIGS. 19A-19E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 19B:
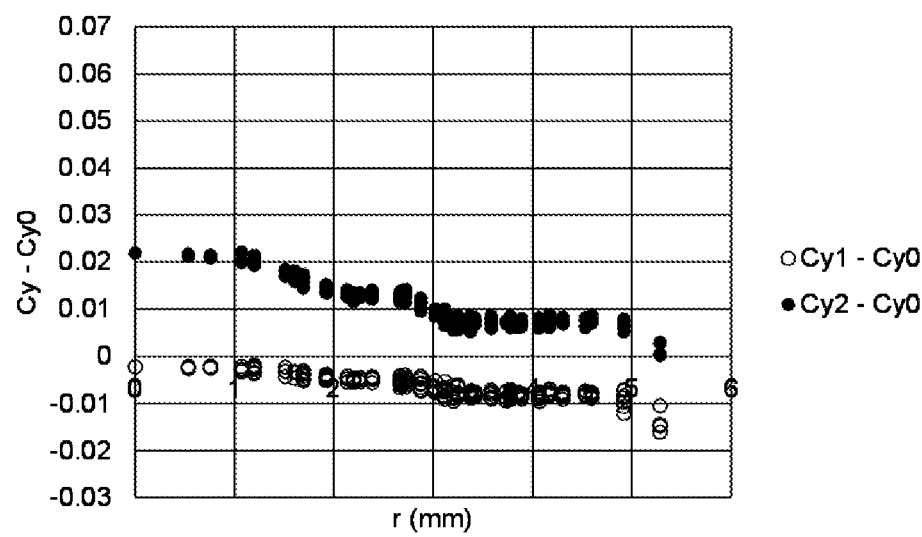
Figure 19C:
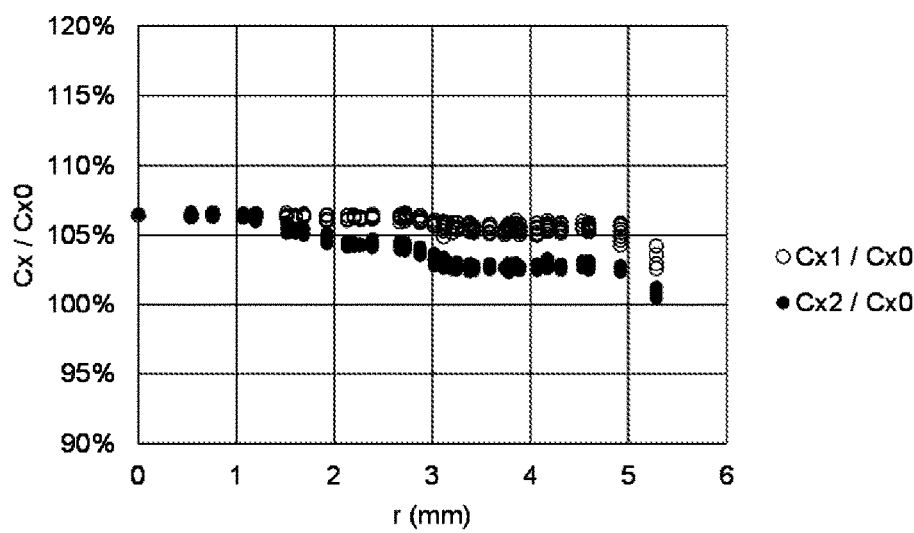
Figure 19D:
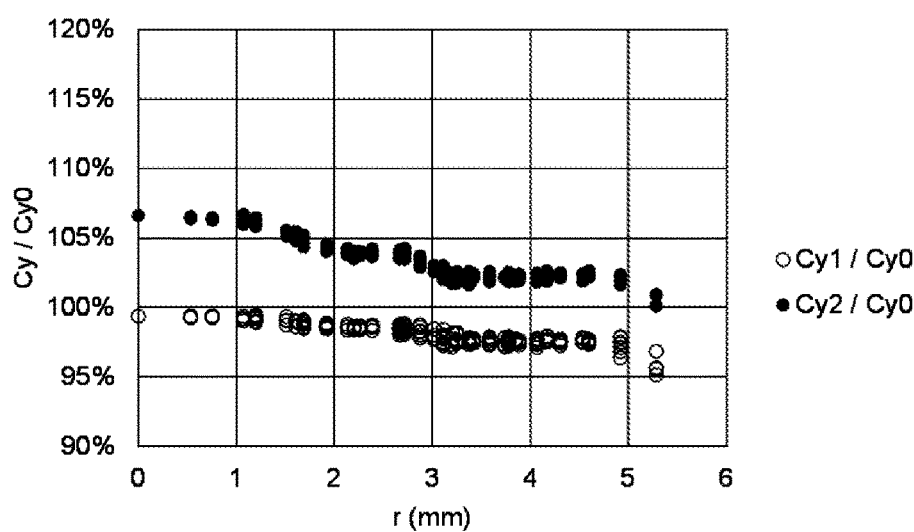
Figure 19E:
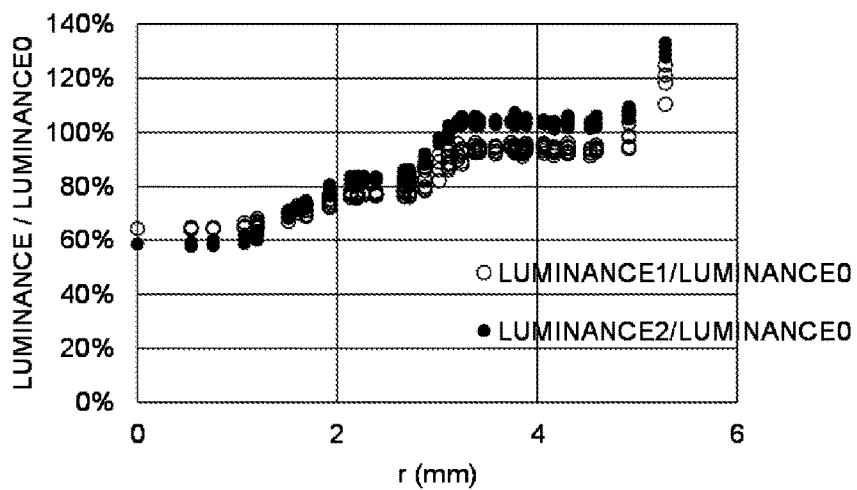
Figure 20A:
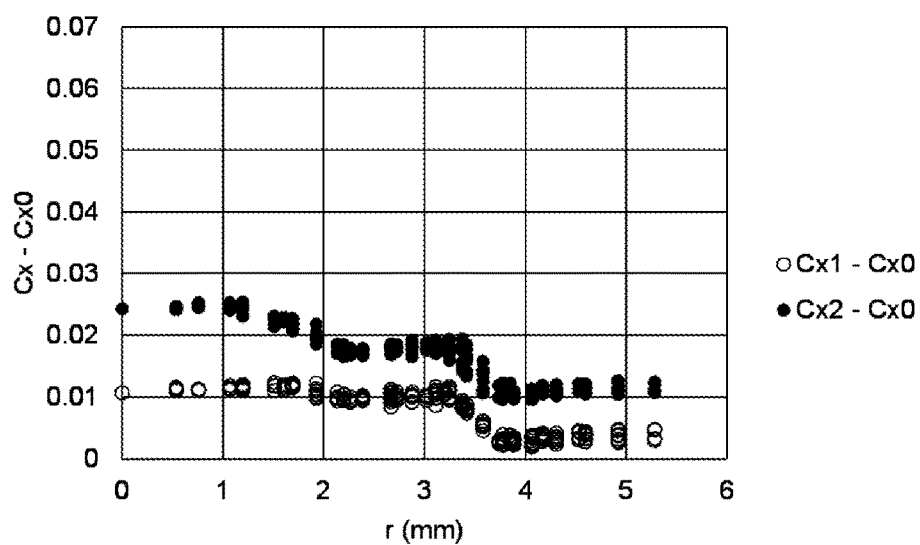
FIGS. 20A-20E are charts of color coordinate differences $DCx1(r)$ and $DCx2(r)$, color coordinate differences $DCy1(r)$ and $DCy2(r)$, color coordinate ratios $RCx1(r)$ and $RCx2(r)$, color coordinate ratios $RCy1(r)$ and $RCy2(r)$, and luminance ratios $RL1(r)$ and $RL2(r)$, respectively, for another exemplary patterned diffuser.
Figure 20B:
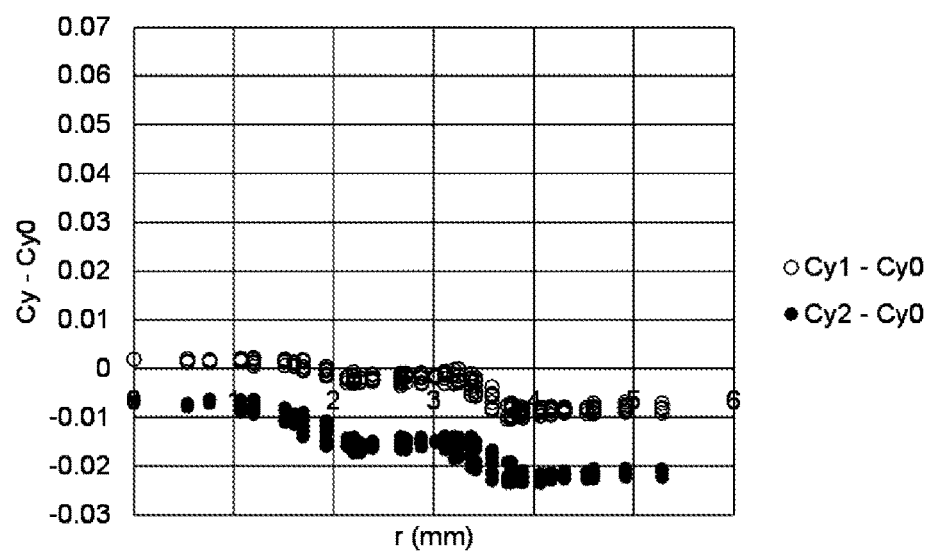
Figure 20C:
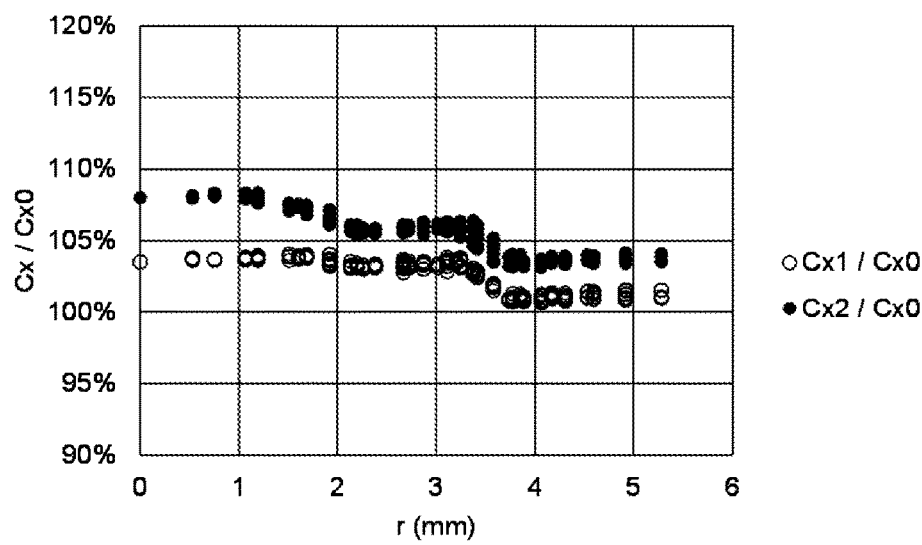
Figure 20D:
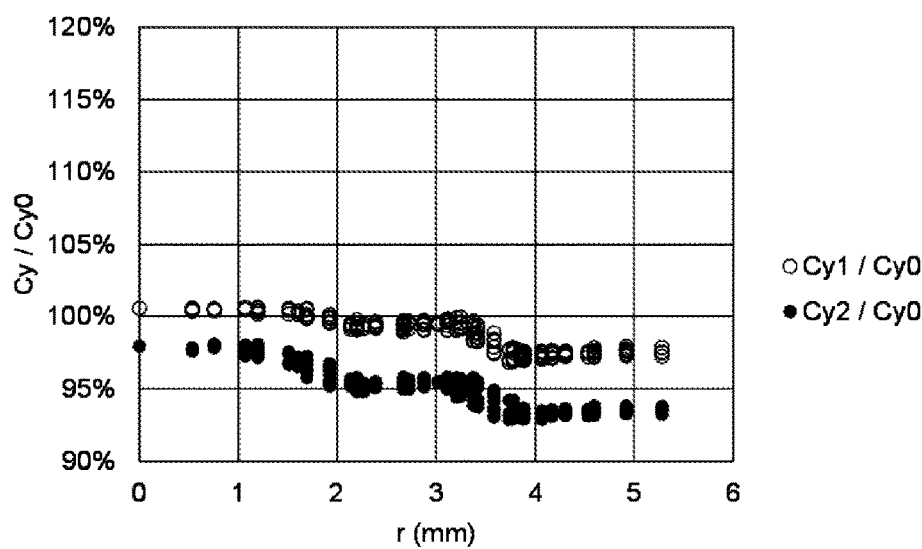
Figure 20E:
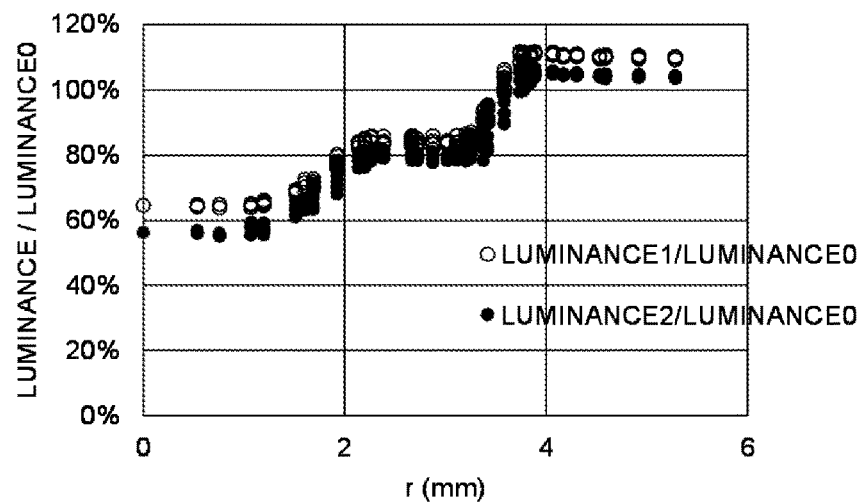
Figure 21A:
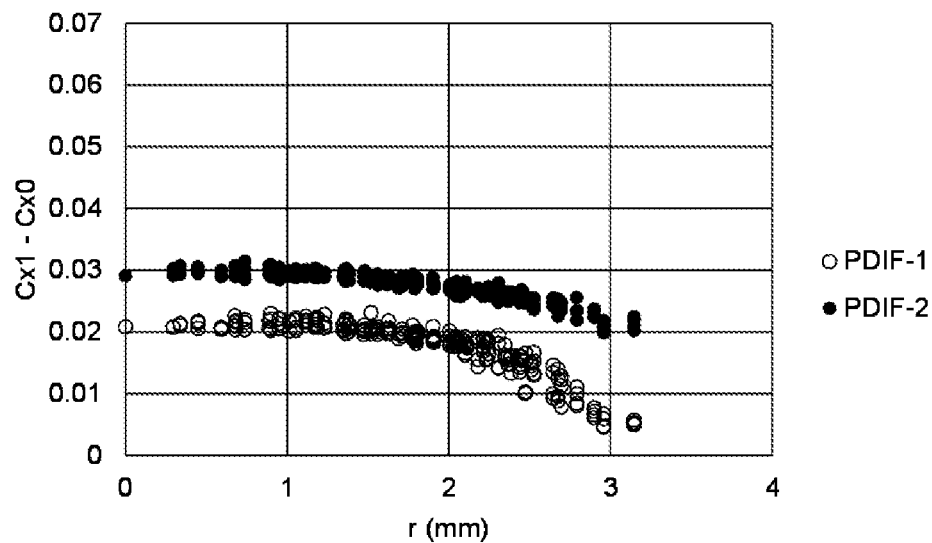
FIGS. 21A-21E are charts of color coordinate difference $DCx1(r)$, color coordinate difference $DCy1(r)$, color coordinate ratio $RCx1(r)$, color coordinate ratio $RCy1(r)$, and luminance ratio $RL1(r)$, respectively, for another two exemplary patterned diffusers.
Figure 21B:
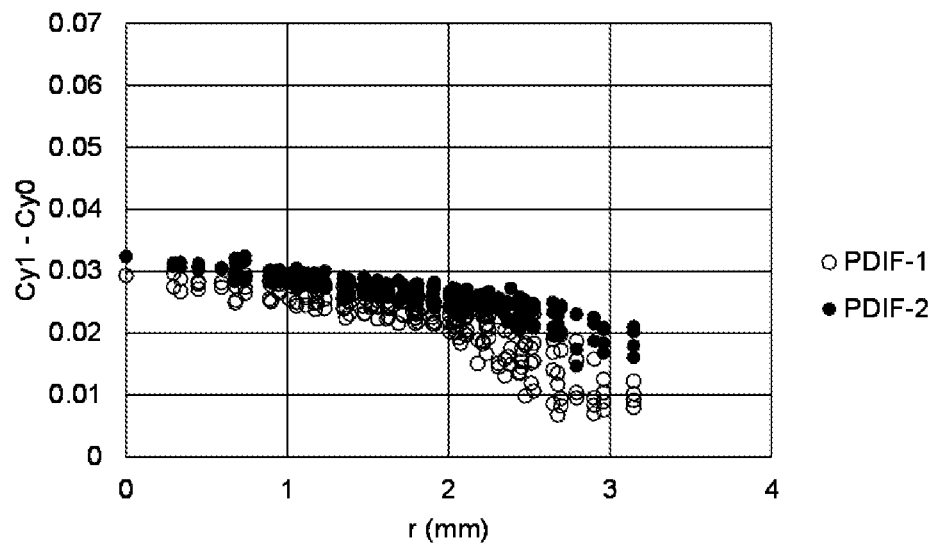
Figure 21C:
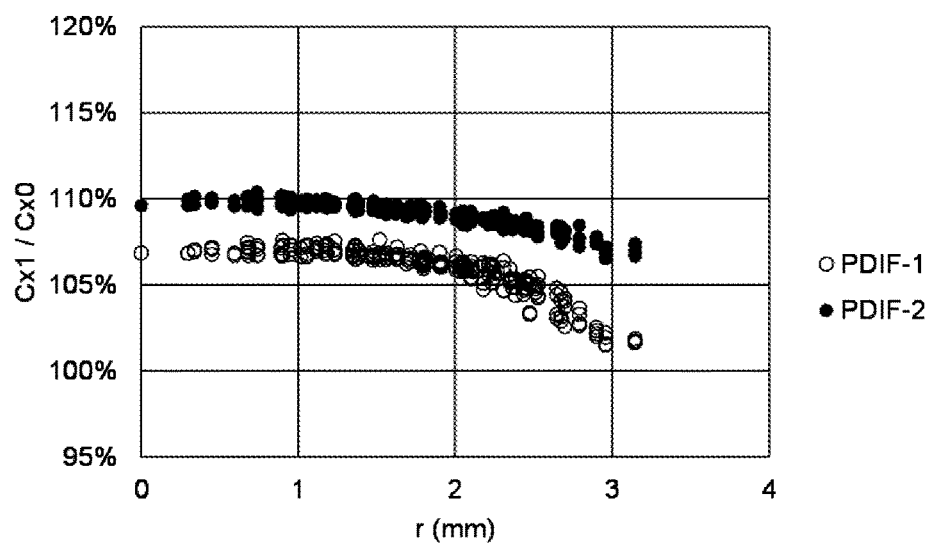
Figure 21D:
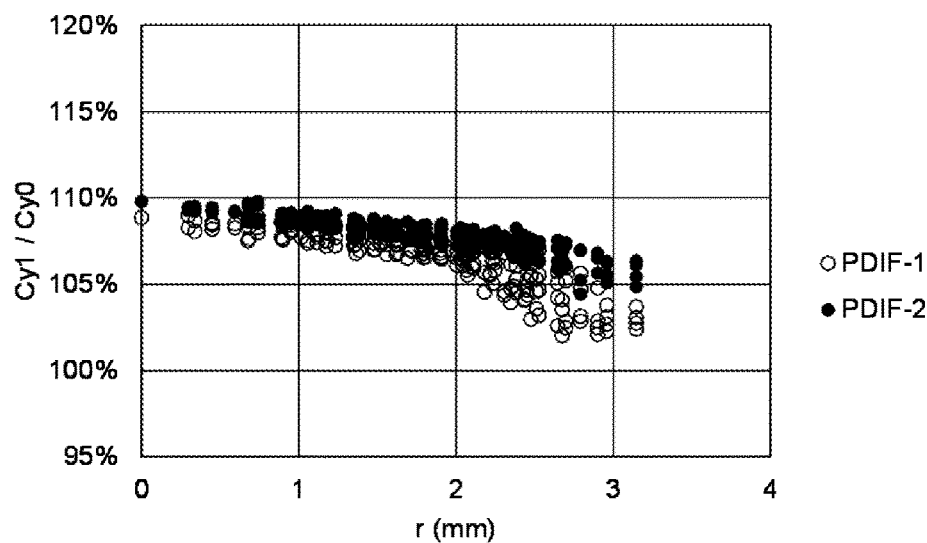
Figure 21E:
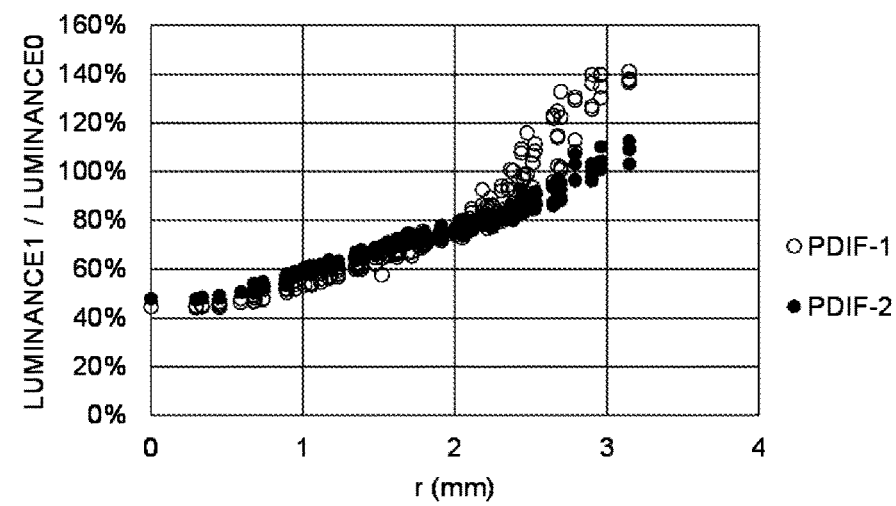
Figure 22A:
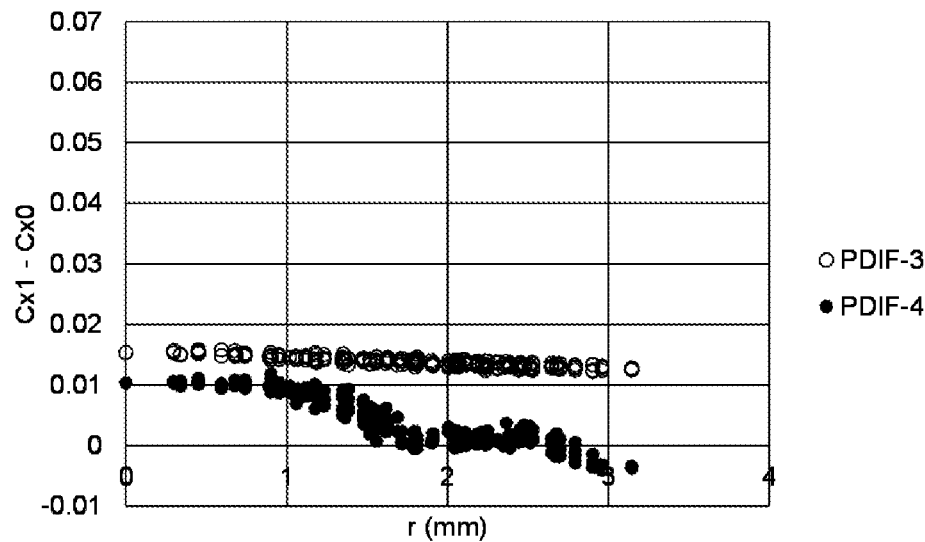
FIGS. 22A-22E are charts of color coordinate difference $DCx1(r)$, color coordinate difference $DCy1(r)$, color coordinate ratio $RCx1(r)$, color coordinate ratio $RCy1(r)$, and luminance ratio $RL1(r)$, respectively, for another two exemplary patterned diffusers.
Figure 22B:
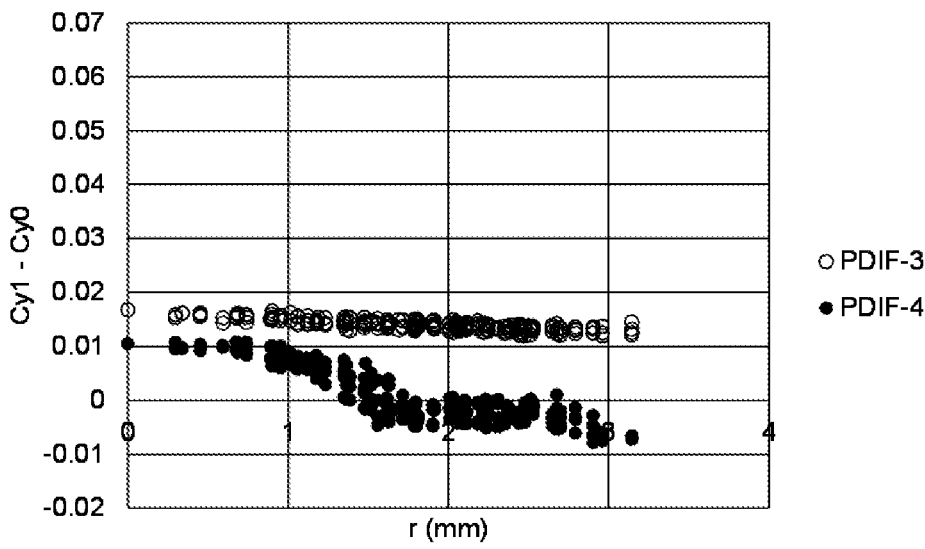
Figure 22C:
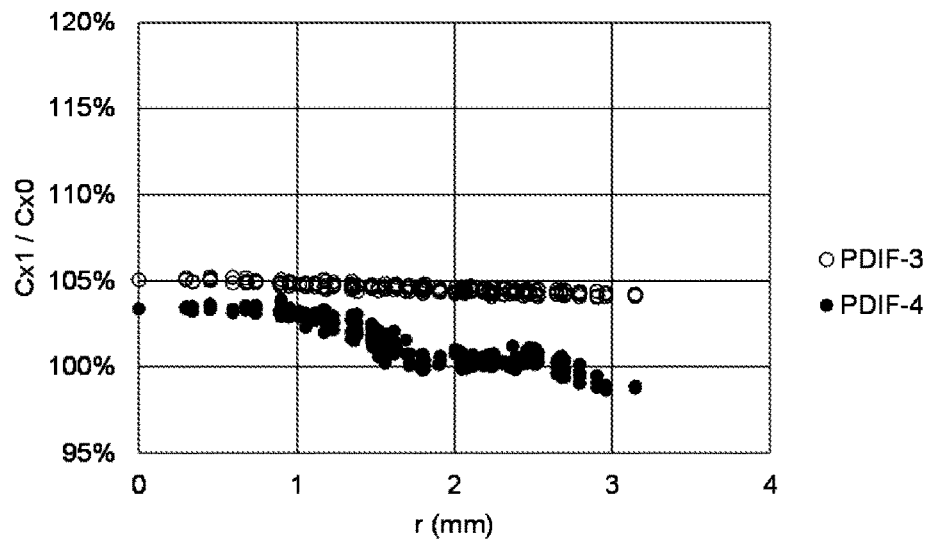
Figure 22D:
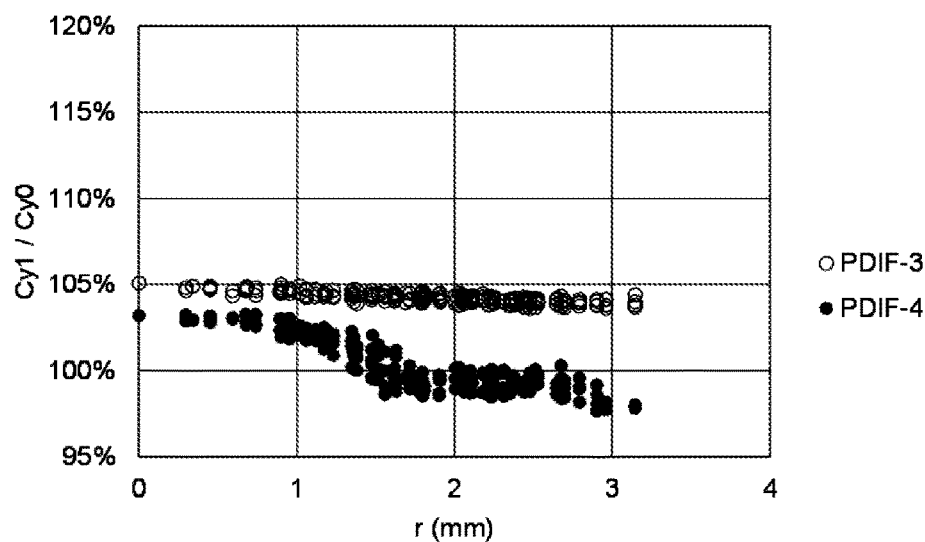
Figure 22E:
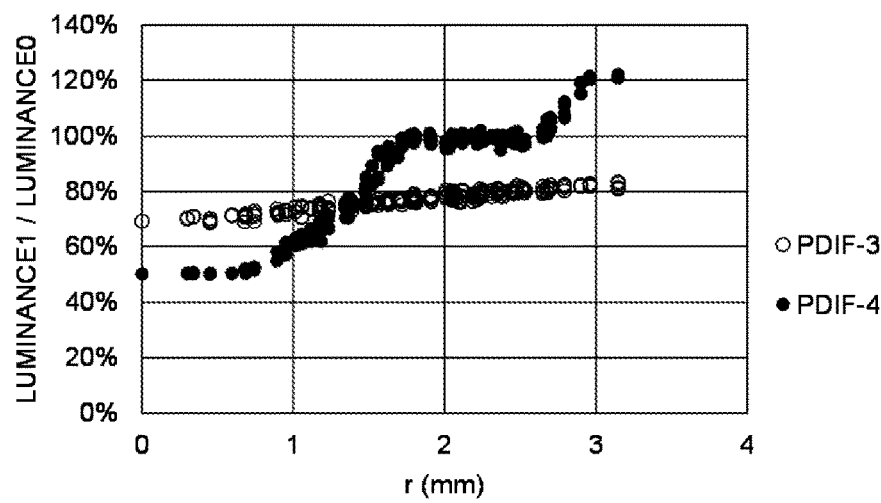
Figure 23A:
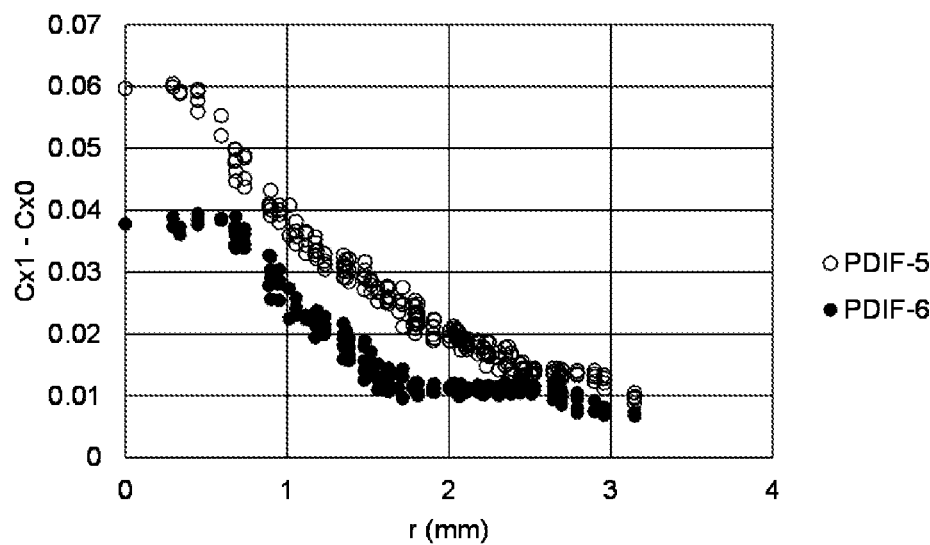
FIGS. 23A-23E are charts of color coordinate difference $DCx1(r)$, color coordinate difference $DCy1(r)$, color coordinate ratio $RCx1(r)$, color coordinate ratio $RCy1(r)$, and luminance ratio $RL1(r)$, respectively, for another two exemplary patterned diffusers.
Figure 23B:
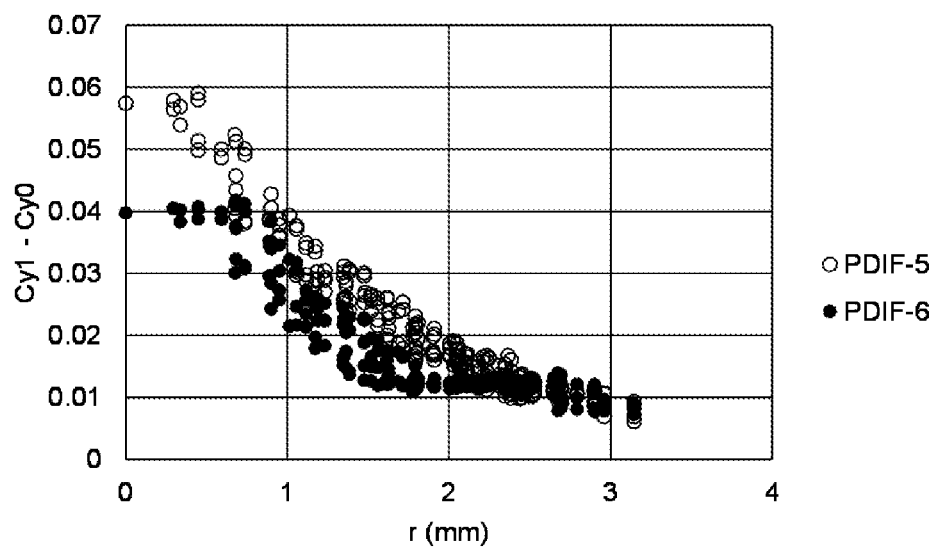
Figure 23C:
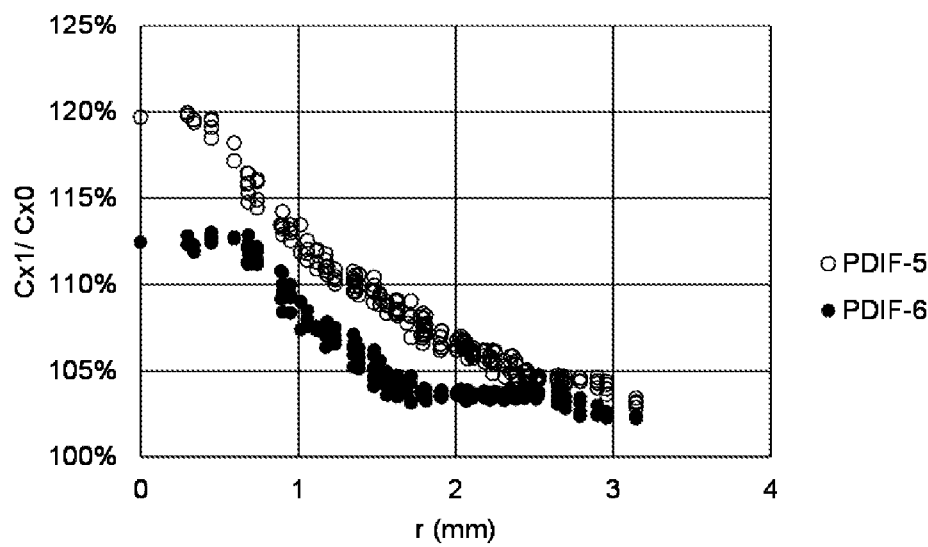
Figure 23D:
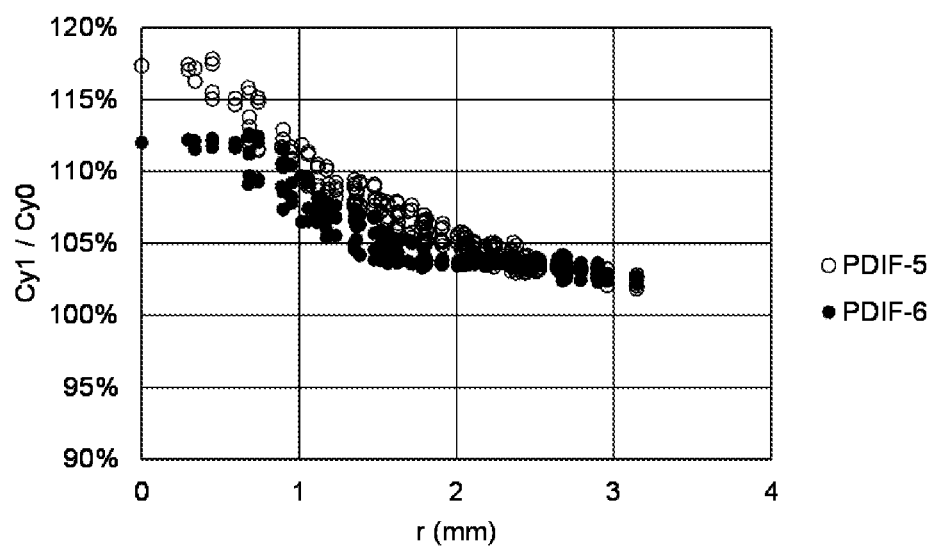
Figure 23E:
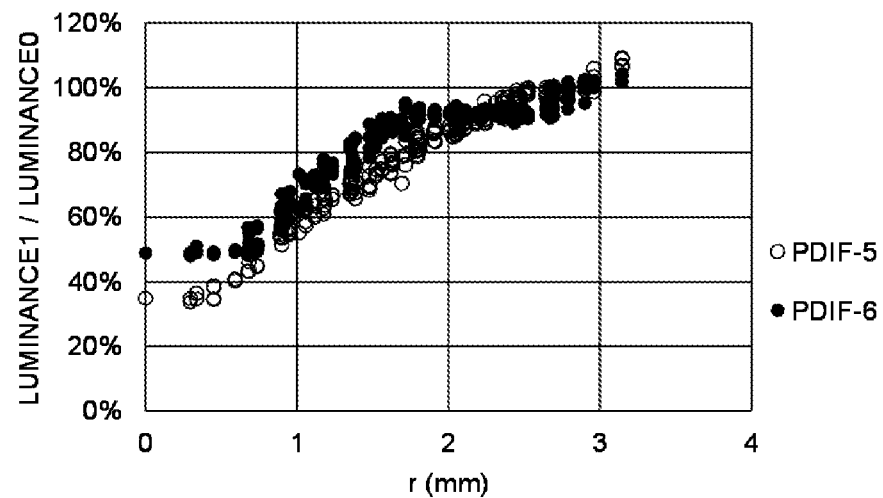

As shown in FIG. 12E, the luminance ratios RL1(r) and RL2(r) have the following features:
1) Each curve has a substantially less value at r=0 than at r=rmax, that is RL1(0)≤RL1(rmax)−3% and RL2(0)≤RL2(rmax)−3%.
2) The difference RL1(r)−RL2(r) varies with the radial position r. |[RL1(0)−RL2(0)]−[RL1(rmax)−RL2(rmax)]|≥3%.
3) The curves RL1(r) and RL2(r) are relatively flat and do not change by more than about 3% for r between 0 and a predetermined value, which is about 0.7 mm in this example.
4) The curves generally trend higher or remain flat as r increases from 0 to rmax. RL1 increases from about 60% at r=0 to about 99% at r=rmax; while RL2 increases from about 40% at r=0 to about 110% at r=rmax.
5) When r is smaller than a threshold value of around 2, RL1(r)>RL2(r); and when r is greater than the threshold value, RL1(r)<RL2(r).
6) RL1(r) and RL2(r) are smaller than 100% at r=0.
7) RL2(rmax)>100%, indicating that the patterned diffuser redistributes light from near r=0 to the area that is away from the center of the patterned diffuser.

The relatively flat portions of the above curves and those described below may be referred to as substantially flat sections. Increasing or decreasing portions of the above curves and those described below may be referred to as curved sections.

FIGS. 13A-13E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, when the patterned diffuser 110a/110b is replaced with a comparative optical component, which has a spatially uniform diffusive layer. As shown in FIGS. 13A-13E, each of the curves DCx1(r), DCy1(r), DCx2(r), DCy2(r), RCx1(r), RCy1(r), RCx2(r), RCy2(r), RL1(r), and RL2(r) are substantially flat, independent of the radial position r. Each curve has substantially the same values at r=0 and at r=rmax. For example, |DCx1(0)−DCx1(rmax)|<0.004, |DCy1(0)−DCx1(rmax)|<0.004, |DCx2(0)−DCx2(rmax)|<0.004, |DCy2(0)−DCy2(rmax)|<0.004, |RCx1(0)−RCx1(rmax)|<2%, |RCy1(0)−RCx1(rmax)|<2%, |RCx2(0)−RCx2(rmax)|<2%, |RCy2(0)−RCy2(rmax)|<2%, |RL1(0)−RL1(rmax)|<2%, and |RL2(0)−RL2(rmax)|<2%. In addition, the differences DCx1(r)−DCx2(r), DCy1(r)−DCy2(r), RCx1(r)−RCx2(r), RCx1(r)−RCx2(r), and RL1(r)−RL2(r) are also substantially independent of the value of r. For example, |[DCx1(0)−DCx2(0)]−[DCx1(rmax)−DCx2(rmax)]|<0.004, |[DCy1(0)−DCy2(0)]−[DCy1(rmax)−DCy2(rmax)]|<0.004, |[RCx1(0)−RCx2(0)]−[RCx1(rmax)−RCx2(rmax)]|<2%, |[RCy1(0)−RCy2(0)]−[RCy1(rmax)−RCy2(rmax)]|<2%, and |[RL1(0)−RL2(0)]−[RL1(rmax)−RL2(rmax)]|<2%. The above results also apply to a comparative optical component that is an about 2-millimeter-thick volume diffuser plate, which may be found in an LCD backlight.

FIGS. 14A-14E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves are qualitatively similar to the curves of FIGS. 12A-12E, respectively, but quantitatively different. For example, RL1 increases from about 65% at r=0 to about 100% at r=rmax and RL2 increases from about 30% at r=0 to about 110% at r=rmax, shown in FIG. 14E.

FIGS. 15A-15E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have similar behaviors as FIGS. 12A-12E, respectively, but also have different features. For example, each of DCx2, DCy2, RCx2, and RCy2 increases from r=0 and reaches a maximum value at about r=0.7 mm. Each then decreases from about r=0.7 mm to about r=1.5 mm. Each remains flat between about r=1.5 mm to about r=2.5 mm, and then decreases from about r=2.5 mm to r=rmax.

FIGS. 16A-16E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have similar behaviors as those in FIGS. 15A-15E, respectively. For example, each of DCx2, DCy2, RCx2, or RCx2 increases from r=0 and reaches a maximum value at about r=0.7 mm. Each then decreases from about r=0.7 mm to about r=1.5 mm. Each remains flat between about r=1.5 mm to about r=2.5 mm, and then decreases from about r=2.5 mm to r=rmax. RL2 decreases from r=0 and reaches a minimum value at about r=0.7 mm. RL2 then increases from about r=0.7 mm to about r=1.5 mm. Between about r=1.5 mm to about r=2.5 mm, RL2 remains flat. RL2 then increases from about r=2.5 mm to r=rmax.

FIGS. 17A-17E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have similar behaviors as those in FIGS. 16A-16E, respectively. For example, each of DCx2, DCy2, RCx2, and RCx2 increases from r=0 and reaches a maximum value at about r=0.7 mm. Each then decreases from about r=0.7 mm to about r=1.5 mm. Each remains flat between about r=1.5 mm to about r=2.5 mm, and then decreases from about r=2.5 mm to r=rmax. RL2 decreases from r=0 and reaches a minimum value at about r=0.7 mm. RL2 then increases from about r=0.7 mm to about r=1.5 mm. Between about r=1.5 mm to about r=2.5 mm, RL2 remains flat. RL2 then increases from about r=2.5 mm to r=rmax.

FIGS. 18A-18E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have some similar and some different behaviors compared to those in FIGS. 12A-12E, respectively. For example, similar to FIGS. 12A-12E, DCx1(r)<DCx2(r) and RCx1(r)<RCx2(r) for r that is less than a threshold. Different from FIGS. 12A-12E, DCy1(r) <DCy2(r) and RCy1(r)<RCy2(r) for all r. In addition, when r is greater than a threshold, DCy1(r) and DCy2(r) can become less than 0, RCy1(r) and RCy2(r) can become less than 100%, and RL1(r) and RL2(r) can become greater than 100%.

FIGS. 19A-19E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have some similar and some different behaviors compared to those in FIGS. 18A-18E, respectively. Specifically, DCx1(r)<DCx2(r) and RCx1 (r)<RCx2(r) for all r. DCy1(r)<DCy2(r) and RCy1(r)<RCy2 (r) for all r. DCy1(r)<0 and DCy2(r)>0, RCy1(r)<100% and RCy2(r)>100% for all r.

FIGS. 20A-20E are charts of color coordinate differences DCx1(r) and DCx2(r), color coordinate differences DCy1(r) and DCy2(r), color coordinate ratios RCx1(r) and RCx2(r), color coordinate ratios RCy1(r) and RCy2(r), and luminance ratios RL1(r) and RL2(r), respectively, for another exemplary patterned diffuser. The curves have some similar and some different behaviors compared to those in FIGS. 19A-19E, respectively. Specifically, DCx1(r)<DCx2(r) and RCx1 (r)<RCx2(r) for all r. DCy1(r)>DCy2(r) and RCy1(r)>RCy2 (r) for all r.

For each of the remaining embodiments of FIGS. 21A-21E to FIGS. 23A-23E, the color coordinate differences DCx1(r), DCy1(r), the color coordinate ratios RCx1(r), RCy1(r), and the luminance ratios RL1(r), measured according to the setup of FIG. 10A for two exemplary patterned diffusers are illustrated. The color coordinate differences DCx2(r), DCy2(r), the color coordinate ratios RCx2(r), RCy2(r), and the luminance ratios RL2(r), measured according to the setup of FIG. 10B are similar to those described with reference to FIGS. 12A-12E and FIGS. 14A-14E to FIGS. 20A-20E.

FIGS. 21A-21E are charts of color coordinate difference DCx1(r), color coordinate difference DCy1(r), color coordinate ratio RCx1(r), color coordinate ratio RCy1(r), and luminance ratio RL1(r), respectively, for another two exemplary patterned diffusers. The empty circles indicate the data points for a first patterned diffuser (PDIF-1), and the solid circles indicate the data points for a second patterned diffuser (PDIF-2).

FIGS. 22A-22E are charts of color coordinate difference DCx1(r), color coordinate difference DCy1(r), color coordinate ratio RCx1(r), color coordinate ratio RCy1(r), and luminance ratio RL1(r), respectively, for another two exemplary patterned diffusers. The empty circles indicate the data points for a third patterned diffuser (PDIF-3), and the solid circles indicate the data points for a fourth patterned diffuser (PDIF-4). As shown in FIGS. 22A-22E, PDIF-3 has a small slope in spatial color shift in terms of DCx1(r), DCy1(r), RCx1(r), and RCy1(r). The curves decrease almost linearly from r=0 to r=rmax, by about 0.003, 0.004, 0.8%, and 0.1%, respectively. In other embodiments, the curves may decrease by an even smaller amount. The spatial luminance ratio RL1(r) of PDIF-3, however, increases almost linearly, from about 70% at r=0 to about 82% at r=rmax.

FIGS. 23A-23E are charts of color coordinate difference DCx1(r), color coordinate difference DCy1(r), color coordinate ratio RCx1(r), color coordinate ratio RCy1(r), and luminance ratio RL1(r), respectively, for another two exemplary patterned diffusers. The empty circles indicate the data points for a fifth patterned diffuser (PDIF-5), and the solid circles indicate the data points for a sixth patterned diffuser (PDIF-6).

Referring back to FIG. 8A, the patterned diffuser 360a may include patterned reflectors 112a and 112b located on opposing surfaces of the carrier 108. When patterned reflectors 112a and 112b are substantially the same, the patterned diffuser 360a is similar whether the first surface 304 or the second surface 306 of the carrier 108 faces the angularly Lambertian light source 400a in the measurement setup of FIG. 10A or FIG. 10B. In this case, DCx1(r), DCy1(r), RCx1(r), RCy1(r), and RL1(r) are substantially the same as DCx2(r), DCy2(r), RCx2(r), RCy2(r), and RL2(r), respectively. Thus, |DCx1(r)−DCx2(r)|<0.005, |DCy1(r)−DCy2(r) |<0.005, |RCx1(r)−RCx2(r)|<3%, |RCy1(r)−RCy2(r)|<3%, and |RL1(r)−RL2(r)|<3% for all r in the range of 0 and rmax.

Referring back to FIG. 8B, the patterned diffuser 360b may include patterned reflectors 112a and 112b located on opposing surfaces of the carrier 108 encapsulated in corresponding encapsulation layers 342a and 342b, respectively. When patterned reflectors 112a and 112b are substantially the same and encapsulation layers 342a and 342b are substantially the same, the patterned diffuser 360b is similar whether the first surface 304 or the second surface 306 of the carrier 108 faces the angularly Lambertian light source 400a in the measurement setup of FIG. 10A or FIG. 10B. Thus, |DCx1(r)−DCx2(r)|<0.005, |DCy1(r)−DCy2(r)|<0.005, |RCx1(r)−RCx2(r)|<3%, |RCy1(r)−RCy2(r)|<3%, and |RL1 (r)−RL2(r)|<3% for all r in the range of 0 and rmax.

Figure 24:
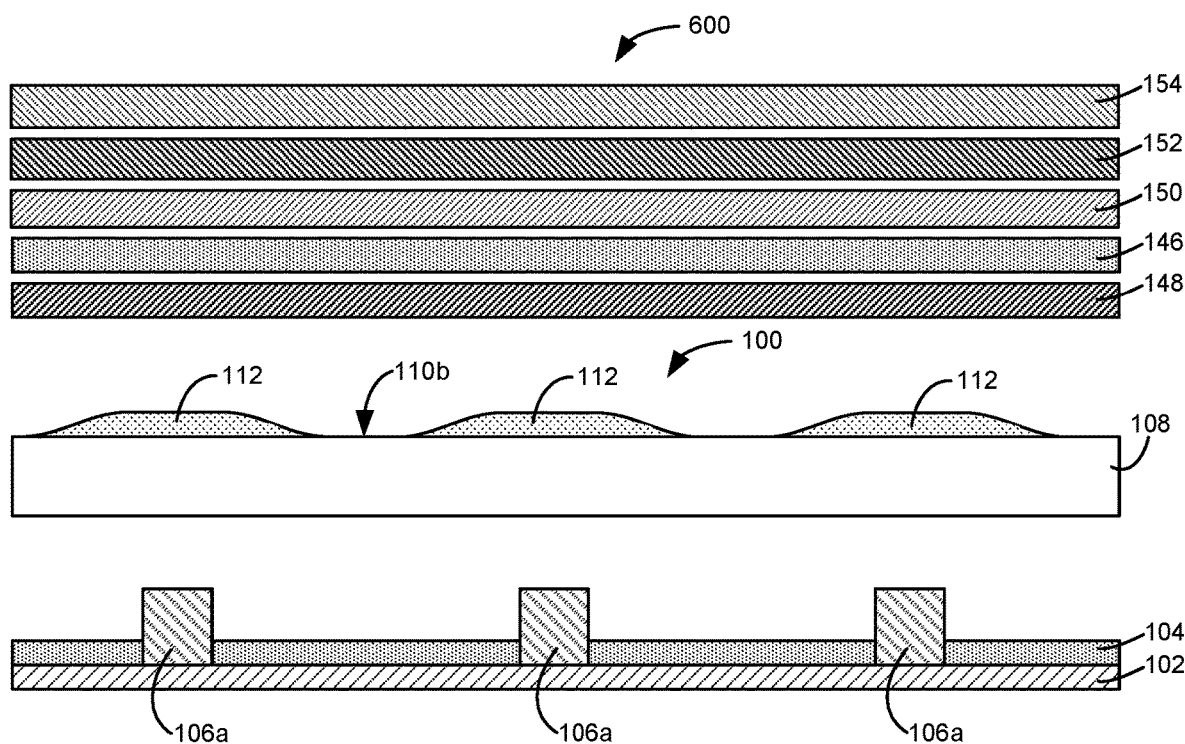
FIG. 24 is a cross-sectional view of another exemplary LCD including the exemplary backlight portion of FIGS. 1A-1C.

FIG. 24 is a cross-sectional view of another exemplary LCD 600. LCD 600 includes a backlight portion 100 including a patterned diffuser 110b as previously described and illustrated with reference to FIGS. 1A-1C. In addition, the backlight of LCD 600 includes a color conversion layer 148 (e.g., a quantum dot film or phosphor film) over the backlight portion 100, a diffuser plate 146 over the color conversion layer 148, optionally a prismatic film 150 over the diffuser plate 146, and optionally a reflective polarizer 152 over the prismatic film 150. LCD 600 also includes a display panel 154 over the reflective polarizer 152 of the backlight. In certain exemplary embodiments, the reflective polarizer 152 may be bonded to the display panel 154.

In this embodiment, the patterned diffuser 110b may be referred to as a first diffuser plate, and the diffuser plate 146 may be referred to as a second diffuser plate. While the first diffuser plate 110b shown in FIG. 24 is a patterned diffuser as previously described with reference to FIG. 1A, in other embodiments the first diffuser plate 110b may be similar to the second diffuser plate 146, patterned diffuser 210a (FIG. 3A), patterned diffuser 210b (FIG. 3B), patterned diffuser 240 (FIG. 4), patterned diffuser 110a (FIG. 5), patterned diffuser 320a (FIG. 6A), patterned diffuser 320b (FIG. 6B), patterned diffuser 340a (FIG. 7A), patterned diffuser 340b (FIG. 7B), patterned diffuser 360a (FIG. 8A), patterned diffuser 360b (FIG. 8B) as previously described, or another suitable diffuser plate. The color conversion layer 148 is between the first diffuser plate 110b and the second diffuser plate 146.

The first diffuser plate 110b is between the plurality of light sources 106a and the color conversion layer 148. As shown in FIG. 24, and as previously described, the first diffuser plate 110b may include a patterned diffuser including a plurality of patterned reflectors 112, where each patterned reflector 112 is aligned with a corresponding light source 106a. The patterned diffuser 110b may include a carrier 108 with the plurality of patterned reflectors 112 on a first surface of the carrier 108 as previously described. In other embodiments, the first diffuser plate 110b may have other configurations as previously described with reference to FIGS. 3A-8B.

In certain exemplary embodiments, the first diffuser plate 110b includes a first Young's modulus, and the second diffuser plate 146 includes a second Young's modulus less than the first Young's modulus. In one embodiment, the second Young's modulus is less than half the first Young's modulus. The second diffuser plate 146 is a volume diffuser plate and scatters light through a thickness of the second diffuser plate. In contrast, a diffuser sheet scatters light at its surface and not inside its volume. For example, the first diffuser plate 110b may include EAGLE XG® glass (Young's modulus of about 73.6 gigapascal) or floating glass (Young's modulus of about 47.7 gigapascal). The second diffuser plate 146 may include polycarbonate (Young's modulus within a range between about 13.5 gigapascal and about 21.4 gigapascal), PMMA (Young's modulus of about 2.855 gigapascal), or glass having a lower Young's modulus, each mixed with scattering elements to scatter light in volume.

By arranging the color conversion layer 148 between the first diffuser plate 110b and the second diffuser plate 146 within the LCD 600, luminance, luminance uniformity, and color uniformity may be improved compared to an LCD 140 (FIG. 2) where the color conversion layer 148 is not between the first diffuser plate 110b and the second diffuser plate 146. With the color conversion layer 148 between the first diffuser plate 110b and the second diffuser plate 146, the average CIE spatial color coordinates x and y may be increased, indicating that more blue light from the light sources 106a is converted into green and red light. In addition, the luminance may be increased. Based on these improvements, a weak diffuser sheet that may otherwise be used may be excluded and the color conversion layer 148 may have a lower concentration of color conversion particles, thereby reducing the cost of the LCD 600 compared to the LCD 140.

In certain exemplary embodiments, the luminance increases to within a range from about 101 percent to about 111 percent when the color conversion layer 148 is arranged between the first diffuser plate 110b and the second diffuser plate 146 compared to the luminance when the color conversion layer 148 is arranged above the first diffuser plate 110b and the second diffuser plate 146. Additionally, the CIE color coordinates x and y may be less than about 0.40 when the color conversion layer 148 is arranged between the first diffuser plate 110b and the second diffuser plate 146. In certain exemplary embodiments, the CIE color coordinates x and y increase to within a range from about 101 percent to about 112 percent when the color conversion layer 148 is arranged between the first diffuser plate 110b and the second diffuser plate 146.

As shown in FIG. 2, the color conversion layer 148 may be placed on the top of the diffuser plate 146 since the color conversion layer 148 may lack the thermal and dimensional stability of the diffuser plate 146. When a patterned diffuser is used (e.g., 110b), particularly when the carrier (e.g., 108) is glass, the color conversion layer 148 may be placed on top of the patterned diffuser and an additional diffuser plate (e.g., 146) may be excluded. Accordingly, when an additional diffuser plate (e.g., 146) is used as shown in FIG. 2, it is natural to believe that the best location for the color conversion layer is on top of the additional diffuser plate rather than between the diffuser plates. Thus, the arrangement of the color conversion layer 148 between the first diffuser plate 110b and the second diffuser plate 146 as shown in FIG. 24 is not obvious. Additionally, the color coordinates are not always on target and the luminance is not always improved when the color conversion layer 148 is arranged between the first diffuser plate 110b and the second diffuser plate 146. To realize the advantage of improved luminance, the CIE color coordinates x and y should be less than about 0.40 when the color conversion layer 148 is arranged between the first diffuser plate 110b and the second diffuser plate 146. To make the color coordinates on target, the color conversion layer 148 should be changed to have a lower concentration of color conversion particles or a thinner layer of color conversion particles.

Figure 25A:
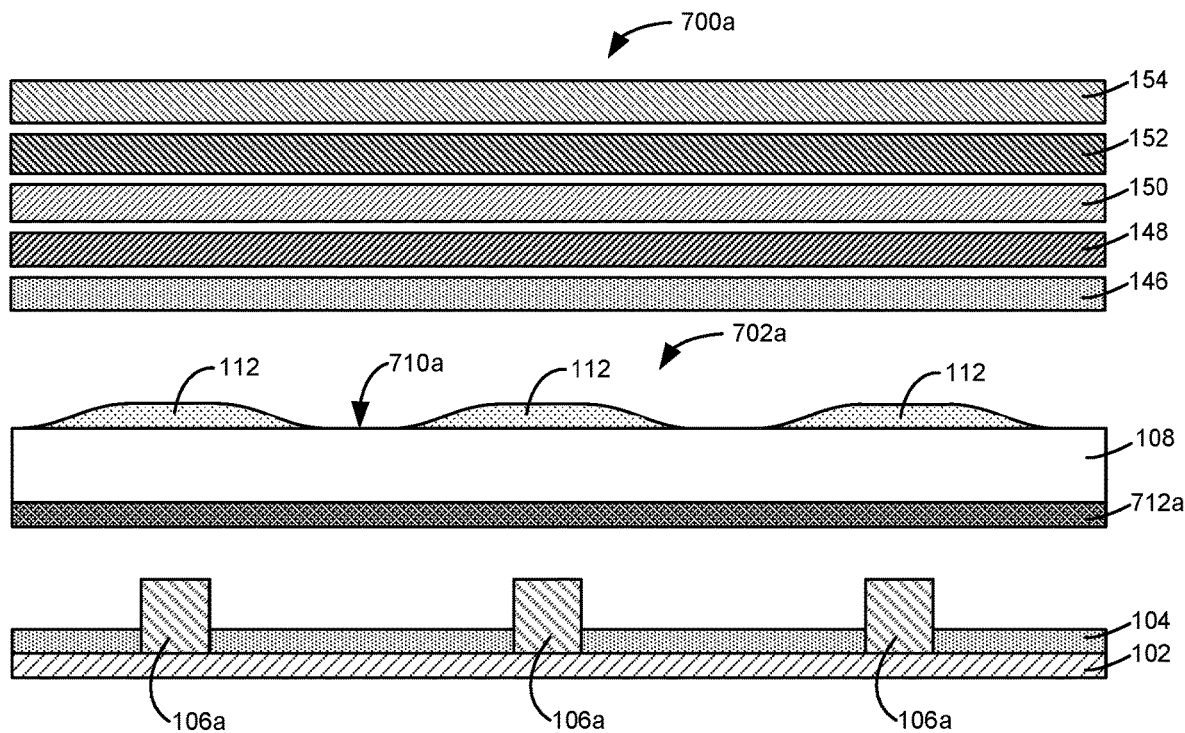
FIGS. 25A-25C are cross-sectional views of exemplary LCDs including patterned diffusers with wavelength selective reflectors.

FIG. 25A is a cross-sectional view of an exemplary LCD 700a. LCD 700a includes a backlight including a backlight portion 702a, optionally a diffuser plate 146 over the backlight portion 702a, optionally a color conversion layer 148 (e.g., a quantum dot film or a phosphor film) over the diffuser plate 146, optionally a prismatic film 150 over the color conversion layer 148, and optionally a reflective polarizer 152 over the prismatic film 150. In other embodiments, the color conversion layer 148 may be arranged between the backlight portion 702a and the diffuser plate 146. LCD 700a also includes a display panel 154 over the reflective polarizer 152 of the backlight. Backlight portion 702a includes a substrate 102, a reflective layer 104, and a plurality of light sources 106a as previously described and illustrated with reference to FIGS. 1A-1B. In addition, backlight portion 702a includes a patterned diffuser 710a. Patterned diffuser 710a includes a carrier 108, a wavelength selective reflector 712a on a first surface of the carrier 108 and a plurality of patterned reflectors 112 on a second surface of the carrier 108 opposite to the first surface of the carrier 108.

In this embodiment as shown in FIG. 25A, the wavelength selective reflector 712a faces the plurality of light sources 106a, and the plurality of patterned reflectors 112 face away from the plurality of light sources 106a. In other embodiments, the wavelength selective reflector 712a may face away from the plurality of light sources 106a, and the plurality of patterned reflectors 112 may face the plurality of light sources 106a. The configuration of wavelength selective reflector 712a is described in more detail below with reference to FIG. 26.

The plurality of light sources 106a emit light within a first wavelength range. The color conversion layer 148 converts light of the first wavelength range into light of a second wavelength range higher than the first wavelength range and into light of a third wavelength range higher than the second wavelength range. The wavelength selective reflector 712a transmits more than about 60 percent of normal incident light of the first wavelength range and reflects more than about 60 percent of normal incident light of the second wavelength range. In certain exemplary embodiments, the wavelength selective reflector 712a also reflects more than about 60 percent of normal incident light of the third wavelength range. The first wavelength range is for example, within a range between about 430 nanometers and about 460 nanometers, the second wavelength range is, for example, within a range between about 530 nanometers and about 570 nanometers, and the third wavelength range is, for example, within a range between about 620 nanometers and about 680 nanometers.

A backlight including patterned diffuser 710a with a wavelength selective reflector 712a has an increased luminance and improved uniformity compared to a patterned diffuser without a wavelength selective reflector 712a, such as patterned diffuser 110b of FIG. 1A. In certain exemplary embodiments, the luminance of the backlight may be increased by up to about 13 percent when the patterned diffuser includes a wavelength selective reflector 712a.

Figure 25B:
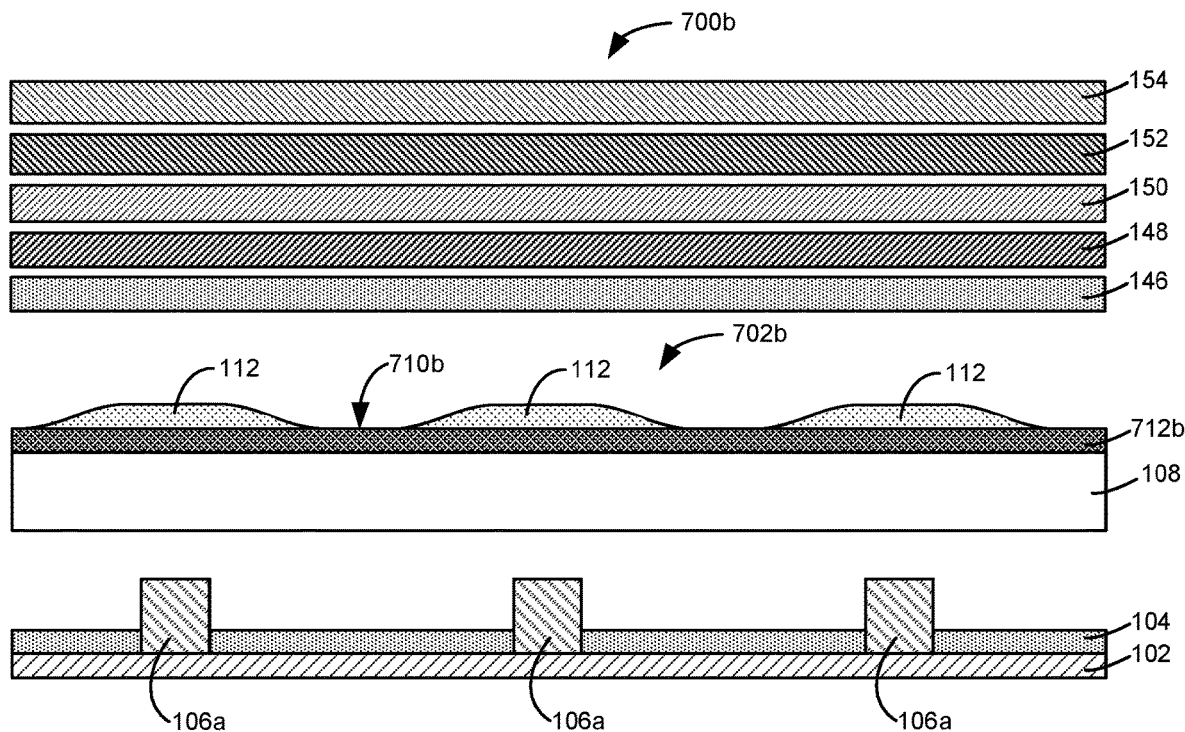

FIG. 25B is a cross-sectional view of an exemplary LCD 700b. LCD 700b includes a backlight including a backlight portion 702b, optionally a diffuser plate 146 over the backlight portion 702b, optionally a color conversion layer 148 (e.g., a quantum dot film or a phosphor film) over the diffuser plate 146, optionally a prismatic film 150 over the color conversion layer 148, and optionally a reflective polarizer 152 over the prismatic film 150. In other embodiments, the color conversion layer 148 may be arranged between the backlight portion 702b and the diffuser plate 146. LCD 700b also includes a display panel 154 over the reflective polarizer 152 of the backlight. Backlight portion 702b includes a substrate 102, a reflective layer 104, and a plurality of light sources 106a as previously described and illustrated with reference to FIGS. 1A-1B. In addition, backlight portion 702b includes a patterned diffuser 710b. Patterned diffuser 710b includes a carrier 108, a wavelength selective reflector 712b on a first surface of the carrier 108 and a plurality of patterned reflectors 112 on the wavelength selective reflector 712b.

In this embodiment as shown in FIG. 25B, the wavelength selective reflector 712b and the plurality of patterned reflectors 112 face away from the plurality of light sources 106a. In other embodiments, the wavelength selective reflector 712b and the plurality of patterned reflectors 112 may face the plurality of light sources 106a. The configuration of wavelength selective reflector 712b is described in more detail below with reference to FIG. 26.

The plurality of light sources 106a emit light within a first wavelength range. The color conversion layer 148 converts light of the first wavelength range into light of a second wavelength range higher than the first wavelength range and into light of a third wavelength range higher than the second wavelength range. The wavelength selective reflector 712b transmits more than about 60 percent of normal incident light of the first wavelength range and reflects more than about 60 percent of normal incident light of the second wavelength range. In certain exemplary embodiments, the wavelength selective reflector 712b also reflects more than about 60 percent of normal incident light of the third wavelength range. The first wavelength range is for example, within a range between about 430 nanometers and about 470 nanometers, the second wavelength range is, for example, within a range between about 530 nanometers and about 570 nanometers, and the third wavelength range is, for example, within a range between about 620 nanometers and about 680 nanometers.

A backlight including patterned diffuser 710b with a wavelength selective reflector 712b has an increased luminance and improved uniformity compared to a patterned diffuser without a wavelength selective reflector 712b, such as patterned diffuser 110b of FIG. 1A. In certain exemplary embodiments, the luminance of the backlight may be increased by up to about 13 percent when the patterned diffuser includes a wavelength selective reflector 712b.

Figure 25C:
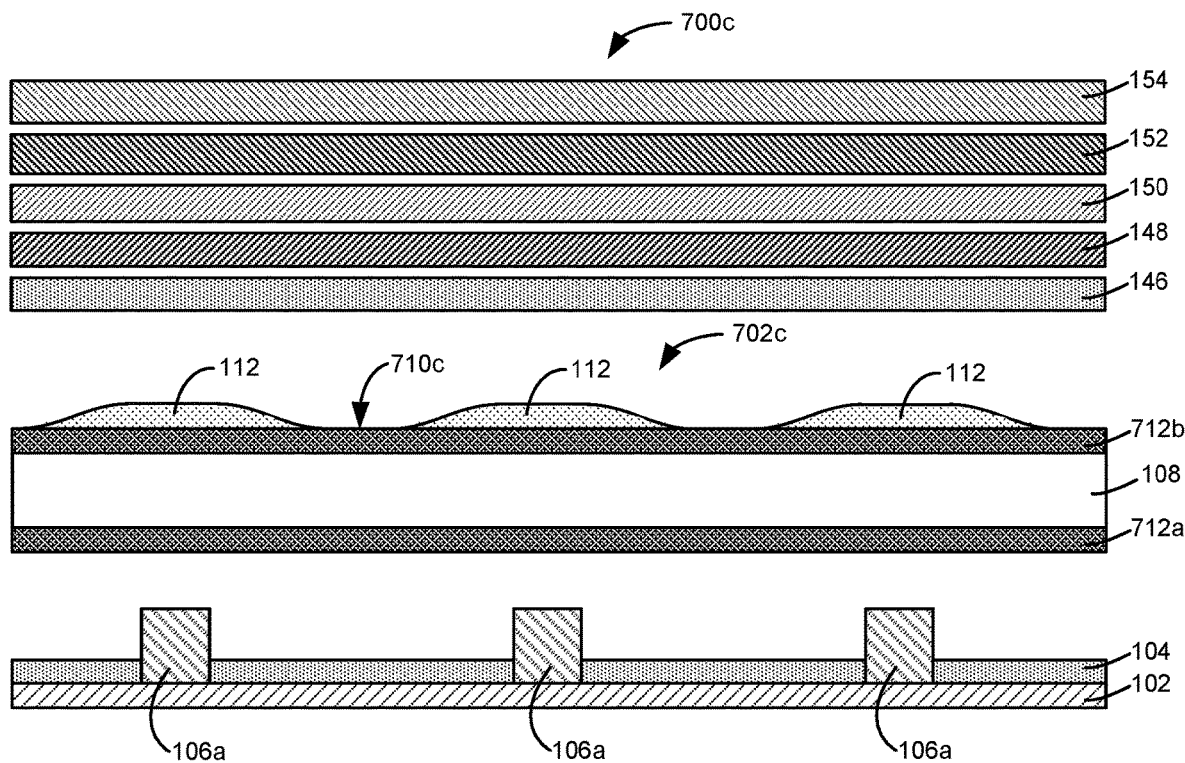

FIG. 25C is a cross-sectional view of an exemplary LCD 700c. LCD 700c includes a backlight including a backlight portion 702c, optionally a diffuser plate 146 over the backlight portion 702c, optionally a color conversion layer 148 (e.g., a quantum dot film or a phosphor film) over the diffuser plate 146, optionally a prismatic film 150 over the color conversion layer 148, and optionally a reflective polarizer 152 over the prismatic film 150. In other embodiments, the color conversion layer 148 may be arranged between the backlight portion 702c and the diffuser plate 146. LCD 700c also includes a display panel 154 over the reflective polarizer 152. Backlight portion 702c includes a substrate 102, a reflective layer 104, and a plurality of light sources 106a as previously described and illustrated with reference to FIGS. 1A-1B. In addition, backlight portion 702c includes a patterned diffuser 710c. Patterned diffuser 710c includes a carrier 108, a first wavelength selective reflector 712a on a first surface of the carrier 108, a second wavelength selective reflector 712b on a second surface of the carrier 108 opposite to the first surface of the carrier 108, and a plurality of patterned reflectors 112 on the second wavelength selective reflector 712b.

In this embodiment as shown in FIG. 25C, the first wavelength selective reflector 712a faces the plurality of light sources 106a, and the second wavelength selective reflector 712b and the plurality of patterned reflectors 112 face away from the plurality of light sources 106a. In other embodiments, the first wavelength selective reflector 712a may face away from the plurality of light sources 106a, and the second wavelength selective reflector 712b and the plurality of patterned reflectors 112 may face the plurality of light sources 106a. The configuration of the first wavelength selective reflector 712a and the second wavelength selective reflector 712b are described in more detail below with reference to FIG. 26.

The plurality of light sources 106a emit light within a first wavelength range. The color conversion layer 148 converts light of the first wavelength range into light of a second wavelength range higher than the first wavelength range and into light of a third wavelength range higher than the second wavelength range. The first wavelength selective reflector 712a transmits more than about 60 percent of normal incident light of the first wavelength range and reflects more than about 60 percent of normal incident light of the second wavelength range. In certain exemplary embodiments, the second wavelength selective reflector 712b also transmits more than about 60 percent of normal incident light of the first wavelength range and reflects more than about 60 percent of normal incident light of the second wavelength range. In other embodiments, the second wavelength selective reflector 712b transmits more than about 60 percent of normal incident light of the first wavelength range and reflects more than about 60 percent of normal incident light of the third wavelength range. The first wavelength range is for example, within a range between about 430 nanometers and about 470 nanometers, the second wavelength range is, for example, within a range between about 530 nanometers and about 570 nanometers, and the third wavelength range is, for example, within a range between about 620 nanometers and about 680 nanometers.

A backlight including a patterned diffuser 710c with a first wavelength selective reflector 712a and a second wavelength selective reflector 712b has an increased luminance and improved uniformity compared to a patterned diffuser without a first wavelength selective reflector 712a and a second wavelength selective reflector 712b, such as patterned diffuser 110b of FIG. 1A. In certain exemplary embodiments, the luminance of the backlight may be increased by up to about 13 percent when the patterned diffuser includes a first wavelength selective reflector 712a and a second wavelength selective reflector 712b.

Figure 26:
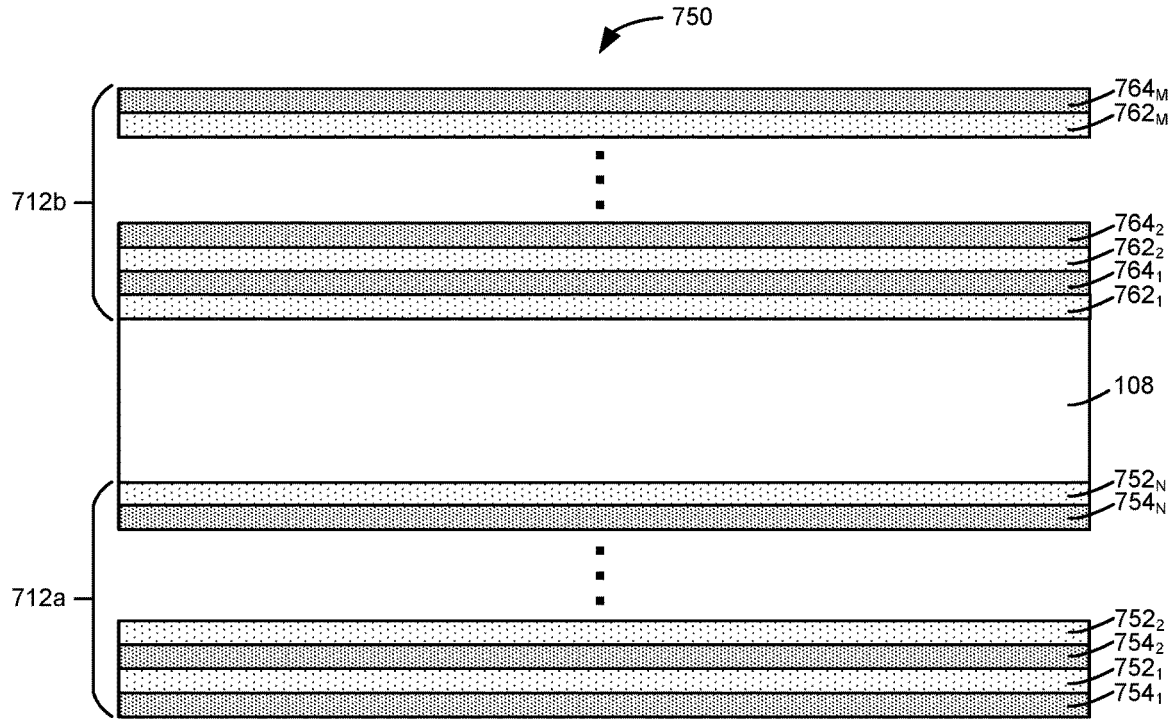
FIG. 26 is a cross-sectional view of an exemplary reflector including a first wavelength selective reflector and a second wavelength selective reflector.

FIG. 26 is a cross-sectional view of an exemplary reflector 750 including a carrier 108, a first wavelength selective reflector 712a, and a second wavelength selective reflector 712b. First wavelength selective reflector 712a may be used for the wavelength selective reflector 712a of FIG. 25A or for the first wavelength selective reflector 712a of FIG. 25C. Second wavelength selective reflector 712b may be used for the wavelength selective reflector 712b of FIG. 25B or for the second wavelength selective reflector 712b of FIG. 25C. The first wavelength selective reflector 712a is on a first surface of the carrier 108. The second wavelength selective reflector 712b is on a second surface of the carrier 108 opposite to the first surface of the carrier 108.

The first wavelength selective reflector 712a includes a first stack of alternating low index dielectric layers $752_1$ to $752_N$ and high index dielectric layers $754_1$ to $754_N$, where "N" is any suitable number, such as 2, 3, 4, 5, 6 or more to provide a first stack of 4, 6, 8, 10, 12 or more dielectric layers. Either the low index dielectric layer $752_N$ or the high index dielectric layer $754_N$ contacts the first surface of the carrier 108. In certain exemplary embodiments, the low index dielectric layer $752_N$ contacts the first surface of the carrier 108 so that the first wavelength selective reflector 712a achieves a higher reflectance at a selected wavelength. The second wavelength selective reflector 712b includes a second stack of alternating low index dielectric layers $762_1$ to $762_M$ and high index dielectric layers $764_1$ to $764_M$, where "M" is any suitable number, such as 2, 3, 4, 5, 6 or more to provide a second stack of 4, 6, 8, 10, 12 or more dielectric layers. Either the low index dielectric layer $762_1$ or the high index dielectric layer $764_1$ contacts the first surface of the carrier 108. In certain exemplary embodiments, the low index dielectric layer $762_1$ contacts the second surface of the carrier 108 so that the second wavelength selective reflector 712b achieves a higher reflectance at a selected wavelength. In certain exemplary embodiments, "N" equals "M". In other embodiments, "N" and "M" may be unequal. The first stack may, for example, include at least 4 dielectric layers, and the second stack may, for example, include at least 4 dielectric layers. In other embodiments, layers $752_1$ to $752_N$ and $762_1$ to $762_M$ may be high index dielectric layers, and layers $754_1$ to $754_N$ and $764_1$ to $764_M$ may be low index dielectric layers.

Each low index dielectric layer $752_1$ to $752_N$ and $762_1$ to $762_M$ may include $MgF_2$, $SiO_2$, or another suitable low index dielectric material. Each high index dielectric layer $754_1$ to $754_N$ and $764_1$ to $764_M$ may include $ZrO_2$, $Nb_2O_5$, $TiO_2$, $Al_2O_3$, $Si_3N_4$, or another suitable high index dielectric material. In one embodiment, each low index dielectric layer $752_1$ to $752_N$ and $762_1$ to $762_M$ may include $MgF_2$ and each high index dielectric layer $754_1$ to $754_N$ and $764_1$ to $764_M$ may include $ZrO_2$. In another embodiment, each low index dielectric layer $752_1$ to $752_N$ and $762_1$ to $762_M$ may include $SiO_2$, and each high index dielectric layer $754_1$ to $754_N$ and $764_1$ to $764_M$ may include $ZrO_2$. In yet another embodiment, each low index dielectric layer $752_1$ to $752_N$ and $762_1$ to $762_M$ may include $SiO_2$, and each high index dielectric layer $754_1$ to $754_N$ and $764_1$ to $764_M$ may include $Nb_2O_5$. In yet another embodiment, each low index dielectric layer $752_1$ to $752_N$ and $762_1$ to $762_M$ may include $SiO_2$, and each high index dielectric layer $754_1$ to $754_N$ and $764_1$ to $764_M$ may include $TiO_2$. In yet another embodiment, each low index dielectric layer $752_1$ to $752_N$ and $762_1$ to $762_M$ may include $SiO_2$, and each high index dielectric layer $754_1$ to $754_N$ and $764_1$ to $764_M$ may include $Al_2O_3$. In yet another embodiment, each low index dielectric layer $752_1$ to $752_N$ and $762_1$ to $762_M$ may include $SiO_2$, and each high index dielectric layer $754_1$ to $754_N$ and $764_1$ to $764_M$ may include $Si_3N_4$.

The first wavelength selective reflector 712a transmits more than about 60 percent of normal incident light of a first wavelength range and reflects more than about 60 percent of normal incident light of a second wavelength range different from the first wavelength range. The second wavelength selective reflector 712b transmits more than about 60 percent of normal incident light of the first wavelength range and reflects more than about 60 percent of normal incident light of a third wavelength range different from the first wavelength range. In certain exemplary embodiments, each low index dielectric layer $752_1$ to $752_N$ and each high index dielectric layer $754_1$ to $754_N$ of the first stack is a quarter wave layer for a selected wavelength $\lambda_2$ in the second wavelength range satisfying:

$$n_{L1} \cdot \frac{d_{L1}}{\lambda_2} = 1/4 \pm 0.05 \text{ and } n_{H1} \cdot \frac{d_{H1}}{\lambda_2} = 1/4 \pm 0.05$$

where:
$n_{L1}$ is the refractive index of each low index dielectric layer;
$d_{L1}$ is the thickness of each low index dielectric layer;
$n_{H1}$ is the refractive index of each high index dielectric layer; and
$d_{H1}$ is the thickness of each high index dielectric layer.

In certain exemplary embodiments, each low index dielectric layer $762_1$ to $762_M$ and each high index dielectric layer $764_1$ to $764_M$ of the second stack is a quarter wave layer for a selected wavelength $\lambda_3$ in the third wavelength range satisfying:

$$n_{L2} \cdot \frac{d_{L2}}{\lambda_2} = 1/4 \pm 0.05 \text{ and } n_{H2} \cdot \frac{d_{H2}}{\lambda_2} = 1/4 \pm 0.05$$

where:
$n_{L2}$ is the refractive index of each low index dielectric layer;
$d_{L2}$ is the thickness of each low index dielectric layer;
$n_{H2}$ is the refractive index of each high index dielectric layer; and
$d_{H2}$ is the thickness of each high index dielectric layer.

In certain exemplary embodiments, the second wavelength range equals the third wavelength range. In this case, for example, an 8 or 12 layer wavelength selective reflector may be divided into a 4 or 6 layer first wavelength selective reflector 712a on the first surface of the carrier 108 and a 4 or 6 layer second wavelength selective reflector 712b on the second surface of the carrier 108, respectively. By dividing a larger wavelength selective reflector into two smaller wavelength selective reflectors, adhesion of the wavelength selective reflectors to the carrier 108 may be improved. In addition, the reflectance at the designed wavelength may be increased due to the effectively thicker wavelength selective reflector (due to carrier 108 between the first wavelength selective reflector 712a and the second wavelength selective reflector 712b).

In other embodiments, the first wavelength selective reflector 712a transmits more than about 60 percent of normal incident light of the third wavelength range, and the second wavelength selective reflector 712b transmits more than about 60 percent of normal incident light of the second wavelength range. In certain exemplary embodiments, the first wavelength range is within a range between about 430 nanometers and about 470 nanometers, the second wavelength range is within a range between about 530 nanometers and about 570 nanometers, and the third wavelength range is within a range between about 620 nanometers and about 680 nanometers.

In certain exemplary embodiments, the wavelength selective reflectors 712a and 712b described above may be fabricated using a thin film deposition process. In other embodiments, the wavelength selective reflectors 712a and 712b may each be a stack of alternating low index and high index polymeric layers bonded to one surface of the carrier 108 of the patterned diffuser 710a, 710b, or 710c. Each layer of each stack may satisfy the above described quarter wave optical path conditions. Each high index polymeric layer may contain polyesters or polyimides, and each low index polymeric layer may include fluorinated polymers.

FIGS. 27A-27E are charts of reflectance versus wavelength for various configurations for wavelength selective reflectors. Each of the wavelength selective reflectors described below may be used for wavelength selective reflector 712a of FIG. 25A or 25C or wavelength selective reflector 712b of FIG. 25B or 25C. In addition, each wavelength selective reflector described below may be divided into two smaller wavelength selective reflectors 712a and 712b that when combined in a patterned diffuser 710c as shown in FIG. 25C provide features similar to the described wavelength selective reflector (e.g., dividing a 12 layer wavelength selective reflector into two 6 layer wavelength selective reflectors).

Figure 27A:
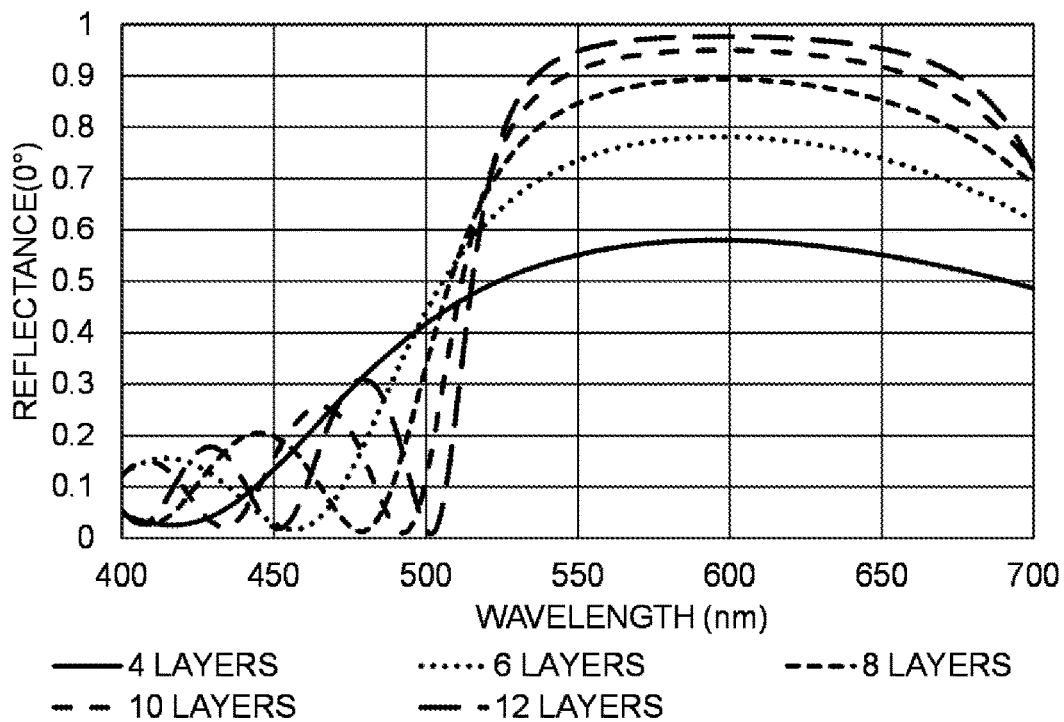
FIGS. 27A-27E are charts of reflectance versus wavelength for various configurations of wavelength selective reflectors.

FIG. 27A is a chart of reflectance versus wavelength for wavelength selective reflectors of 4, 6, 8, 10, and 12 layers. In this embodiment, the wavelength selective reflector includes alternating low index $MgF_2$ and high index $ZrO_2$ dielectric layers (e.g., 2, 3, 4, 5, and 6 pairs of dielectric layers), with low index $MgF_2$ in contact with the carrier. Each $MgF_2$ layer has a nominal thickness of about 109 nanometers, and each $ZrO_2$ layer has a nominal thickness of about 70 nanometers. The nominal thickness of each $MgF_2$ and each $ZrO_2$ layer corresponds to a quarter wave optical path for a selected wavelength of 600 nanometers. That is:

$$n \cdot \frac{d}{\lambda} = 1/4 \pm 0.05$$

where:
n is the refractive index of each layer;
d is the thickness of each layer; and
$\lambda$ is the selected wavelength.

FIG. 27A illustrates one feature of the wavelength selective reflector in terms of the reflectance of the wavelength selective reflector. The transmittance of the wavelength selective reflector can be derived as:

Transmittance=1−Reflectance

In this embodiment, the wavelength selective reflector transmits normal incident light of a wavelength within a range between about 430 nanometers and about 470 nanometers more than about 60 percent, and reflects normal incident light of a wavelength within a range between about 530 nanometers and about 680 nanometers more than about 60 percent when the wavelength selective reflector includes 6, 8, 10, 12, or more layers. In contrast, in this embodiment, a wavelength selective reflector including 2 or 4 layers reflects normal incident light of a wavelength within a range between about 530 nanometers and about 680 nanometers less than about 60 percent.

Figure 27B:
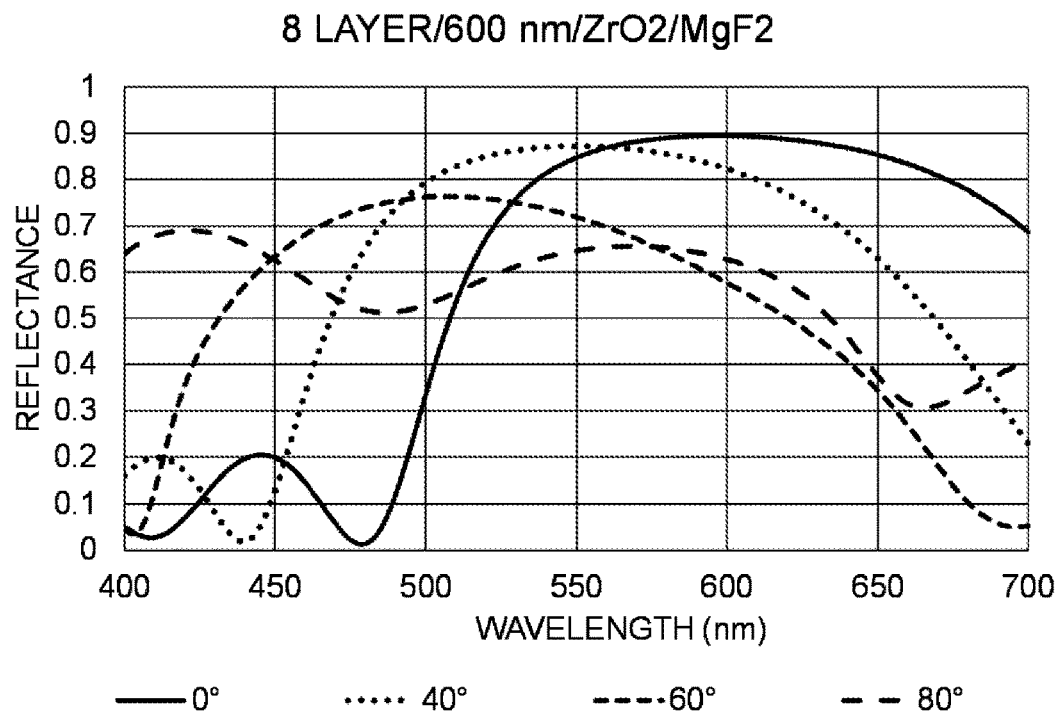

FIG. 27B is a chart of reflectance versus wavelength for an 8 layer wavelength selective reflector for light with different incident angles. In this embodiment, the wavelength selective reflector includes alternating low index $MgF_2$ and high index $ZrO_2$ dielectric layers (e.g., 4 pairs of dielectric layers), with low index $MgF_2$ in contact with the carrier. Each $MgF_2$ layer has a nominal thickness of about 109 nanometers, and each $ZrO_2$ layer has a nominal thickness of about 70 nanometers. The nominal thickness of each $MgF_2$ and each $ZrO_2$ layer corresponds to a quarter wave optical path for a selected wavelength of 600 nanometers. The reflectance of the wavelength selective reflector varies with the incident angle as indicated by the traces for 0 degrees (normal incidence), 40 degrees, 60 degrees, and 80 degrees. As shown in FIG. 27B, the peak reflectance shifts towards a shorter wavelength as the incident angle increases. Therefore, in this embodiment, the wavelength selective reflector transmits normal incident light of a wavelength of about 450 nanometers more than about 60 percent, and reflects some oblique incident light of the same wavelength of about 450 nanometers more than about 60 percent when, for example, the oblique incident angle is within a range between about 60 degrees and about 80 degrees.

Figure 27C:
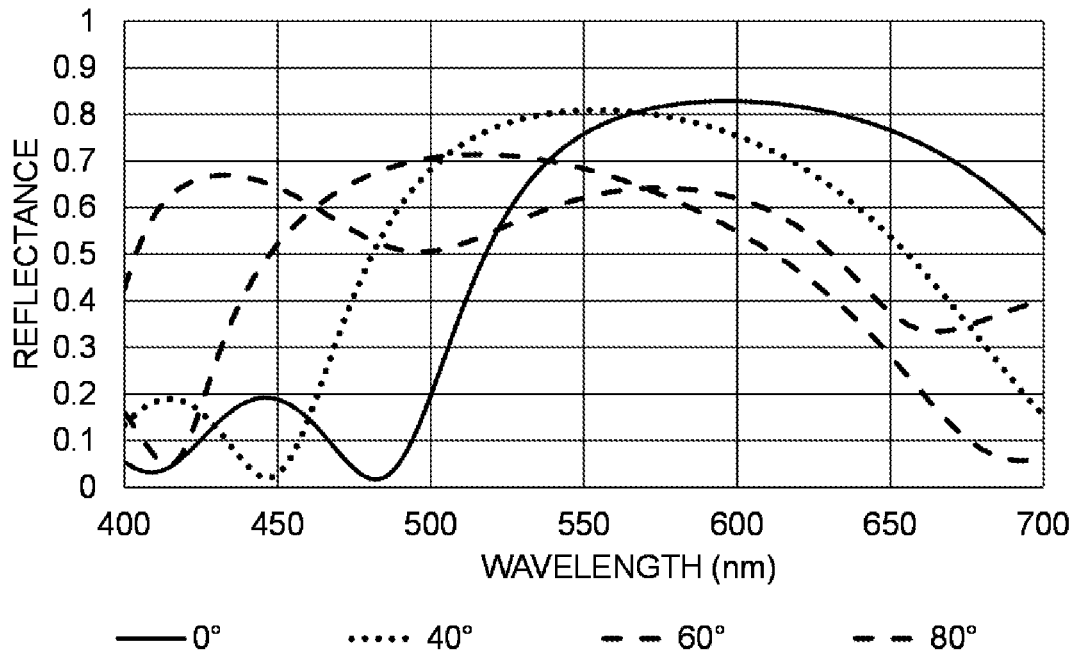

FIG. 27C is a chart of reflectance versus wavelength for an 8 layer wavelength selective reflector. In this embodiment, the wavelength selective reflector includes alternating low index $SiO_2$ and high index $ZrO_2$ dielectric layers (e.g., 4 pairs of dielectric layers), with low index $SiO_2$ in contact with the carrier. Each $SiO_2$ layer has a nominal thickness of about 102 nanometers, and each $ZrO_2$ layer has a nominal thickness of about 70 nanometers. The nominal thickness of each $SiO_2$ and each $ZrO_2$ layer corresponds to a quarter wave optical path for a selected wavelength of 600 nanometers. The reflectance of the wavelength selective reflector varies with the incident angle as indicated by the traces for 0 degrees (normal incidence), 40 degrees, 60 degrees, and 80 degrees.

In this embodiment, the wavelength selective reflector transmits normal incident light of a wavelength within a range between about 430 nanometers and about 470 nanometers more than about 60 percent, and reflects normal incident light of a wavelength within a range between about 530 nanometers and about 680 nanometers more than about 60 percent. The wavelength selective reflector also reflects some oblique incident light of a wavelength of about 450 nanometers more than about 60 percent when, for example, the oblique incident angle is within a range between about 70 degrees and about 80 degrees.

Figure 27D:
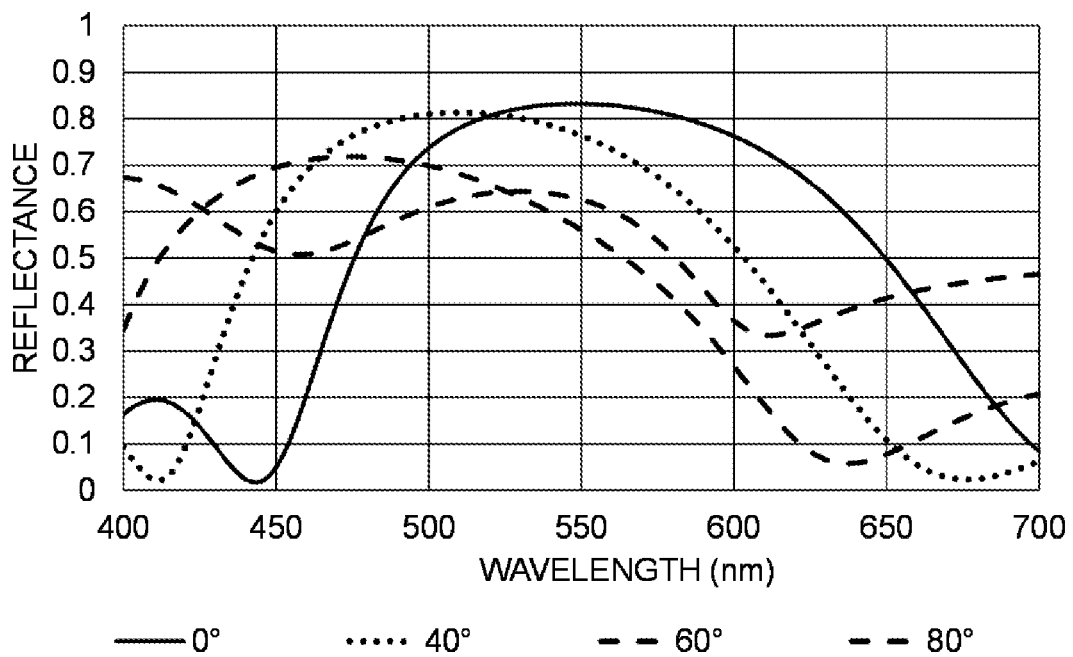

FIG. 27D is a chart of reflectance versus wavelength for an 8 layer wavelength selective reflector. In this embodiment, the wavelength selective reflector includes alternating low index $SiO_2$ and high index $ZrO_2$ dielectric layers (e.g., 4 pairs of dielectric layers), with low index $SiO_2$ in contact with the carrier. Each $SiO_2$ layer has a nominal thickness of about 93 nanometers, and each $ZrO_2$ layer has a nominal thickness of about 64 nanometers. The nominal thickness of each SiO$_2$ and each ZrO$_2$ layer corresponds to a quarter wave optical path for a selected wavelength of 550 nanometers. The reflectance of the wavelength selective reflector varies with the incident angle as indicated by the traces for 0 degrees (normal incidence), 40 degrees, 60 degrees, and 80 degrees.

In this embodiment, the wavelength selective reflector transmits normal incident light of a wavelength within a range between about 430 nanometers and about 470 nanometers more than about 60 percent, and reflects normal incident light of a wavelength within a range between about 500 nanometers and about 580 nanometers more than about 60 percent. The wavelength selective reflector also reflects some oblique incident light of a wavelength of about 450 nanometers more than about 60 percent when, for example, the oblique incident angle is within a range between about 40 degrees and about 60 degrees.

Figure 27E:
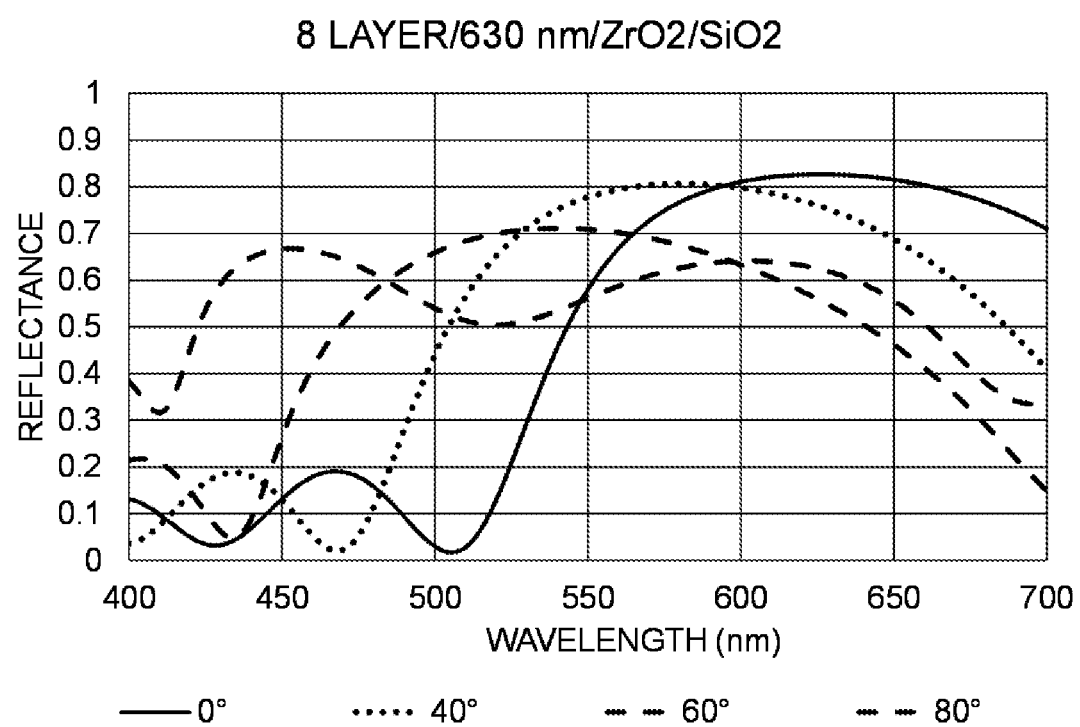

FIG. 27E is a chart of reflectance versus wavelength for an 8 layer wavelength selective reflector. In this embodiment, the wavelength selective reflector includes alternating low index SiO$_2$ and high index ZrO$_2$ dielectric layers (e.g., 4 pairs of dielectric layers), with low index SiO$_2$ in contact with the carrier. Each SiO$_2$ layer has a nominal thickness of about 107 nanometers, and each ZrO$_2$ layer has a nominal thickness of about 73 nanometers. The nominal thickness of each SiO$_2$ and each ZrO$_2$ layer corresponds to a quarter wave optical path for a selected wavelength of 630 nanometers. The reflectance of the wavelength selective reflector varies with the incident angle as indicated by the traces for 0 degrees (normal incidence), 40 degrees, 60 degrees, and 80 degrees.

In this embodiment, the wavelength selective reflector transmits normal incident light of a wavelength within a range between about 430 nanometers and about 470 nanometers more than about 60 percent, and reflects normal incident light of a wavelength within a range between about 560 nanometers and about 700 nanometers more than about 60 percent. The wavelength selective reflector also reflects some oblique incident light of a wavelength of about 450 nanometers more than about 60 percent when, for example, the oblique incident angle is within a range between about 70 degrees and about 80 degrees.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A reflector comprising:
a carrier comprising a first surface and a second surface opposite to the first surface;
a first wavelength selective reflector on the first surface of the carrier, the first wavelength selective reflector to transmit more than 60 percent of normal incident light of a first wavelength range and reflect more than 60 percent of normal incident light of a second wavelength range different from the first wavelength range; and
a second wavelength selective reflector on the second surface of the carrier, the second wavelength selective reflector to transmit more than 60 percent of normal incident light of the first wavelength range and reflect more than 60 percent of normal incident light of a third wavelength range different from the first wavelength range.

2. The reflector of claim 1, wherein the second wavelength range equals the third wavelength range.

3. The reflector of claim 1, wherein the first wavelength selective reflector transmits more than 60 percent of normal incident light of the third wavelength range, and the second wavelength selective reflector transmits more than 60 percent of normal incident light of the second wavelength range.

4. The reflector of claim 1, wherein the first wavelength selective reflector comprises a first stack of alternating low index and high index dielectric layers, the second wavelength selective reflector comprises a second stack of alternating low index and high index dielectric layers.

5. The reflector of claim 4, wherein each low index and high index dielectric layer of the first stack comprises a quarter wave layer for a selected wavelength $\lambda_2$ in the second wavelength range satisfying $$n_{L1} \cdot \frac{d_{L1}}{\lambda_2} = 1/4 \pm 0.05 \text{ and } n_{H1} \cdot \frac{d_{H1}}{\lambda_2} = 1/4 \pm 0.05,$$

where $n_{L1}$ and $d_{L1}$, and $n_{H1}$ and $d_{H1}$ are a refractive index and a thickness of each low index and high index dielectric layer of the first stack, respectively, and each low index and high index dielectric layer of the second stack comprises a quarter wave layer for a selected wavelength $\lambda_3$ in the third wavelength range satisfying $$n_{L2} \cdot \frac{d_{L2}}{\lambda_2} = 1/4 \pm 0.05 \text{ and } n_{H2} \cdot \frac{d_{H2}}{\lambda_2} = 1/4 \pm 0.05,$$

where $n_{L2}$ and $d_{L2}$, and $n_{H2}$ and $d_{H2}$ are a refractive index and a thickness of each low index and high index dielectric layer of the second stack, respectively.

6. The reflector of claim 1, further comprising:
a plurality of patterned reflectors on the first wavelength selective reflector or the second wavelength selective reflector.

7. A backlight comprising:
a substrate;
a plurality of light sources proximate the substrate to emit light within a first wavelength range;
a reflective layer proximate the substrate;
a patterned diffuser comprising a carrier, a first wavelength selective reflector on a first surface of the carrier, and a plurality of patterned reflectors on the first wavelength selective reflector or on a second surface of the carrier opposite to the first surface of the carrier; and
a color conversion layer to convert light of the first wavelength range into light of a second wavelength range higher than the first wavelength range and into light of a third wavelength range higher than the second wavelength range,
wherein the first wavelength selective reflector transmits more the 60 percent of normal incident light of the first wavelength range and reflects more than 60 percent of normal incident light of the second wavelength range.

8. The backlight of claim 7, wherein the first wavelength selective reflector comprises a stack of alternating low index and high index dielectric layers, and each low index and high index dielectric layer comprises a quarter wave layer for a selected wavelength $\lambda_2$ in the second wavelength range satisfying $$n_{L1} \cdot \frac{d_{L1}}{\lambda_2} = 1/4 \pm 0.05 \text{ and } n_{H1} \cdot \frac{d_{H1}}{\lambda_2} = 1/4 \pm 0.05,$$

where $n_{L1}$ and $d_{L1}$, and $n_{H1}$ and $d_{H1}$ are the refractive index and the thickness of each low index and high index dielectric layer, respectively.

9. The backlight of claim 7, wherein the first wavelength selective reflector reflects more than 60 percent of normal incident light of the third wavelength range.

10. The backlight of claim 7, wherein the patterned diffuser further comprises a second wavelength selective reflector on the second surface of the carrier, the second wavelength selective reflector to transmit more the 60 percent of normal incident light of the first wavelength range and reflect more than 60 percent of normal incident light of the third wavelength range.

11. The backlight of claim 10, wherein the first wavelength selective reflector comprises a stack of alternating low index and high index dielectric layers, and each low index and high index dielectric layer comprises a quarter wave layer for a selected wavelength $\lambda_3$ in the third wavelength range satisfying $$n_{L2} \cdot \frac{d_{L2}}{\lambda_2} = 1/4 \pm 0.05 \text{ and } n_{H2} \cdot \frac{d_{H2}}{\lambda_2} = 1/4 \pm 0.05,$$

where $n_{L2}$ and $d_{L2}$, and $n_{H2}$ and $d_{H2}$ are the refractive index and the thickness of each low index and high index dielectric layer, respectively.

* * * * *

UNITED STATES PATENT AND TRADEMARK OFFICE
CERTIFICATE OF CORRECTION

PATENT NO. : 11,988,919 B2
APPLICATION NO. : 17/995439
DATED : May 21, 2024
INVENTOR(S) : Allen et al.

Page 1 of 1

It is certified that error appears in the above-identified patent and that said Letters Patent is hereby corrected as shown below:

In the Claims

In Column 34, Lines 32-33, in Claim 5, delete:

"$n_{L2} \cdot \frac{d_{L2}}{\lambda_2} = 1/4 \pm 0.05$ and $n_{H2} \cdot \frac{d_{H2}}{\lambda_2} = 1/4 \pm 0.05$,"

And insert:

--$n_{L2} \cdot \frac{d_{L2}}{\lambda_3} = 1/4 \pm 0.05$ and $n_{H2} \cdot \frac{d_{H2}}{\lambda_3} = 1/4 \pm 0.05$--

In Column 35, Lines 26-27, in Claim 11, delete:

"$n_{L2} \cdot \frac{d_{L2}}{\lambda_2} = 1/4 \pm 0.05$ and $n_{H2} \cdot \frac{d_{H2}}{\lambda_2} = 1/4 \pm 0.05$,"

And insert:

--$n_{L2} \cdot \frac{d_{L2}}{\lambda_3} = 1/4 \pm 0.05$ and $n_{H2} \cdot \frac{d_{H2}}{\lambda_3} = 1/4 \pm 0.05$--

Signed and Sealed this
Seventeenth Day of September, 2024

Katherine Kelly Vidal
*Director of the United States Patent and Trademark Office*